United States Patent
Sarafa et al.

(10) Patent No.: US 10,582,036 B2
(45) Date of Patent: Mar. 3, 2020

(54) METHODS AND SYSTEMS FOR GENERATING AN EPHEMERAL CONTENT MESSAGE

(71) Applicant: WhatsApp Inc., Menlo Park, CA (US)

(72) Inventors: Randall Sarafa, San Francisco, CA (US); Eugene Fooksman, Santa Clara, CA (US); Brian Lange Acton, Santa Clara, CA (US); Jan Boris Koum, Redwood City, CA (US); Michael B. Donohue, Mountain View, CA (US); Charles Donald Deets, Jr., Palo Alto, CA (US); Anton Borzov, London (GB); Ehren Andrew Kret, Sunnyvale, CA (US)

(73) Assignee: WHATSAPP INC., Menlo Park, CA (US)

( * ) Notice: Subject to any disclaimer, the term of this patent is extended or adjusted under 35 U.S.C. 154(b) by 55 days.

(21) Appl. No.: 15/705,985

(22) Filed: Sep. 15, 2017

(65) Prior Publication Data
US 2018/0241705 A1  Aug. 23, 2018

Related U.S. Application Data

(60) Provisional application No. 62/460,136, filed on Feb. 17, 2017.

(51) Int. Cl.
*G06F 15/16* (2006.01)
*H04M 1/725* (2006.01)
(Continued)

(52) U.S. Cl.
CPC .... *H04M 1/72552* (2013.01); *G06F 3/04817* (2013.01); *G06F 3/04886* (2013.01);
(Continued)

(58) Field of Classification Search
CPC .......................... H04L 29/08072; H04L 29/06
(Continued)

(56) References Cited

U.S. PATENT DOCUMENTS 6,331,865 B1   12/2001  Sachs et al.
8,909,725 B1   12/2014  Sehn
(Continued)

FOREIGN PATENT DOCUMENTS

EP    3046292 A1    7/2016
EP    3082356 A1   10/2016
WO   2015157720 A2   10/2015

OTHER PUBLICATIONS

International Search Report received for PCT Patent Application No. PCT/US2017/051997, dated Jan. 4, 2018, 3 pages.
(Continued)

*Primary Examiner* — Khanh Q Dinh

(57) ABSTRACT

Exemplary embodiments relate to techniques for sending ephemeral content messages via a communications service. An interface may be presented to allow a user to initially access ephemeral content functionality and select content for inclusion in the ephemeral content message. The interface may present a streamlined set of use cases without regard to the manner in which the content was initially captured. Different types of content may be used as ephemeral content, including images, videos, weather reports, news stories, text, audio recordings, location tags, etc. The ephemeral content may be sent through the communications service as an end-to-end encrypted message. When a user replies to an ephemeral content message, the reply may trigger a one-to-one conversation between the originating user and the replying user. Alternatively, an ephemeral content message may be initially sent to a selected group, and replies may be sent back to the entire group.

17 Claims, 33 Drawing Sheets

(51) Int. Cl.

| | | |
|---|---|---|
| *H04L 29/06* | (2006.01) | |
| *H04W 4/12* | (2009.01) | |
| *H04L 12/58* | (2006.01) | |
| *H04W 12/00* | (2009.01) | |
| *G06F 3/0488* | (2013.01) | |
| *H04W 12/02* | (2009.01) | |
| *G06F 3/0481* | (2013.01) | |
| *H04L 9/08* | (2006.01) | |
| *H04W 4/14* | (2009.01) | |
| *G06F 3/0484* | (2013.01) | |
| *H04L 29/08* | (2006.01) | |
| *H04W 12/04* | (2009.01) | |
| *H04W 12/08* | (2009.01) | |

(52) U.S. Cl.
CPC .......... *H04L 9/0827* (2013.01); *H04L 9/0844* (2013.01); *H04L 51/04* (2013.01); *H04L 51/10* (2013.01); *H04L 51/12* (2013.01); *H04L 51/18* (2013.01); *H04L 51/26* (2013.01); *H04L 51/32* (2013.01); *H04L 63/0428* (2013.01); *H04M 1/72555* (2013.01); *H04W 4/12* (2013.01); *H04W 4/14* (2013.01); *H04W 12/0013* (2019.01); *H04W 12/02* (2013.01); *G06F 3/04842* (2013.01); *G06F 2203/04804* (2013.01); *H04L 67/306* (2013.01); *H04L 2209/60* (2013.01); *H04W 12/04* (2013.01); *H04W 12/0808* (2019.01)

(58) Field of Classification Search
USPC .................. 709/203, 220, 224, 226, 229
See application file for complete search history.

(56) References Cited

U.S. PATENT DOCUMENTS

| | | | |
|---|---|---|---|
| 8,914,752 B1 | 12/2014 | Spiegel | |
| 8,964,947 B1* | 2/2015 | Noolu | H04M 3/541 |
| | | | 379/88.01 |
| 9,432,340 B1 | 8/2016 | Tutt et al. | |
| 9,887,955 B1 | 2/2018 | Son | |
| 9,913,114 B1 | 3/2018 | Wu et al. | |
| 10,061,914 B2* | 8/2018 | Proulx | G06F 21/45 |
| 10,341,304 B1 | 7/2019 | Boutros et al. | |
| 10,345,987 B1 | 7/2019 | Andreou | |
| 10,375,019 B2* | 8/2019 | Clark | H04L 63/0876 |
| 10,411,729 B2* | 9/2019 | Miller | G05D 23/1921 |
| 2002/0191797 A1 | 12/2002 | Perlman | |
| 2005/0066175 A1 | 3/2005 | Perlman | |
| 2007/0008108 A1* | 1/2007 | Schurig | G01S 5/0215 |
| | | | 340/539.11 |
| 2007/0030528 A1* | 2/2007 | Quaeler | G06F 16/33 |
| | | | 358/453 |
| 2010/0082831 A1 | 4/2010 | Hans | |
| 2012/0290954 A1 | 11/2012 | Qureshi et al. | |
| 2014/0274172 A1 | 9/2014 | Ludwig et al. | |
| 2014/0282096 A1 | 9/2014 | Rubinstein et al. | |
| 2014/0317543 A1 | 10/2014 | Kim | |
| 2015/0100670 A1 | 4/2015 | Anantharam et al. | |
| 2015/0163536 A1 | 6/2015 | Han et al. | |
| 2016/0042404 A1 | 2/2016 | Joshi et al. | |
| 2016/0063223 A1 | 3/2016 | Raley | |
| 2016/0140335 A1* | 5/2016 | Proulx | G06F 21/45 |
| | | | 726/6 |
| 2016/0381092 A1 | 12/2016 | Dash et al. | |
| 2017/0034173 A1 | 2/2017 | Miller et al. | |
| 2017/0149789 A1 | 5/2017 | Flynn et al. | |
| 2017/0153980 A1* | 6/2017 | Ara jo | H04L 61/6059 |
| 2017/0155732 A1* | 6/2017 | Ara jo | H04L 67/2842 |
| 2017/0188587 A1* | 7/2017 | Juarez | C12R 1/645 |
| 2018/0032212 A1 | 2/2018 | Choi et al. | |
| 2018/0034818 A1 | 2/2018 | Choi et al. | |
| 2018/0124300 A1 | 5/2018 | Brook | |
| 2018/0219812 A1 | 8/2018 | Hanson | |
| 2018/0359811 A1* | 12/2018 | Verzun | H04L 12/28 |
| 2019/0018570 A1 | 1/2019 | Zeng et al. | |

OTHER PUBLICATIONS

Extended European Search Report for European Application No. 18153719, dated May 9, 2018, 6 pages.

* cited by examiner

FIG. 3A
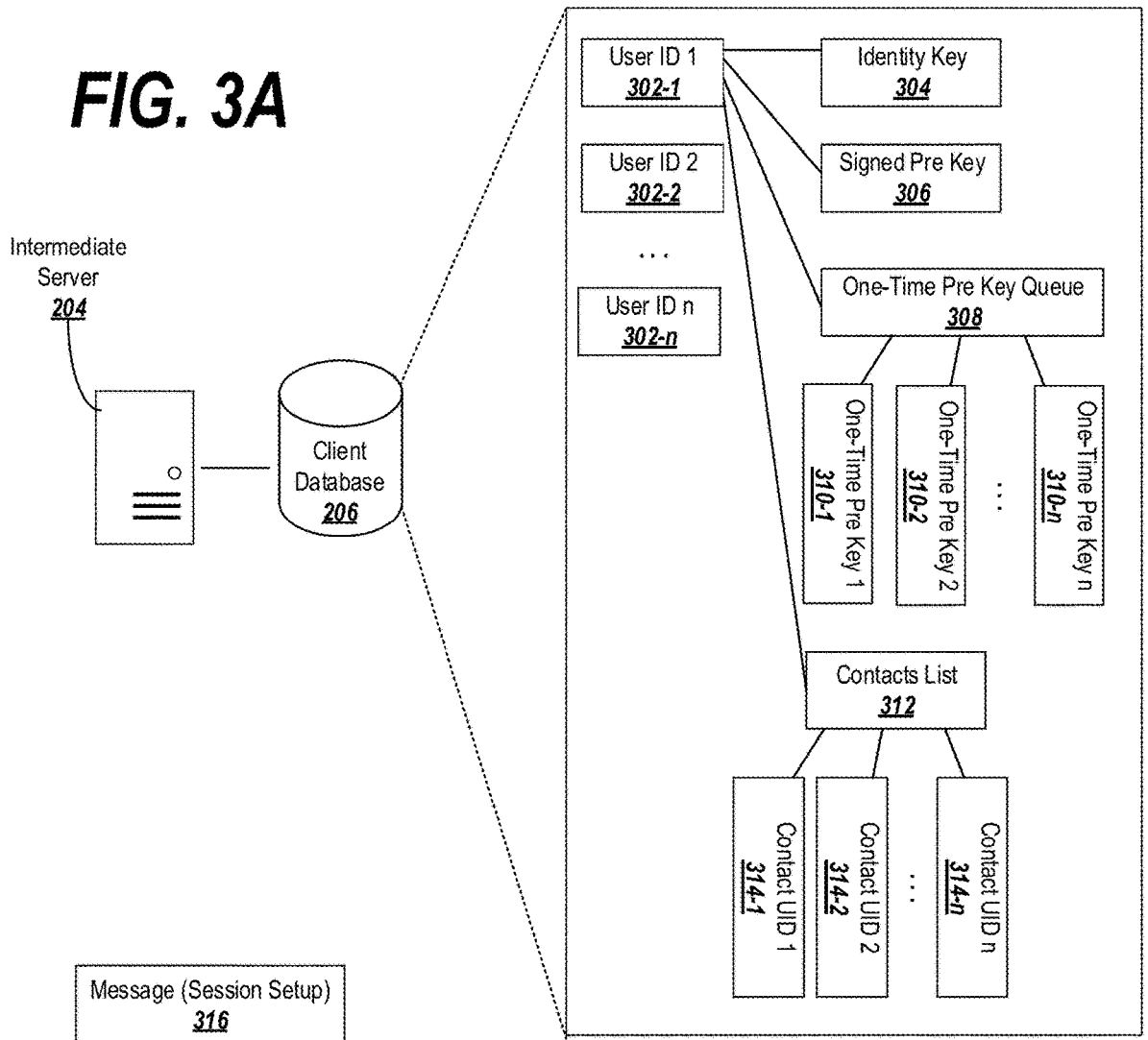
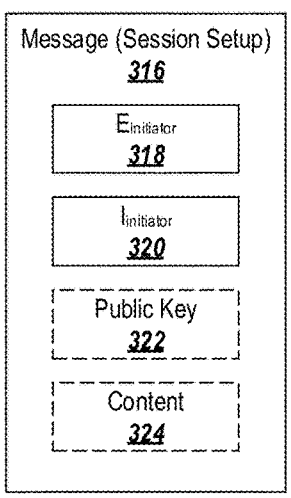
FIG. 3B
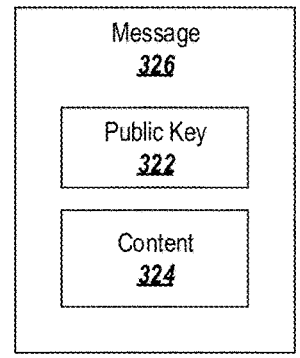
FIG. 3C

Sending Client Logic
500

Content Processing Logic
550

Filtering Logic
650

Centralized Communications System 800

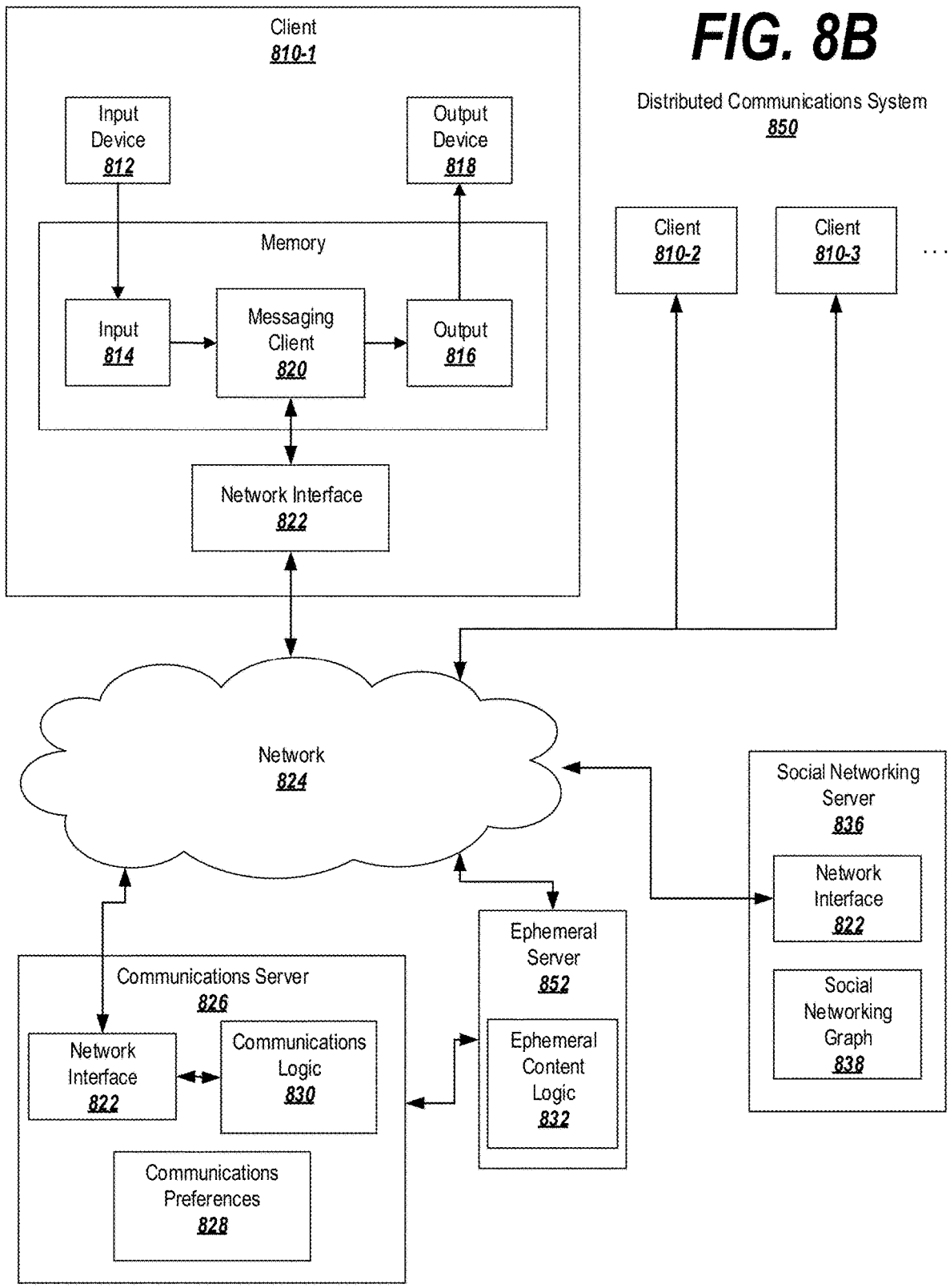

METHODS AND SYSTEMS FOR GENERATING AN EPHEMERAL CONTENT MESSAGE

RELATED APPLICATIONS

This application claims priority to U.S. Provisional Application Ser. No. 62/460,136, filed on Feb. 17, 2017 and entitled "Methods and Systems for Processing an Ephemeral Content Message." The contents of the aforementioned application are incorporated herein by reference.

BACKGROUND

Some services, such as communications services, messaging services, and social networking services, allow users to exchange messages with other users. Some messages, such as update messages, may be broadcast to users of the service who are able to view communications from the sending user (e.g., the sending user's contacts, or the public at large).

BRIEF DESCRIPTION OF THE DRAWINGS

FIG. 1O depicts an exemplary interface displaying an enlarged version of ephemeral content containing a weather report.

FIG. 3A depicts an exemplary data structure representing a client database.

FIG. 3B depicts an exemplary data structure representing a message including session setup information.

FIG. 3C depicts an exemplary data structure representing a message after session setup has occurred.

FIG. 8B is a block diagram providing an overview of a system including an exemplary distributed communications service;

DETAILED DESCRIPTION

Figure 1A:
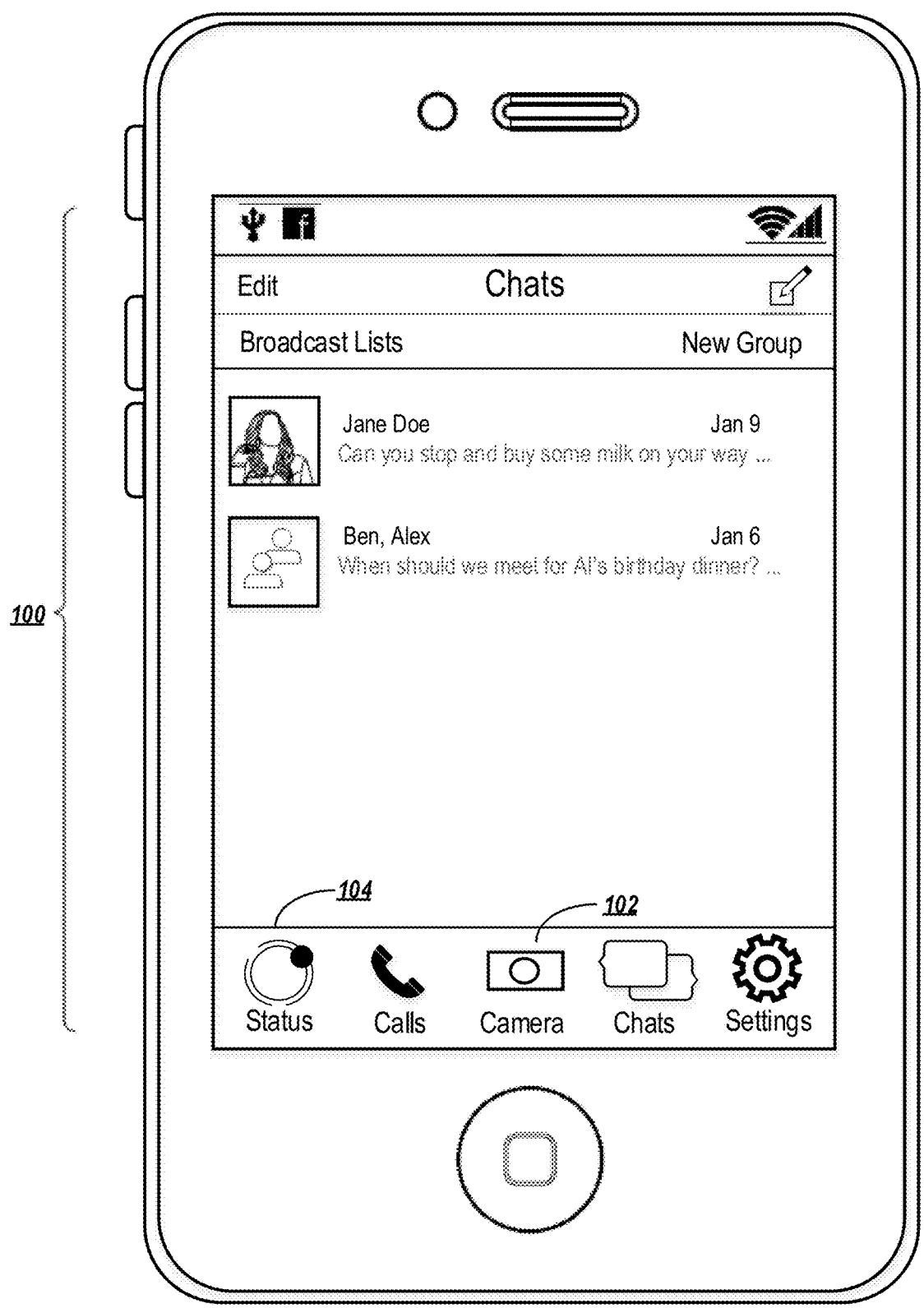
FIG. 1A depicts an exemplary interface for a messaging application.

Exemplary embodiments relate to techniques for generating, processing, and displaying ephemeral content via ephemeral content messages. Ephemeral content messages may be, for example, messages in which ephemeral content is included. Ephemeral content includes content that is configured to be accessible for only a limited period or under limited conditions. When ephemeral content expires, the content may be deleted or may become inaccessible.

Although described in connection with ephemeral content, some techniques described herein, such as the filtering and ranking techniques described, may be employed in connection with ephemeral or non-ephemeral content.

In the context of ephemeral content messages, a number of problems exist with current messaging techniques. For instance, the manner in which content is selected or generated for inclusion in a conventional message may be overly complicated; depending on the type of content, and depending on the manner in which the content is generated, a user may enter send the content to another user of a communications service in different ways. In one example, a user may generate a text-based message in a different manner than a picture-based message. Even within a category, entry points may differ. In another example, a user may generate a picture-based message in one way when selecting a previously-captured photograph, and another way when the user desires to capture a new photograph for the message.

Some communications systems may also allow users to reply to a message including content. One way in which replies may be implemented is to attach the reply to an existing conversation among multiple users, or to start a new conversation having a specified group of users in response to the ephemeral content. However, because the replying user may not be privy to the entire list of recipients to whom the original message was sent, such techniques may cause replies to be sent to additional users that did not receive the initial message transmission. Such behavior may be undesirable from the perspective of the person sending the original content-based message, since that person may wish to exclude certain people from the message or limit the message to a well-defined group.

Furthermore, due to the manner in which content-based messages are broadcast to users, it may be difficult to maintain privacy. For instance, when a content-based message is broadcast, the content-based message is typically transmitted to an intermediate server to handle the broadcasting. Preferably (from the standpoint of privacy), only the sender and the recipient of the content-based message would be able to examine the content of the message. However, when a broadcast message is sent to the server for transmission to receiving clients, it can be difficult to provide the broadcast server with sufficient information to allow the broadcast server to send the message without disclosing information that the sending user wishes to remain safe from interception.

Still further, communications systems may take different approaches to reducing spam or unwanted messages. For example, in a social network, ephemeral content might be sent to those users that have a defined relationship with the sending user (such as friends of the sending user). However, not all messaging services or social networking services incorporate a concept of relationships or friendship. For example, a simple message service (SMS) based system, or another type of contact-based messaging service, may allow a user to send messages to any other recipient based on the recipient's phone number. In these examples, there may not be a defined relationship between users.

In a system involving defined relationships, the system may avoid spam communications by only allowing users to communicate with each other (or to communicate with each other in a preferred form) if the users have a relationship. For example, a person may only see content-based messages of their own friends. This may not be possible in a communications system that does not rely on a defined concept of friendship.

Yet another issue with communications systems providing ephemeral content capabilities is that the interfaces of such systems can become jumbled, and it may be difficult to discern ephemeral content messages from other types of messages. For example, in a communications system that allows users to submit posts, ephemeral content may be displayed among the posts. Similarly, in a messaging-based system, ephemeral content may be displayed among the messages. However, because ephemeral content is typically used to convey different kinds of information as compared to posts or messages, a user desiring to check on the ephemeral content of their contacts may not wish to sift through large numbers of posts or messages in order to see their contacts' ephemeral content.

Similarly, when ephemeral content is mixed with messages, one straightforward technique for displaying the ephemeral content would be to arrange it among the messages in the order that each respective message/unit of ephemeral content was received. Although chronological ordering may make sense for messages, users are often more interested in certain ephemeral content as compared to others (e.g., from their family or close friends, as opposed to general acquaintances). Thus, purely chronological ordering of ephemeral content may not produce a particularly useful display of the ephemeral content.

Furthermore, when an ephemeral content message includes media (e.g., a picture, a video, etc.), it may be difficult to ensure that a receiving user is able to access the media while preserving end-to-end encryption. Moreover, ephemeral content messages may be broadcast to a relatively large number of people. In some ephemerality models, the ephemeral content may expire at different times for different recipients. It may be difficult to make the ephemeral content available to some users for whom the ephemeral content has not yet expired, while making the content unavailable to other users for whom the ephemeral content has expired.

Another issue that can arise in communications systems that provide ephemeral content is the problem of maintaining privacy for previously-transmitted ephemeral content. In some systems, users perform an operation to receive updates about other users. For example, in a social networking service, one user may become friends with another user or may follow the user in order to see the user's statuses. Such a configuration is referred to as a follow model.

In a follow model, the ephemeral content that a sending user submits prior to being followed by a new user may become visible to the new user when the new user follows the sending user. In other words, ephemeral content sent before the two users became connected may become visible after the connection is made. This behavior may be undesirable for some users, who may wish to maintain their previous ephemeral content as private from new followers.

The follow model may also give rise to problems in preserving end-to-end encryption of ephemeral content messages. Because many of the parameters (e.g., message keys) used to encrypt ephemeral content messages are decided at the time that the message is sent, it may not be possible to maintain strong encryption if the ephemeral content message is later made available to new followers. If encryption is to be maintained, new encryption sessions may need to be generated post hoc, adding to the overhead of the communications system.

To address these and other issues, exemplary embodiments provide new techniques for sending ephemeral content messages for a communications or messaging service. Streamlined entry points are provided for initially generating a message including content (such as ephemeral content), and for replying to ephemeral content messages previously sent. Initial entry points focus on a limited number of clearly-defined use cases, regardless of the type of the content or how the content was originally generated.

Initial entry to the ephemeral content message functionality may be provided by two clear and streamlined use cases, regardless of how the media is initially captured. The system may present the user with an option to share media in an ephemeral content message, or to share the media in a non-ephemeral content message, such as in a conversation or chat. Accordingly, the problem of identifying the appropriate entry point based on the type of media generated is alleviated. Many different types of media can be used as ephemeral content, including images such as photos and GIFs, videos, weather reports, news, text, tags, PTT or voice messages, etc.

The ephemeral content may be sent as a message in order to preserve end-to-end encryption. Various aspects described herein facilitate the encapsulation of the ephemeral content as a message, and further provide techniques for sharing media in connection with the message in a manner that is efficient but still preserves the privacy of the sending user.

When a user replies to ephemeral content, the reply may trigger a one-to-one chat between the originating user and the replying user. Accordingly, the privacy of the originally sending user is preserved. Alternatively, ephemeral content may be initially sent to a group (instead of the user's entire contacts list) and replies may be sent back to the group. Such an embodiment continues to preserve the sending user's privacy, since only the original group members that the sending user chose to share the ephemeral content message with are included in the conversation. To facilitate group communications, the server may examine the group's membership and verify that an encrypted session exists between each member of the group.

Further embodiments, which may be used in conjunction with the embodiments described above, relate to procedures for transmitting an ephemeral content message through a communications network.

Initially, the sending client may establish an end-to-end encrypted session with possible recipients of the ephemeral content (e.g., the user's contacts list, or a selected group) and may provide a first key during initial setup. The client sends the message to the recipients through a server using the encrypted session. The message includes encrypted content, which may be a thumbnail of a media item and a link or pointer to the media item, and a second key for decrypting the media item.

The recipient decrypts the content using the first key, retrieves the second key from the message, and uses the second key to decrypt the encrypted content. The server (or an outside user) is not able to retrieve the encrypted portion of the message because the server (or the outside user) does not possess the first key sent during initial setup of the encrypted session (therefore, the server or outside user cannot retrieve the second key that decrypts the content).

The server may receive a list of intended recipients from the sending user, and filters the list to reduce spam or unwanted messages. For example, the server filters out those users without a symmetric relationship to the sender, or any users the sender blocks or who are blocked by the sender. Because the server filters the potential recipients based on symmetry, no concept of friendship or a defined relationship between users is needed in order to reduce unwanted messages.

The sending client may cycle the second key each time the recipient list changes from the perspective of the client. This decision is made at the time the ephemeral content is transmitted; in some embodiments, the ephemeral content is not retransmitted when a new symmetrical relationship is created (e.g., when a user in the sender's contacts list adds the sender to their own contacts list after transmission of the ephemeral content).

Because ephemeral content is directed to potential recipients by the sender, and because new contacts do not retrieve or access previous ephemeral content, exemplary embodiments may implement a directed model of sharing ephemeral content, rather than the follow model described above. Thus, sending users have more control over who sees their ephemeral content, and when.

Further embodiments, which may be used in conjunction with the embodiments described above, relate to techniques for displaying and interacting with ephemeral content.

Although the ephemeral content is transmitted as a message (in order to preserve encryption), the message may be tagged with a flag that designates it as ephemeral content. Recipient clients know to show the contents of the message as ephemeral content instead of a regular message when the flag is present.

Ephemerality of content may be implemented by packaging the ephemeral content message with a thumbnail of a media item and a link or pointer to the media item stored on a server. When the ephemeral content expires (e.g., in 24 hours, after 1 or 2 views, etc.), the thumbnail remains in the messaging history, but the link may become inactive. While the link is active, the user may select the link to go into a full-screen presentation of the ephemeral content.

Different media types may be associated with different types of full-screen presentations. For example, a location update may bring up an image with map data indicating the tagged location.

When the ephemeral content expires, the link may become inactive. A user attempting to access the inactive link may be unable to access the media item. Nonetheless, the media item may continue to reside on the server and remain available for those users whose link remains active. Thus, the link may become inactive for different users at different times.

Ephemeral content may be provided in the UI on a separate tab as compared to non-ephemeral content. Displayed ephemeral content from different users may be ranked based on an interest score and displayed in the ranked order. The interest score may be calculated based on, e.g.: (1) who's ephemeral content has been viewed previously; (2) the percentage of ephemeral content from a particular user that has been viewed; (3) who's ephemeral content has been viewed on a regular basis (e.g., every day/week/month); (4) which ephemeral content is recent; etc. The ephemeral content may be displayed in the separate tab(s) in the ranked order. Accordingly, the ephemeral content need not be mixed with messages or posts, and the problem of a crowded or jumbled display may be addressed. Moreover, the rankings may allow a user to quickly find interesting or high-priority ephemeral content without the need to sort through ephemeral content in which the user may have less interest.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1A depicts an exemplary interface 100 for a communication application. The communication application may allow the user to exchange communications, such as messages and ephemeral content, with other users of a communications service. The interface may display messages organized into conversations/chats.

A conversation or chat may be associated with a conversation identifier that identifies the conversation or chat. The conversation identifier may further be associated with a group of participants that participate in the conversation.

A user may contribute to a conversation/chat by sending a message using the interface 100. For example, the interface 100 may include a composition indicator for composing a new message. When composing a new message, an interface may be presented allowing the user to target the new message to an existing conversation, and/or to specify a set of recipients. If the specified set of recipients corresponds to a set of recipients for whom a conversation already exists, the message may be targeted to the existing conversation. If not, a new conversation may be created between the specified recipients. The message may be tagged with the conversation ID of the identified conversation.

The interface 100 may display recent conversations and information about the conversation (e.g., participants, a snippet of the most recent message, a time and sender of the most recent message, etc.).

The interface 100 may include a menu or interactable elements allowing functionality of the communication to be accessed. For example, the exemplary interface 100 includes a camera icon 102 allowing a camera interface to be accessed for capturing a photograph or video. The interface 100 further includes an ephemeral content icon 104 allowing ephemeral content to be generated and/or viewed. These elements are exemplary, and in other embodiments other types of elements may be present. For example, in addition to or in place of the camera icon 102, one or more media icons may be provided for generating, accessing, or selecting different types of media.

Figure 1B:
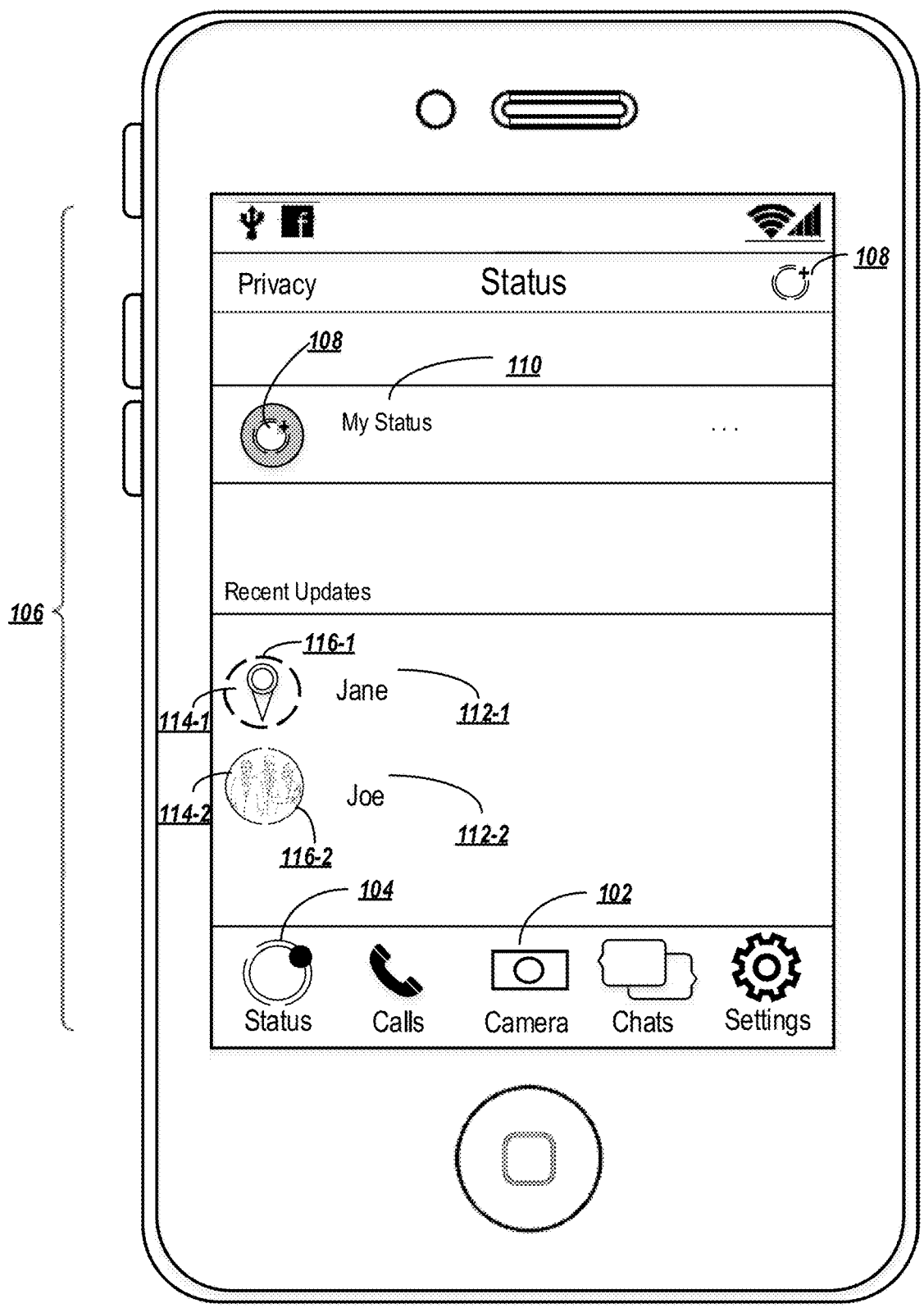
FIG. 1B depicts an exemplary interface for sharing ephemeral content.

FIG. 1B depicts an exemplary ephemeral content interface 106 displayed upon receiving a selection of the ephemeral content icon 104. The ephemeral content interface 106 may provide a location for interacting with ephemeral content shared by users of the communications service, which is distinct from interfaces for viewing other types of content (e.g., non-ephemeral messages, posts, etc.).

Figure 1C:
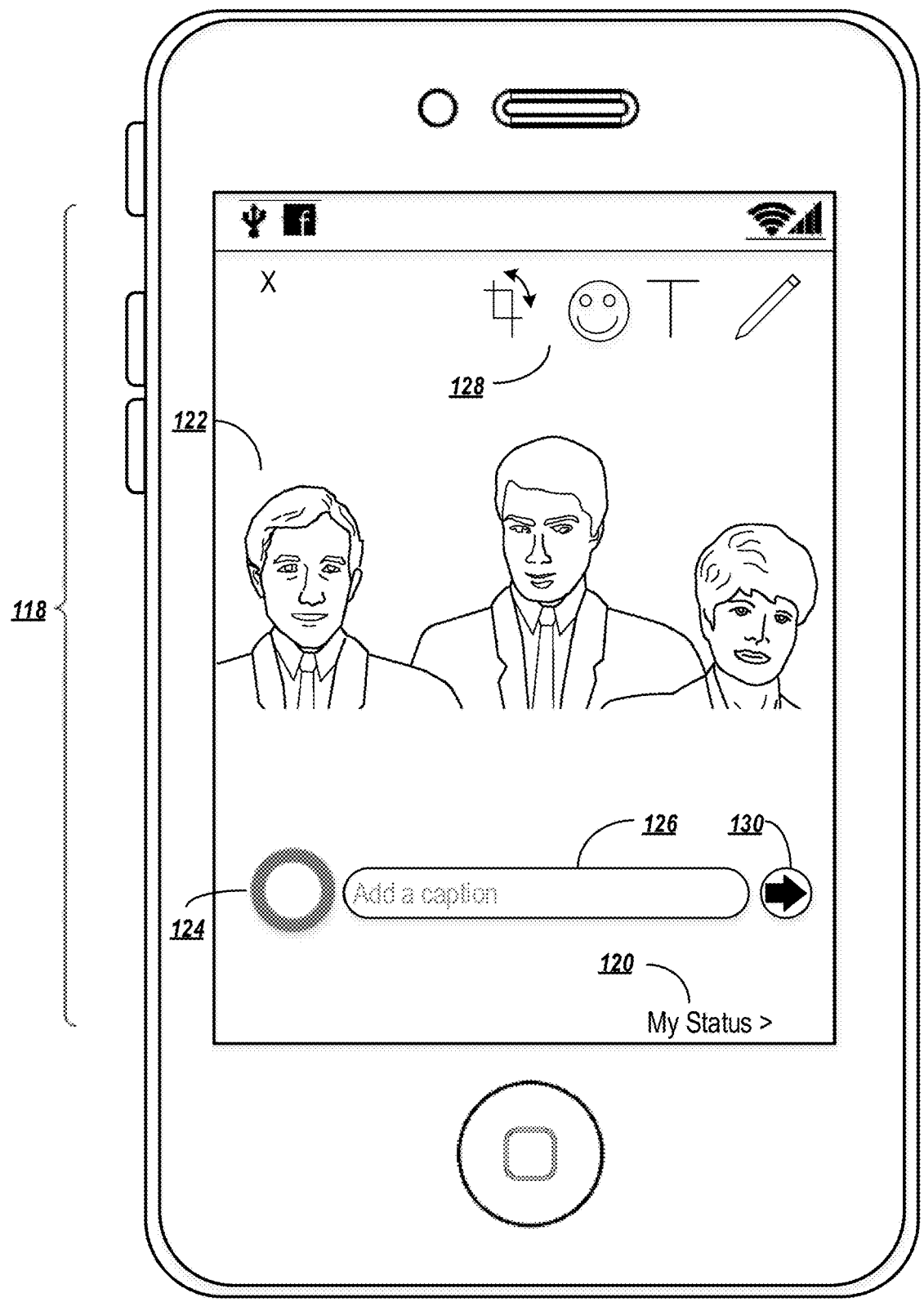
FIG. 1C depicts an exemplary interface for capturing ephemeral content to be shared.

The ephemeral content interface may include an interactable element 108 allowing new ephemeral content to be generated or selected. Upon selecting the interactable element 108, the application may display an interface for generating or selecting content. For example, selecting the interactable element 108 may cause a camera interface to be displayed, as shown in FIG. 1C in order to generate new photo or video content. Alternatively or in addition, selecting the interactable element 108 may cause a menu to be displayed, similar to the menu shown in FIG. 1L, for generating new ephemeral content or for selecting existing content to be shared in an ephemeral content message.

The ephemeral content interface 106 may include an interface portion 110 for displaying recent ephemeral content that has been shared by the current user. If the current user has not recently (e.g., within a predetermined period of time) shared any ephemeral content, or if all ephemeral content shared by the user has expired for each recipient with whom the content was shared, then an interactable element 108 may be displayed in the interface portion 110 to indicate that the user does not have any actively shared ephemeral content.

Another portion of the interface 106 may display ephemeral content items 112-i available to the current user (e.g., ephemeral content shared with the current user by other users). The ephemeral content items 112-i may include an identifier for the user that generated the ephemeral content item 112-i, and may include a display of a thumbnail 114-i of the ephemeral content item 112-i. The thumbnail 114-i may include a representation of the ephemeral content, such as a reduced-size version of the content, a portion of the content, a low-quality version of the content, etc. The thumbnail 114-*i* may be associated with a link or pointer to the content.

Selecting the thumbnail while the link or pointer is active may cause a full-screen or enlarged display of the content to be shown.

In order to implement ephemerality, the link may be made inactive under certain conditions. For example, the link may be active for a certain number of views (e.g., one or two views), or may be active for a certain period of time (e.g., a predetermined period of time, such as 24 hours, from when the content is first sent, or a predetermined period of time, such as 24 hours, from when the content is first accessed in the full-screen or enlarged size by the receiving user). The conditions under which the link remains active or becomes inactive may optionally be configured by the sending user.

The thumbnail 114-*i* may include an indicator 116-*i* indicating whether the link is active or inactive. For example, the indicator 116-*i* may be a ring around the thumbnail 114-*i* that changes color depending on the link status (e.g., green or blue for active, black or red for inactive) or otherwise changes or disappears when the link becomes inactive. The indicator 116-*i* may otherwise graphically distinguish the status of the content (e.g., appending a checkmark for an active link, generating a glow effect around an active link, etc.).

In some embodiments, the indicator 116-*i* may also indicate other information about available ephemeral content. In the example depicted in FIG. 1B, the ring of each indicator 116-*i* is broken into a number n of segments. The number of segments of the indicator 116-*i* may represent a number of content items available from or associated with the user identified in conjunction with the thumbnail 114-*i*. For example, the indicator 116-1 indicates that six ephemeral content items are currently available from the user Jane. Meanwhile, the indicator 116-2 indicates that two ephemeral content items are currently available from the user Joe. The thumbnail 114-*i* displayed may correspond to a most-recent content item available from the identified user.

Although only a single portion of the interface 106 is dedicated to other users' ephemeral content in the example depicted in FIG. 1B, in some embodiments the ephemeral content may be displayed in multiple different tabs or portions. For example, a first portion may be dedicated to important ephemeral content or ephemeral content that the communications service determines are likely to be of interest to the user. Such a portion may include a predetermined number of highly-ranked ephemeral content items, which may be ranked according to an interest score as described in more detail below. A second portion may be dedicated to recent ephemeral content items, such as a predetermined number of recently received ephemeral content items, regardless of how the ephemeral content items would be ranked.

As noted above, upon selecting the interactable element 108, an interface may be displayed for generating ephemeral content. One example of such an interface 118 is depicted in FIG. 1C.

The exemplary interface 118 allows a user to capture a photo or video (although exemplary embodiments are not limited to capturing a photo or video, but may also relate to sharing a previously captured photo or video, or generating or selecting other types of media). The interface 118 may also be displayed when the user selects the camera icon 102 in any interface.

When the interface 118 is entered via the ephemeral content interface 106, an indicator 120 may be displayed to designate that the content is being captured as ephemeral media. Interacting with the indicator 120 may cause the interface to revert to the ephemeral content interface 106 without capturing new content. On the other hand, when the interface 118 is entered via the camera icon 102, the content captured may be non-ephemeral (and/or may be made ephemeral at a later time); accordingly the indicator 120 may not be shown in this case.

The interface 118 may include a preview portion 122 displaying the media that would be captured upon interacting with a capture button 124 (e.g., a live preview from a camera). Upon receiving a selection of the capture button 124, the media displayed in the preview window 122 may be captured. In some embodiments, the capture button 124 may be a multi-functional capture button. In such embodiments, interacting with the capture button 124 in one way (e.g., a tap) may cause one type of media, such as a photograph, to be captured, while interacting with the capture button 124 in another way (e.g., a sustained hold) may cause another type of media, such as a video, to be captured. The interface 118 may also or alternatively include various icons for selecting between capture types (e.g., a photograph versus audio versus video).

The interface 118 may include a caption bar 126 for adding a textual caption to the media, and controls 128 for manipulating the media. For example, when the media being captured is a photograph, photo editing tools may be provided, as well as tools for adding images, text, or drawings to the photograph.

Once the media is captured, manipulated, and/or captioned, a user may interact with a finalize element 130 to finalize the media as ephemeral content and share the ephemeral content via an ephemeral content message. In some embodiments, interacting with the finalize element causes the media to be sent as ephemeral content to a set of recipients as defined by the sending user's privacy settings (see FIG. 1F).

Figure 1D:
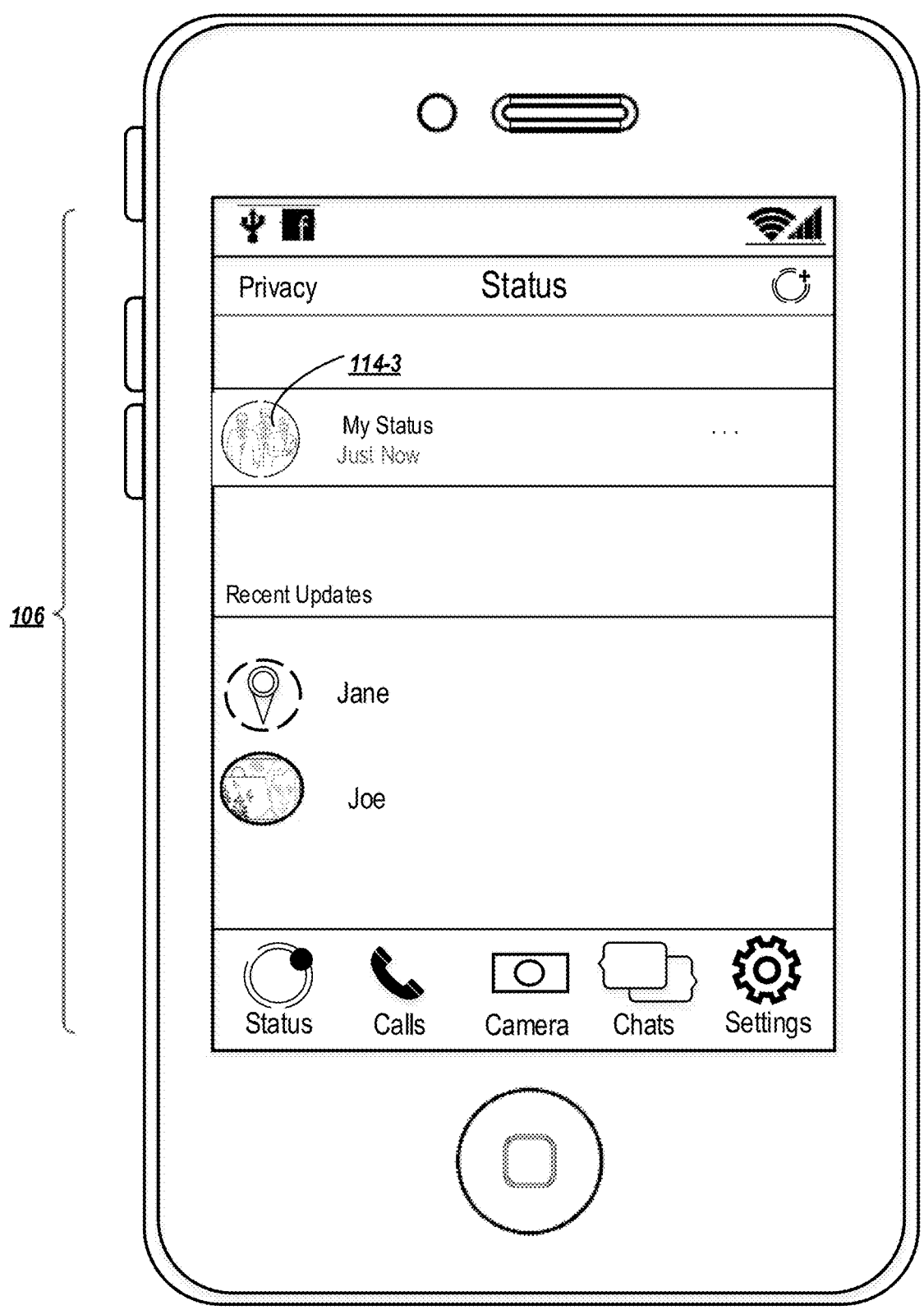
FIG. 1D depicts the interface of FIG. 1B after sharing ephemeral content.

Once the content has been shared, the application may revert to the ephemeral content interface 106, as shown in FIG. 1D. In this case, the first portion of the interface may be updated to indicate that the user has recently shared ephemeral content. For example, a thumbnail 114-3 of the recently shared content may take the place of the interactable element 108 in the first portion. Alternatively, if content was previously shared, the thumbnail 114-3 may be updated to show the most recent shared content.

Figure 1E:
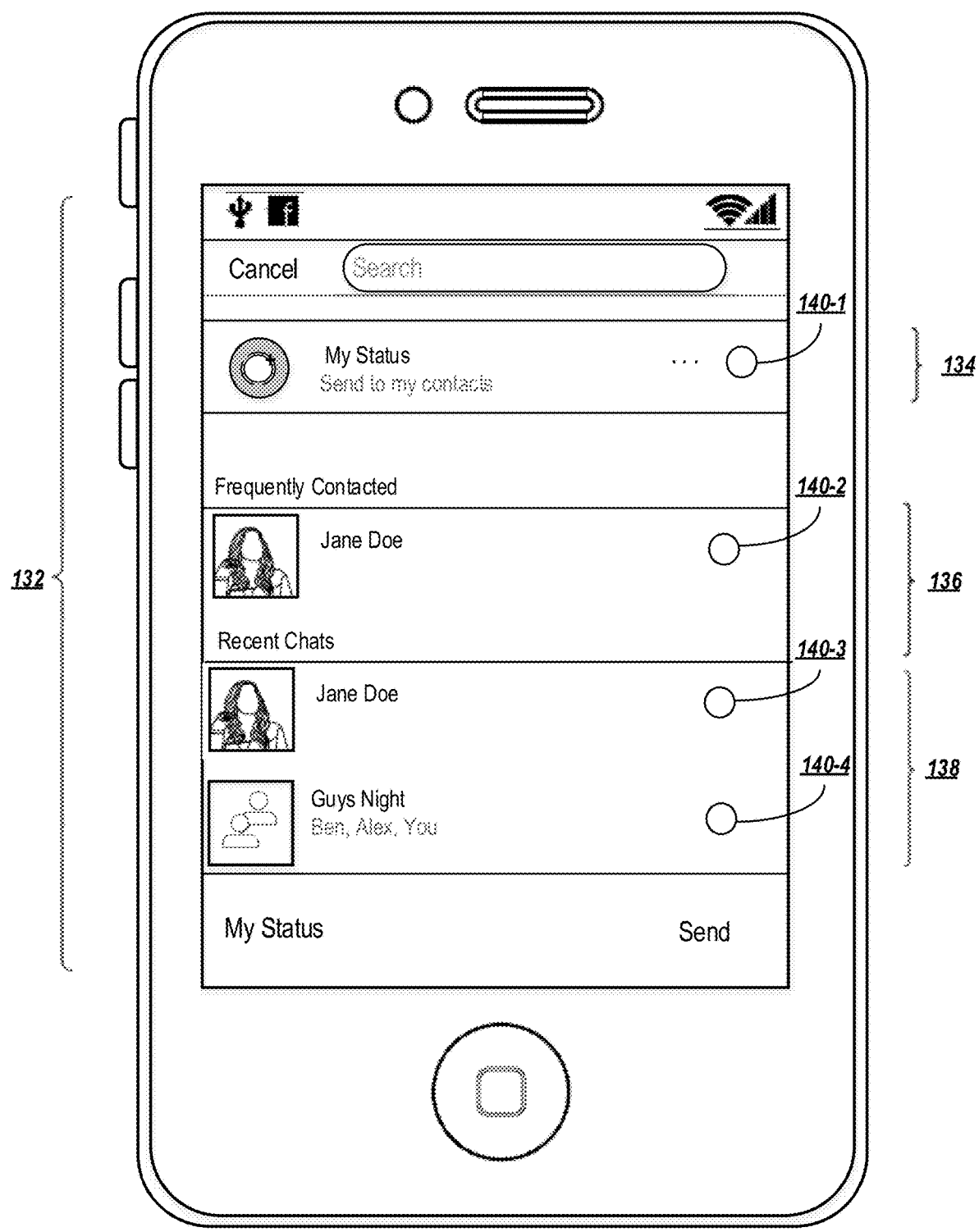
FIG. 1E depicts an exemplary interface for selecting recipients of ephemeral content.

In some embodiments, capturing or selecting media (e.g., as was done in FIG. 1C) may cause a sharing interface 132 to be displayed, as shown in FIG. 1E. The sharing interface 132 may include a first portion 134 allowing the sending user to transmit the media as ephemeral content to a selected group of users in the sender's contacts list. The group of users may be configured through the user's privacy settings as discussed below.

The sharing interface 132 may present a second portion 136 allowing the user to share the media with frequently contacted parties. The parties may include individual users or groups of users, who may be selected based on which individuals or groups the user has most frequently communicated with over a predetermined period of time (e.g., the past week, month, etc.). A third portion 138 may similarly allow the user to share media with individuals or groups that the user has recently communicated with (e.g., the n most recent communication threads in which the user has participated).

Selection elements 140-*i* may be provided in connection with each potential entity with whom the media may be shared. Upon selecting the selection elements 140-*i*, the selection elements may be updated to indicate that the entity has been selected for inclusion. The user may select multiple different entities to receive the content.

When the media is shared with entities in the second portion 136 or the third portion 138, the media may be shared as non-ephemeral content and may be added to a conversation corresponding to the selection. Alternatively, depending on the sending user's settings, the content may be shared into the selected conversations as ephemeral content.

In some embodiments, when the media is shared with entities in the second portion 136 or the third portion 138, corresponding ephemeral content messages to the designated recipients may be deemed group messages and replies to the ephemeral content messages may be added to a group conversation with the respective recipients as appropriate. Such a message may be flagged or designated as a group message. On the other hand, when the media is shared with entities using the first portion 134 of the interface, a corresponding ephemeral content message may be deemed a broadcast and replies to the ephemeral content message may be added to a one-on-one conversation between the sender and the replier. The message may be flagged or designated as a broadcast.

Figure 1F:
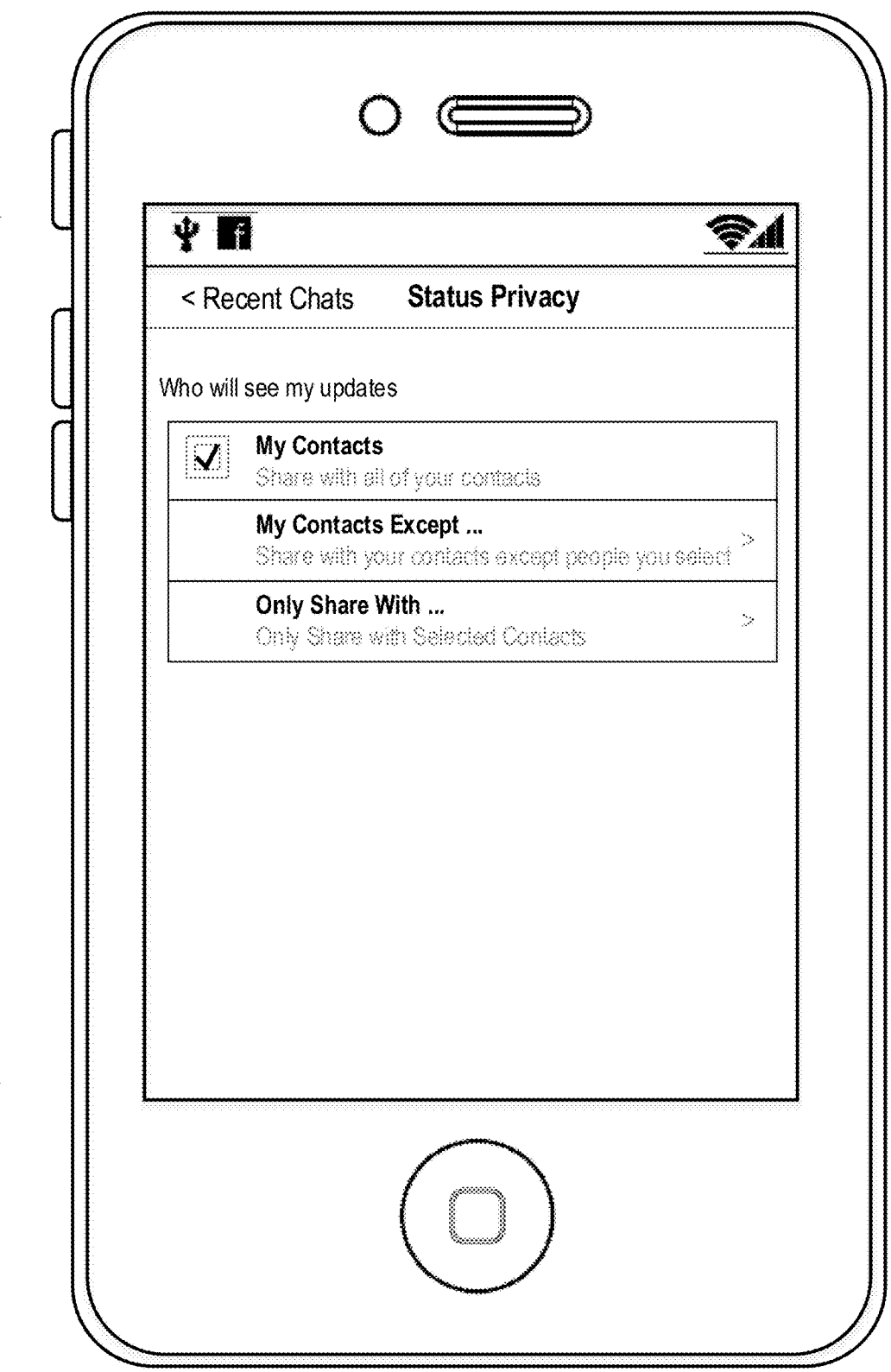
FIG. 1F depicts an exemplary interface for changing privacy settings to determine which users receive shared ephemeral content.

When the media is shared using the selectable element 140-1 in the first portion 134 of the interface 132 (corresponding to ephemeral content sharing option), the media may be transmitted to a predefined set of users as ephemeral content. The predefined set of users may be set or adjusted through the user's privacy settings. For example, upon selecting the " . . . " indicator in the first portion 134, the user may be presented with a privacy interface 142, as shown in FIG. 1F.

In the privacy interface 142, the user may select between different sharing options for sharing the media as ephemeral content. For example, the user may select a "my contacts" option for broadcasting the ephemeral content to each of the contacts in the user's contacts list or address book. The user may also be presented with an option to share the content with each of the contacts in the contacts list, except for a selected subset of excluded users. Selecting or interacting with this option may cause an interface to be displayed allowing the sending user to select contacts for exclusion from the transmission. In yet another option, the user may be permitted to select a subset of contacts from the contacts list with whom the content should be shared. Selecting or interacting with this option may cause an interface to be displayed allowing the sending user to select contacts for inclusion in the transmission.

When the media is transmitted as ephemeral content using the ephemeral content sharing option of the first portion 134 as shown in FIG. 1E, the media may appear in the receiving users' ephemeral content interfaces 106 (FIGS. 1B and 1D). When the media is shared to a group or individual, the media may appear as a message in a conversation between the sending user and the group or individual, as shown in the conversation interface 144 of FIG. 1G.

In this example, a message 146 is added to the conversation with ephemeral content. The message 146 may indicate that the content is ephemeral (in this example, the message is distinguished from a typical message with the inclusion of a header stating "John's Status"). The message may display a thumbnail 114-4 of the content, and may display an indicator 116-4 indicating that ephemerality status of the content (e.g., a blue ring if the content is available, or a black ring if the content is not available).

A recipient viewing the conversation interface 144 may interact with the thumbnail 114-4, if the content remains available. Interacting with the thumbnail 114-4 may cause a full-screen (or enlarged size) version of the content to be displayed in a visualization interface 148, as shown in FIG. 1H.

The visualization interface 148 may display a full- or high-resolution version of the image or video (e.g., as compared to the thumbnail version). The interface 148 may include a selectable option to exit the full-screen presentation (e.g., a "back" button), which may return the user to the previous interface. In some embodiments, entering or exiting the full-screen presentation may trigger an action (such as incrementing a view counter or starting a timer) related to the ephemerality of the content. For example, if the content is intended to be available for a limited number of views, then opening the full-screen presentation may increment a view counter, which may be checked each time before the full-screen presentation is accessed to determine whether the content remains available (e.g., if the current number of views is less than a predetermined threshold number of views). If the content is intended to be available for a limited amount of time from when it is first viewed (e.g., 24 hours), then opening the full-screen presentation may start an ephemerality timer, which may be checked each time before the full-screen presentation is accessed to determine whether the content remains available (e.g., when the timer has not yet expired). In some embodiments, exiting the full-screen presentation may cause any local copies of the media stored on the device to be deleted.

Any full-screen presentation of ephemeral content may optionally include indications 150 of other available ephemeral content from the same user. In this case, a number of status bars 150-1, 150-2 are displayed, where the number corresponds to the number of available (e.g., unexpired) ephemeral content items that the current (receiving) user can access from the sending user. The number of status bars 150 may correspond to the number of lines in the border 116 displayed in connection with the thumbnail 114 (see, e.g., FIG. 1B).

Optionally, the ephemeral content displayed in the interface 148 may be displayed for a predetermined period of time. A timer may be started when the full-screen view is entered, and upon expiration of the timer, the system may advance the displayed ephemeral content to the next available ephemeral content. A status bar 150-1 corresponding to the current ephemeral content item may change in appearance to reflect the amount of time remaining on the timer. In this example, a portion of the status bar 150-1 corresponding to the percentage of time elapsed may be represented in a different color. The portion may grow in size as the timer runs, until at the predetermined threshold time the portion occupies substantially all of the status bar 150-1. When the displayed ephemeral content subsequently advances, one of the status bars 150 may be eliminated and the display may be updated (e.g., to resize and/or re-center the remaining status bars 150).

Further optionally, an interaction with the interface 148 may manually advance the displayed ephemeral content (e.g., moving to the next available ephemeral content item). For example, the interface 148 may register an interaction such as a tap or swipe, causing the content to advance.

The system may initially display a most recent ephemeral content item for a given sending user in the interface 148. When advancing automatically or manually, the next ephemeral content item displayed may correspond to a next-most-recent ephemeral content item available from the same sending user. When the last available ephemeral content item for a given sending user is displayed, the system may display the most recent ephemeral content item for a next sending user (e.g., the next-highest ranked user or the user who sent the next-highest-ranked ephemeral content item, as determined by the ranking logic described herein).

The full-screen presentations may also provide an option 152 to reply to the ephemeral content. In this example, interacting with the option 152 may cause a reply interface to be displayed, as shown in FIG. 1I.

In the reply interface, a preview bar 154 may be displayed, showing preview of the reply as entered (e.g.) through a keyboard or other input device. Optionally, a media element 156 may be presented for replying to the ephemeral content with media (e.g., a picture, a video, audio, a location, etc.). When the reply is finalized, a user may interact with a finalize element 158 to transmit the reply.

Other means of replying to the ephemeral content (e.g., by selecting an option to reply to the ephemeral content in the conversation interface 144, or in the ephemeral content interface 106) may also allow a reply to be generated.

According to some embodiments, a reply to a broadcast ephemeral content message may be added as a one-to-one conversation between the original sender of the ephemeral content message and the recipient generating the reply (even if the ephemeral content originally was transmitted to a selected group or as a broadcast). If no conversation currently exists between these users, a new conversation may be generated. The conversation may rely on an encryption session established when the ephemeral content message was transmitted from the sender to the recipient.

Figure 1G:
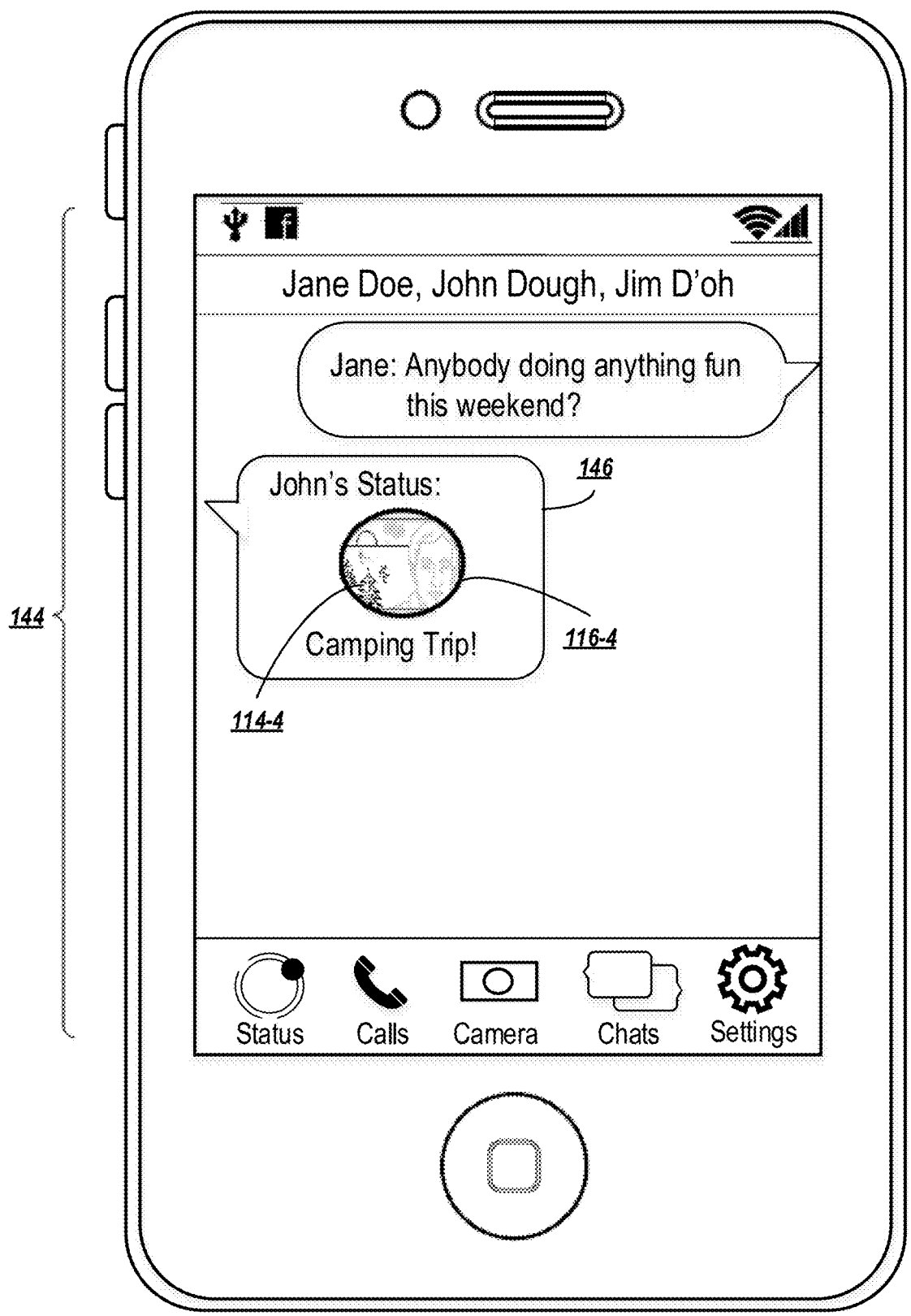
FIG. 1G depicts an exemplary interface for viewing ephemeral content in a conversation in the messaging service.
Figure 1H:
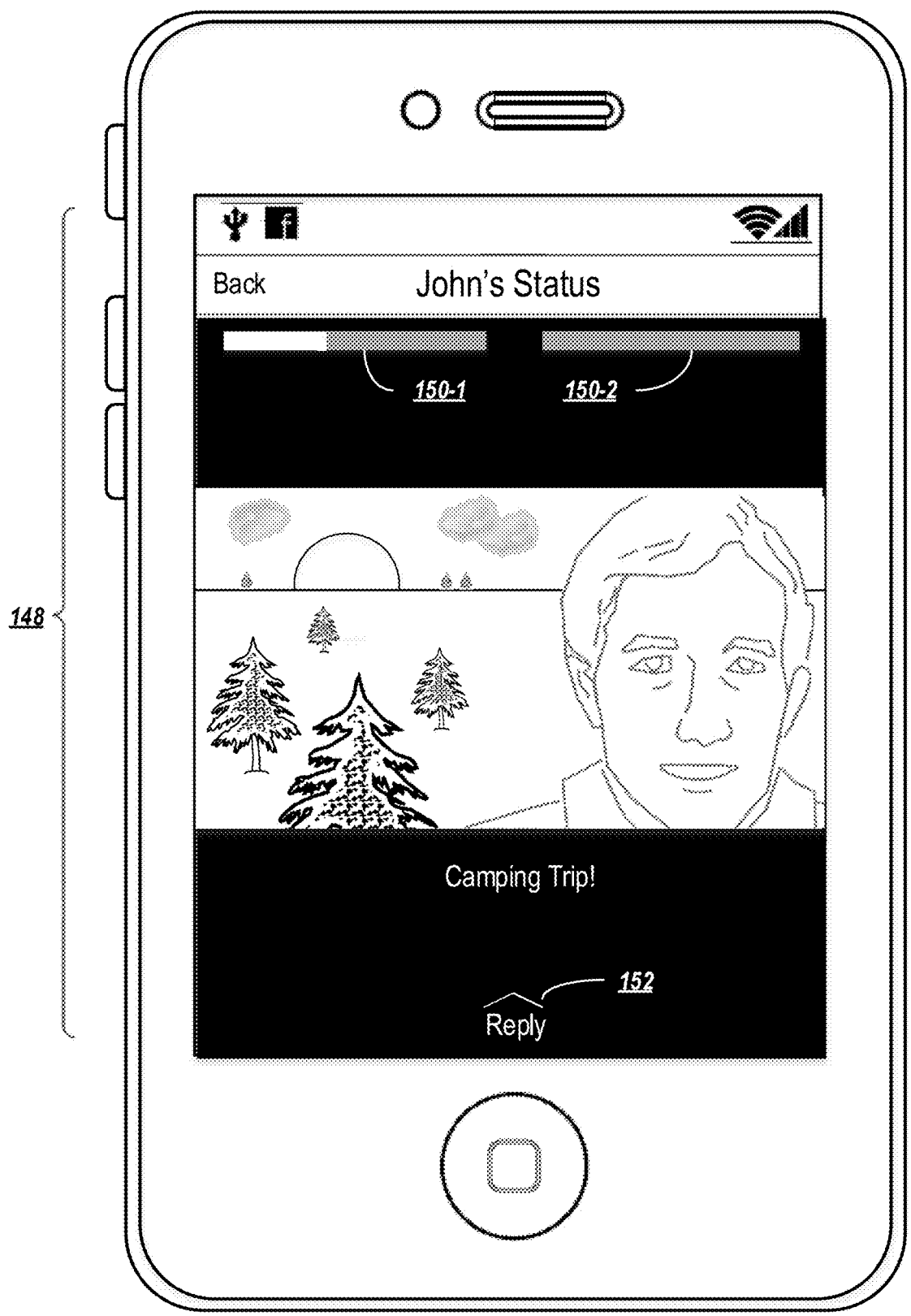
FIG. 1H depicts an exemplary interface displaying an enlarged version of ephemeral content containing an image or video.
Figure 1I:
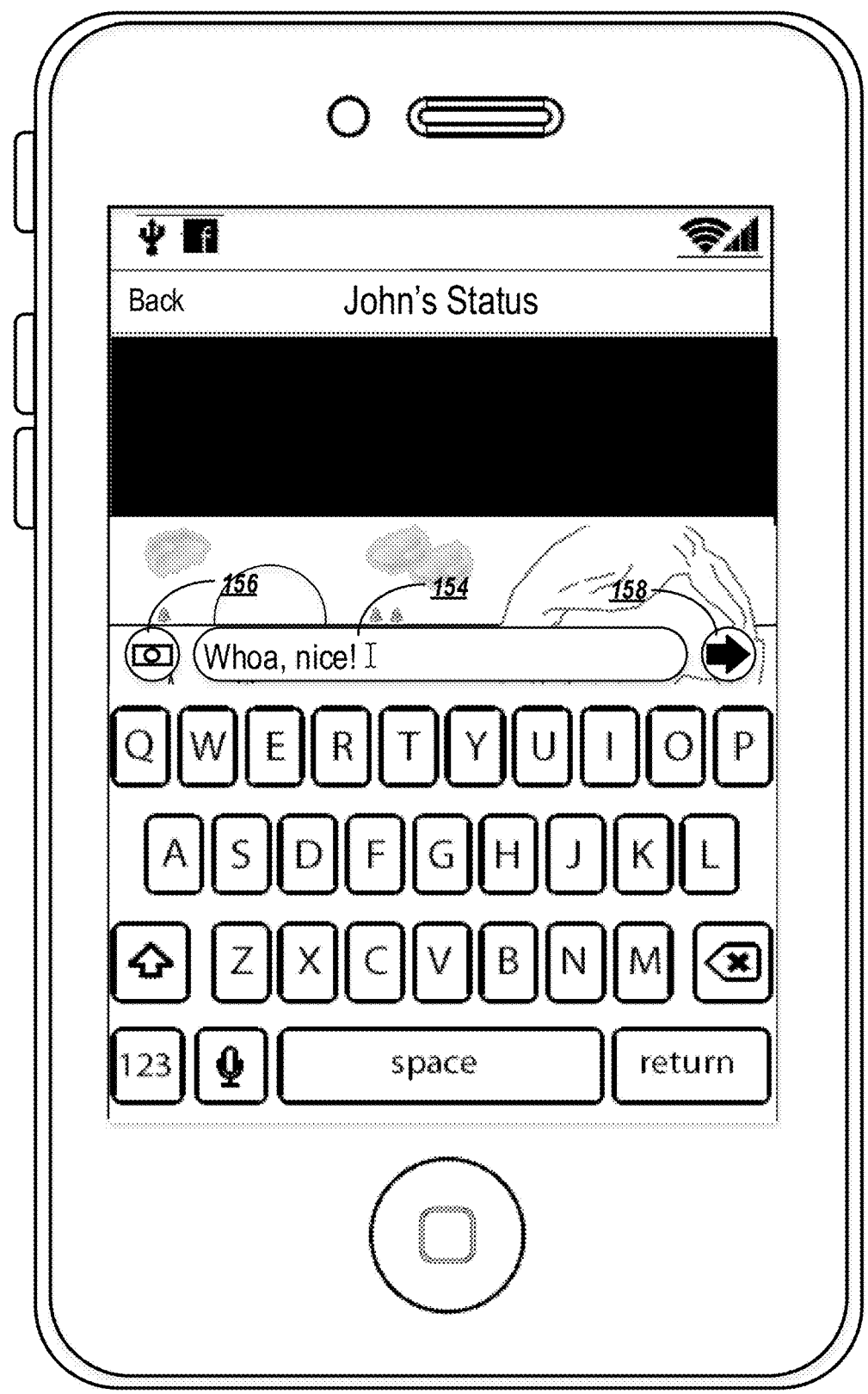
FIG. 1I depicts an exemplary interface for replying to ephemeral content containing an image or video.
Figure 1J:
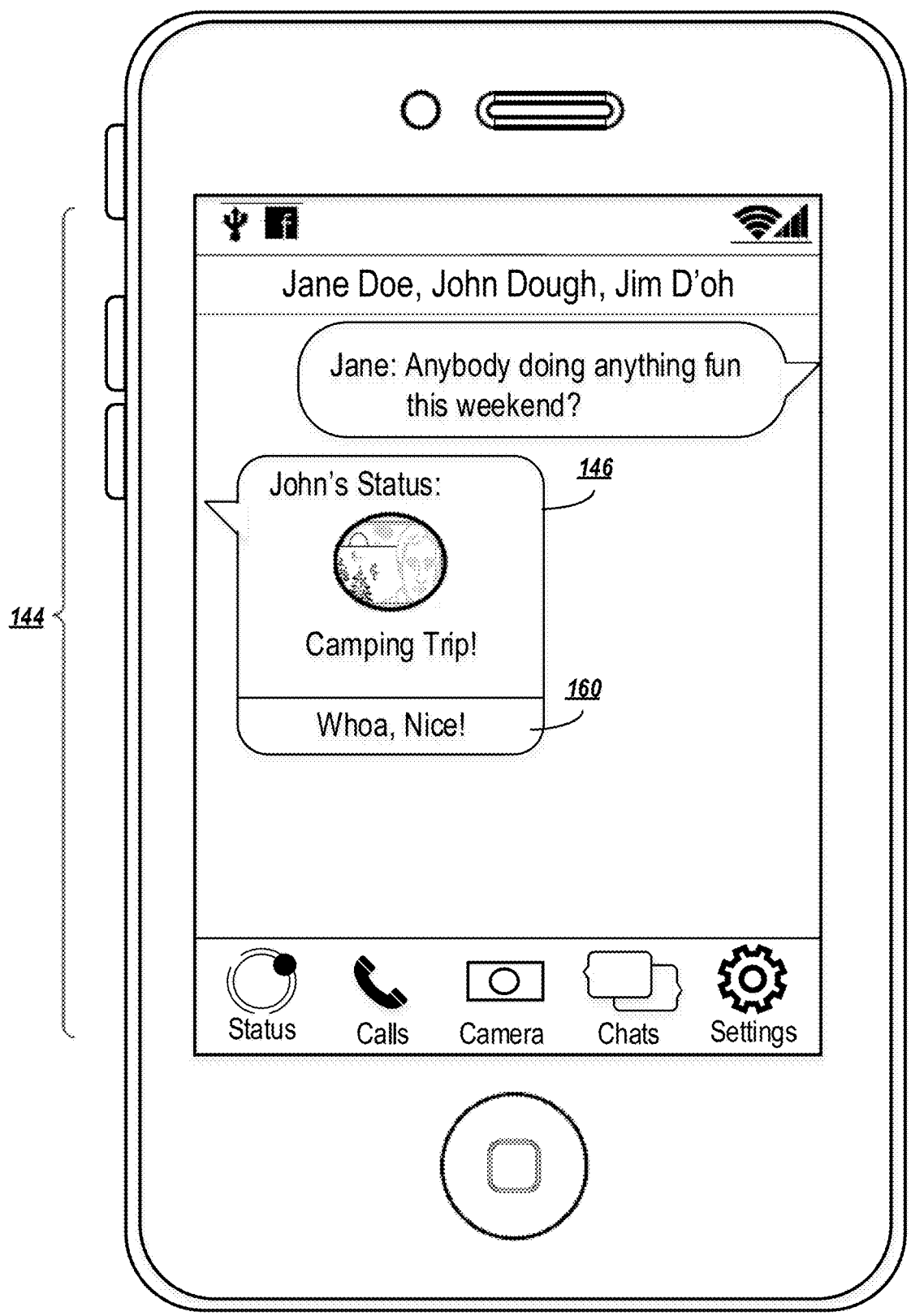
FIG. 1J depicts an exemplary interface for displaying a conversation including a reply to ephemeral content.

For example, FIG. 1J depicts the conversation interface 144 of FIG. 1G after the current user has replied to a received ephemeral content message 146. The reply 160 may be added to the ephemeral content message 146. In some embodiments, only the original sender of the content and the replier are able to see the reply 160, even when the ephemeral content message 146 was originally shared with a group of recipients (as in the example of FIG. 1G).

Alternatively, the reply 160 may appear as a separate message in the group conversation, and may be visible to all members of the group.

The original sender of the ephemeral content and the user that replied to the ephemeral content may, alternatively or in addition, see the original message 146 and the reply 160 in a separate one-on-one conversation in a separate conversation interface 144 distinct from the group conversation.

Figure 1K:
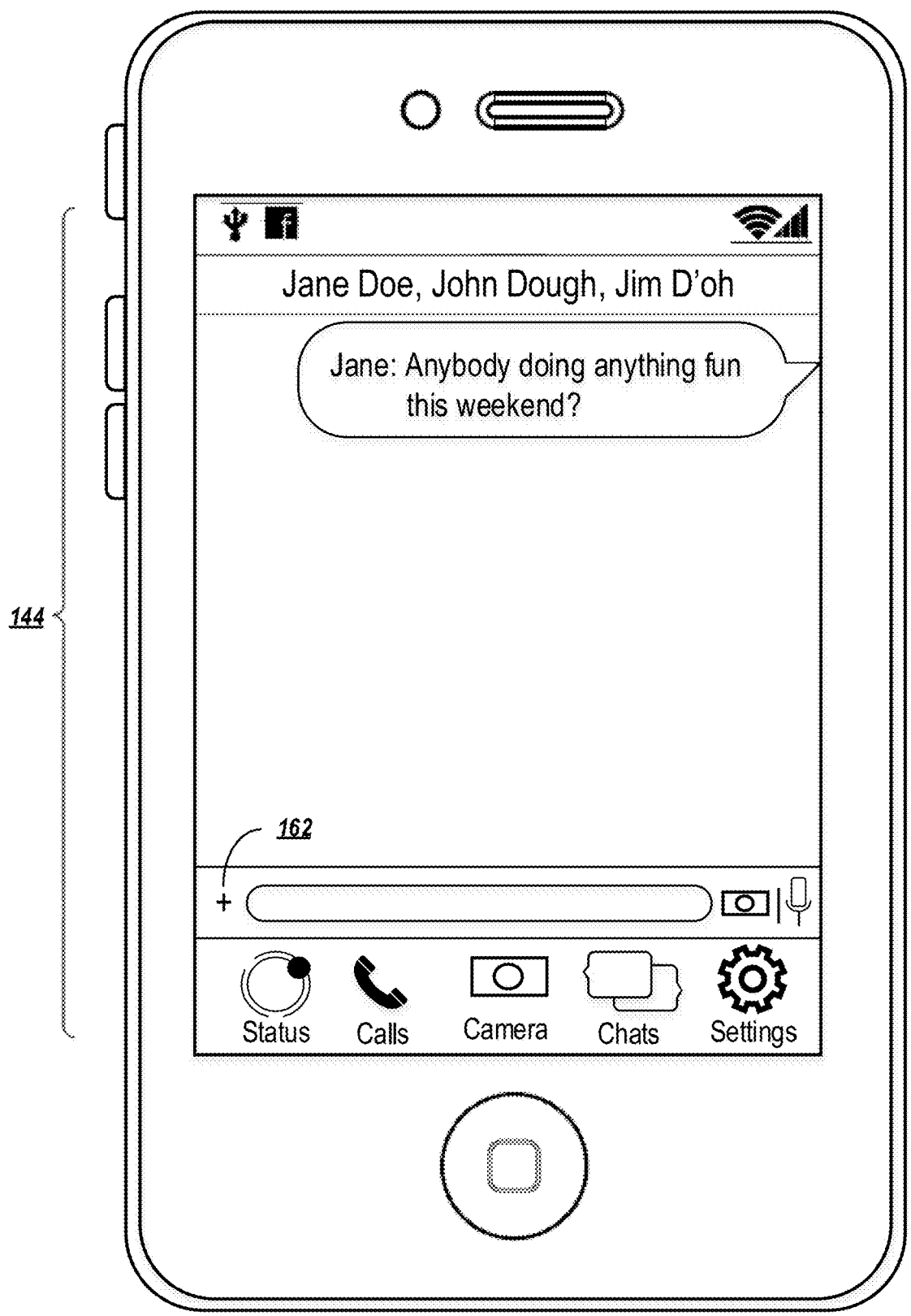
FIG. 1K depicts an exemplary interface for sharing ephemeral content from within a conversation.
Figure 1L:
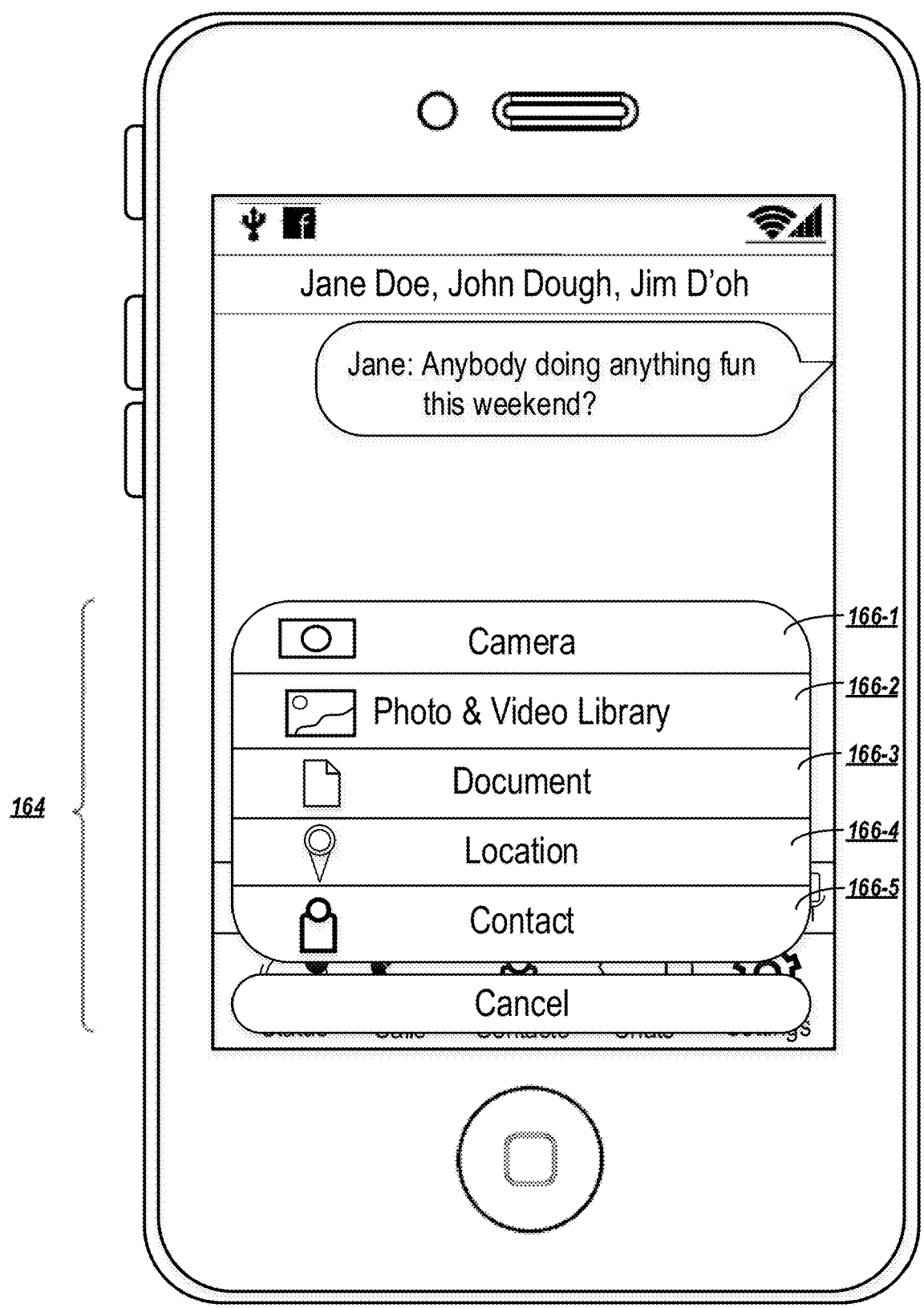
FIG. 1L depicts an exemplary content for selecting content to be shared from within a conversation.

As an alternative or in addition to sharing ephemeral content in the camera interface or through the ephemeral content interface, ephemeral content may be shared from within a conversation interface 144, as shown in FIG. 1K. In this example, a selectable element 162 may be provided in a content generation portion of the interface 144. Selecting the selectable element 162 may cause a menu 164 to be displayed, as shown in FIG. 1L. The menu may include a set of menu options 166-i allowing different types of media to be selected or generated.

For instance, a first menu option 166-1 in this example may cause the camera interface to be displayed. A second menu option 166-2 may open the user's photo album and/or video library to allow pre-existing content to be selected for sharing as ephemeral media. A third option 166-3 may open a preview window allowing the user to select a document from local or remote storage for sharing. A fourth option 166-4 may allow the user to share their location (or a location tag of a selected location). A fifth option 166-5 may allow the user to share a contact from their contacts list.

Other options may also or alternatively be offered. For example, a weather option may allow a weather report to be generated or selected as the content item; a text option may be provided for generating or selecting text; an audio content option may be provided for generating or selecting audio content; a news content option may be provided for generating or selecting a news story; and a hyperlink option may be provided for generating or selecting a hyperlink, among other possibilities.

Selecting one of the options 166-i in the menu 164 may change the display to change to appropriate capture and selection tools. For example, if the user selects an audio content option, the display may change to allow the user to select among stored audio recordings and/or to an audio recording interface. If the user selects the hyperlink content option, the display may be changed to display a list of the user's stored favorite websites (e.g., retrieved from a web browser application), and/or to provide a text entry bar for entering a uniform resource locator (URL). Similarly, if the user selects the location content option, the display may be changed to display a list of stored favorite locations (e.g., retrieved from a mapping application) and/or a search bar for entering for a new location.

In some embodiments, the options 166-i may be associated with default content or actions. For example, selecting the weather option may cause a weather report at the current location to be selected as the content item. Selecting the location option may cause the user's current location to be loaded into a location tag to be used as the content item. Selecting the text option may cause any text currently stored in the device's clipboard to be selected as the content item.

Optionally, upon selecting or generating ephemeral content, an interface may be displayed for adding a caption to the content. After the content and/or caption are prepared, an ephemeral content message may be generated and sent, as discussed in more detail below.

Several of the above-described interfaces focus on sharing a photograph or video. However, other types of media may also be shared, and each different type of media may be associated with different types of full-screen presentations. Additional examples of full-screen or enlarged displays of the content are shown in FIGS. 1M-1P for different media types.

Figure 1M:
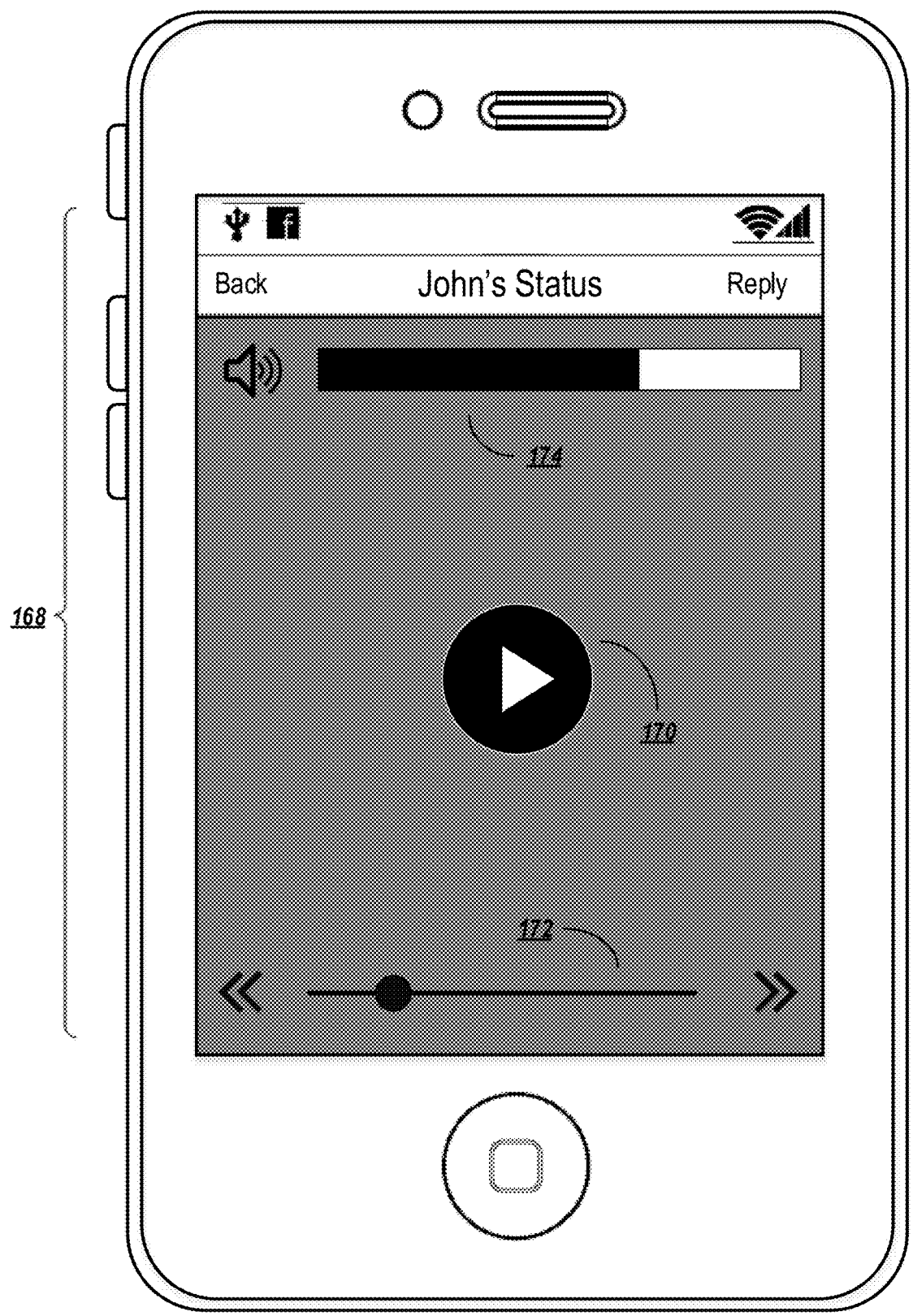
FIG. 1M depicts an exemplary interface displaying an enlarged version of ephemeral content containing an audio recording.

FIG. 1M depicts an exemplary interface 168 displaying an enlarged version of ephemeral content containing an audio recording. The interface 168 may include a control 170 for playing or pausing the audio recording, a location control 172 for controlling the location of playback within the recording, and a volume control 174 for controlling a playback volume of the audio recording.

Figure 1N:
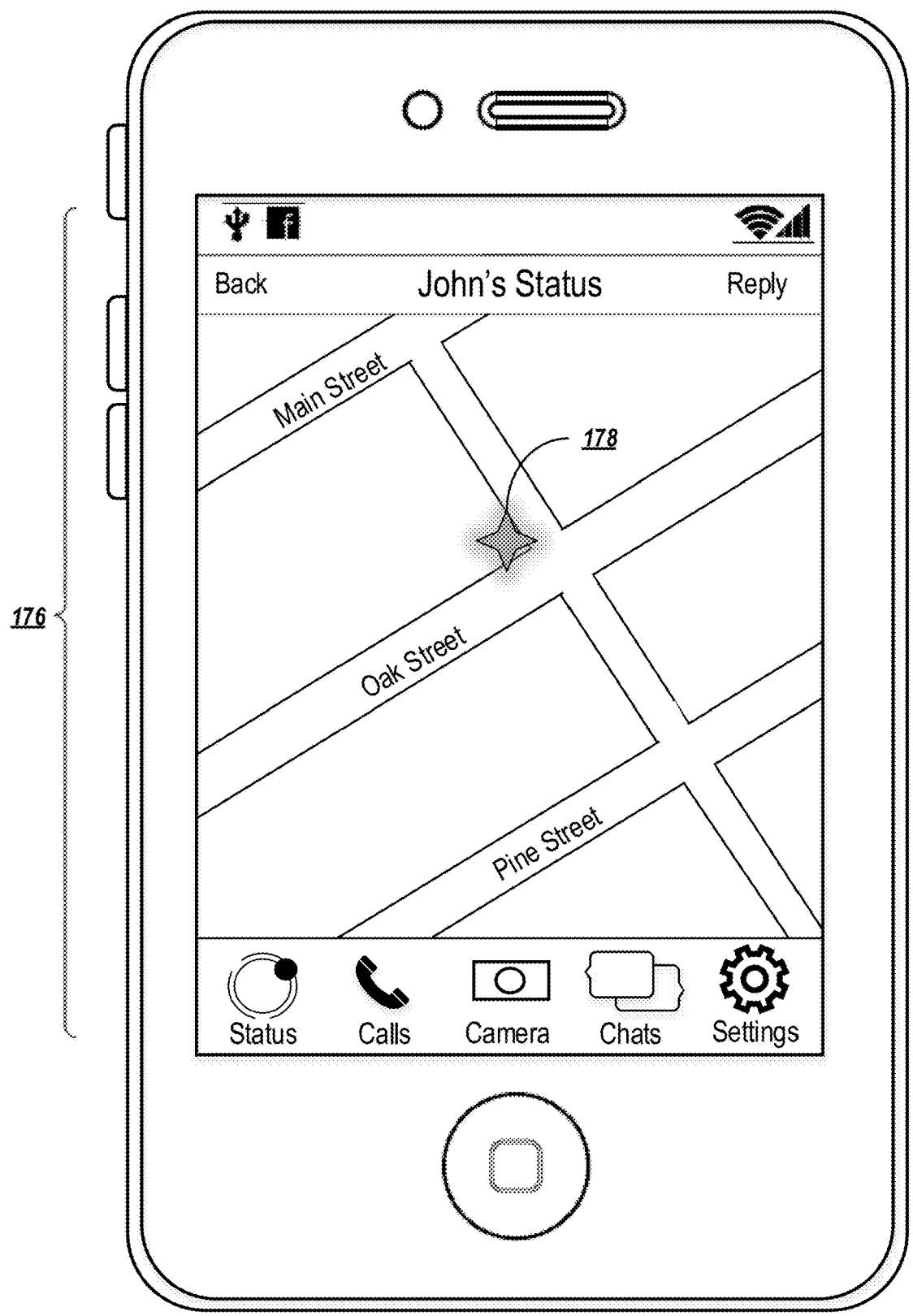
FIG. 1N depicts an exemplary interface displaying an enlarged version of ephemeral content containing a location.

FIG. 1N depicts an exemplary interface 176 displaying an enlarged version of ephemeral content containing a location. The ephemeral content may include a location tag describing a location, and the full-screen presentation may display a map including or centered on the location from the tag. The interface 176 may include a map pin 178 showing the precise position of the tagged location on the map.

FIG. 1O depicts an exemplary interface 180 displaying an enlarged version of ephemeral content containing a weather report. The interface may include a large representation 182 of the current weather at the location indicated at the time the ephemeral content message was generated, and a small representation 184 of additional details (e.g., an hourly, daily, or weekly forecast).

Figure 1P:
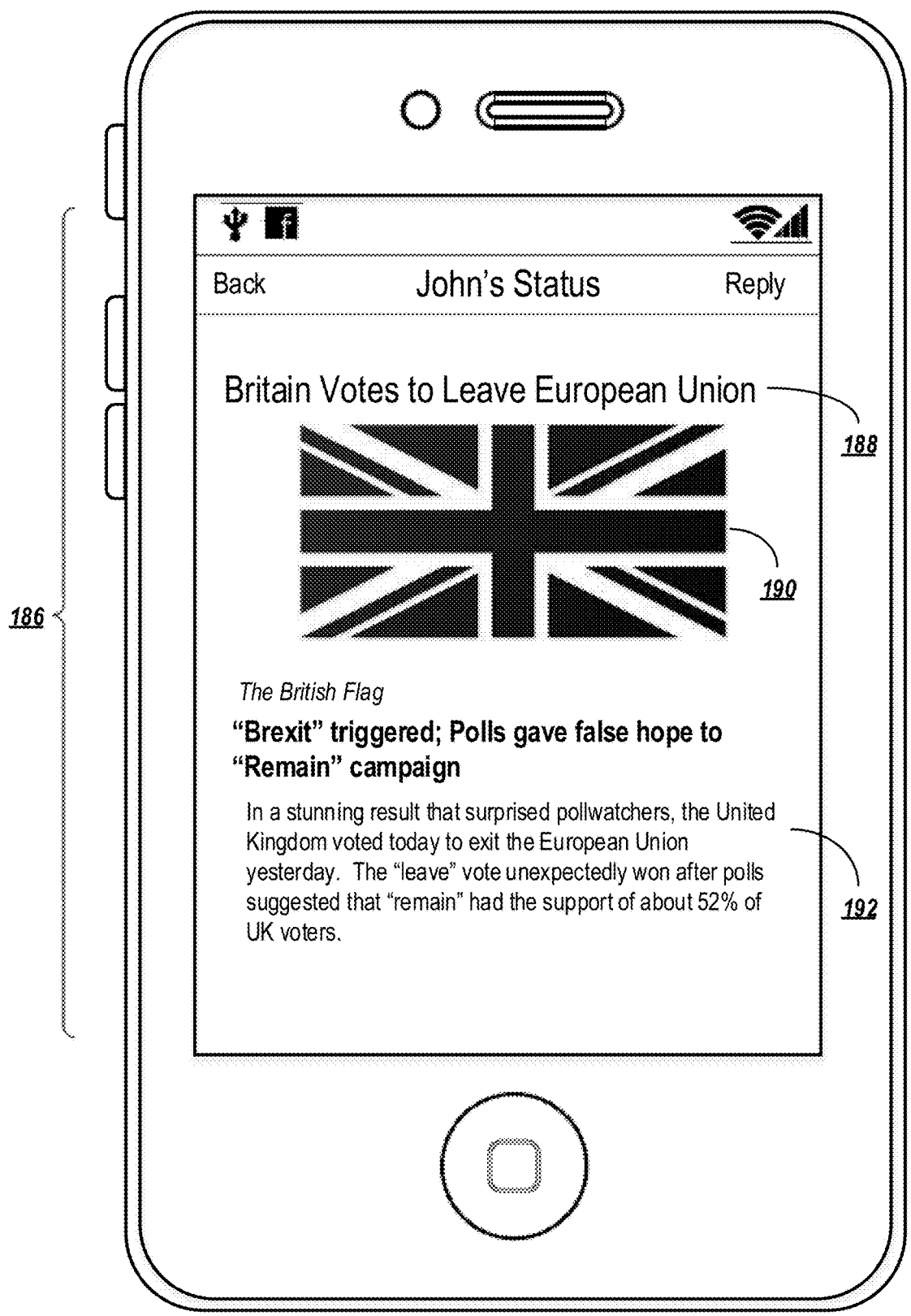
FIG. 1P depicts an exemplary interface displaying an enlarged version of ephemeral content containing a news item.

FIG. 1P depicts an exemplary interface 186 displaying an enlarged version of ephemeral content containing a news item. The interface may display a headline 188, an image 190 associated with the news item, and news content 192.

The full-screen presentations of FIGS. 1H and 1M-1P are intended to be illustrative. Other configurations may be used for the types of media items depicted, and other types of media items may also be associated with full-screen presentations.

Figure 2:
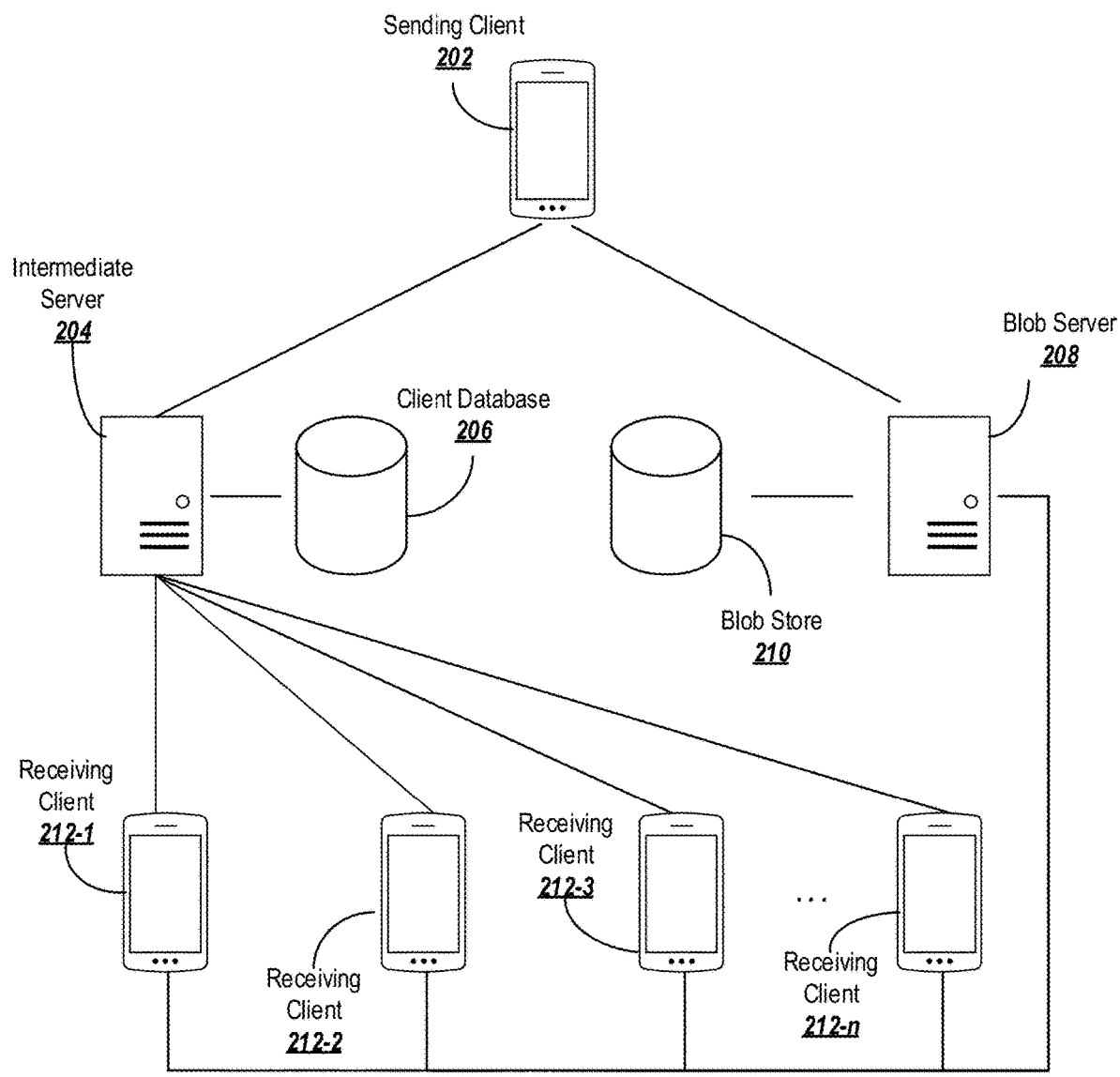
FIG. 2 depicts an exemplary system suitable for applying end-to-end encryption to an ephemeral content message.

An exemplary system for distributing ephemeral content messages is next described with respect to FIG. 2.

Exemplary End-to-End Encryption System

As shown in FIG. 2, exemplary embodiments may provide end-to-end encryption between a sending client 202 and a receiving client 212-$i$ facilitated by an intermediate server 204. Some embodiments described herein utilize server-side fan out to transmit group messages and broadcasts. In a server-side fan out procedure, the sending client 202 transmits a single copy of the message to the server 204, which then transmits a copy of the message to the appropriate recipient clients 212-$i$, as illustrated in FIG. 2.

All communication between clients 202, 212 and servers 204 may be layered within a separate encrypted channel. End-to-end capable clients may use, for example, Noise Pipes with Curve25519, Advanced Encryption Standard Galois/Counter Mode (AES_GCM), and Secure Hash Algorithm 256 (SHA256) from the Noise Protocol Framework for long running interactive connections. The parameters for setting up the encrypted channel may be stored in a client database 206 at the server 204.

Such a configuration provides several desirable properties, including: fast, lightweight connection and resume; encryption of metadata to hide it from unauthorized network observers; information about the connecting user's identity is not revealed; and no client authentication secrets are stored on the server 204. Clients may authenticate themselves using a Curve25519 key pair, so the server only stores a client's public authentication key. If the server's user database 206 is ever compromised, no private authentication credentials will be revealed.

In order to transmit media and/or attachments in an encrypted manner, the communications system may also include a blob server 208 hosting a blob store 210. Use of the blob store 210 to transmit content (particularly in conjunction with sending an ephemeral content message) is described in more detail below.

Exemplary Encryption Protocol and Data Structures

This section describes an exemplary encryption protocol and data structures suitable for use in end-to-end encryption. Although embodiments are illustratively described herein with regards to specific examples, the present invention is not limited to the examples described. Some aspects described herein may be used with any type of communications system or encryption protocol, while others may be preferably employed in connection with an end-to-end encrypted communications system.

An example of an encryption protocol suitable for use with exemplary embodiments is the Signal Protocol designed by Open Whisper Systems of San Francisco, Calif. Exemplary embodiments may also utilize the anonymous key agreement protocol Elliptic Curve Diffie-Hellman (ECDH). Nonetheless, other encryption protocols and key agreement protocols may also be suitable for use with exemplary embodiments.

Advantageously, end-to-end encrypted protocols may prevent third parties (and even the communications service itself) from having plaintext access to messages transmitted by the service. Even if encryption keys from a user's device are physically compromised, they cannot be used to go back in time to decrypt previously transmitted messages.

In order to use end-to-end encryption, a user may initially register with the communications service. The user's registration information may be stored in the client database 206, as shown in FIG. 3A. Each user may be associated with an entry 302-$i$ indexed by an identifier assigned to the user account.

At registration time, an application of the communications service associated with the registering user may transmit a public identity key 304, a public signed pre key 306 with its signature, and a batch of public one-time pre keys 310-$i$ to the intermediate server 204.

In one embodiment, the identity key 304 may be a long-term Curve25519 key pair, generated at the time that the application is installed on the client device. The signed pre-key 306 may be a medium-term Curve25519 key pair, generated at install time and signed by the identity key. The signed pre-key 306 may be rotated on a periodic basis. The one-time pre keys 310-$i$ may be a queue 308 of Curve25519 key pairs for one-time use, generated at install time, and replenished as needed.

The server 204 may store these public keys 304, 306, 310-$i$ associated with the user's identifier 302-$i$. According to exemplary embodiments, at no time does the server 204 have access to any of the client's private keys.

In addition to the public keys 304, 306, 310-$i$, the server 204 may store a contacts list 312 including one or more contact user identifiers 314-$i$ associated with the contacts of the user account. The contacts in the contacts list 312 may be, or may be derived from, a contacts list on the user's mobile device. Some entries in the contacts list 312 may be associated with one or more flags. One example of such a flag is a blocked-user flag, indicating that the user associated with the respective contact user identifier 314-$i$ is blocked by the user account associated with the entry 302-$i$. When a user account is blocked, messages from the blocked user are not delivered to the blocking user.

In some embodiments, the intermediate server 204 may not store the contacts list 312, but may instead be capable of querying potential recipient clients for their own contacts list in order to provide the filtering functionality described below.

The information from the client database 206 may be used to initiate an end-to-end encrypted session; using the session information, end-to-end encrypted messages may be exchanged until the session is ended or expires. Once the session is established, clients do not need to rebuild a new session with each other until the existing session state is lost (e.g., through an external event such as an app reinstall or device change). FIG. 3B depicts an exemplary message 316 suitable for establishing an end-to-end encrypted session.

In order to establish a session, the client initiating the session ("initiator") may request the public identity key 304, public signed pre key 306, and a single public one-time pre key 310-$i$ for the recipient.

In response, the server 204 may return the requested public key values. A one-time pre key 310-$i$ is only used once, so it is removed from the server storage after being requested. The initiator may save the recipient's identity key 304 as $I_{recipient}$, the signed pre key 306 as $S_{recipient}$, and the one-time pre key 310-$i$ as $O_{recipient}$.

The initiator may then generate an ephemeral Curve25519 key pair as $E_{initiator}$ 318. The initiator may load its own identity key 304 as $I_{initiator}$ 320. The initiator may calculate a master secret as:

$$\text{master\_secret} = \text{Equation 1}$$
$$ECDH(I_{initiator}, S_{recipient}) \| ECDH(E_{initiator}, I_{recipient}) \|$$
$$ECDH(E_{innitiator}, S_{recipient}) \| ECDH(E_{initiator}, O_{recipient})$$

If there is no one-time pre key 310-*i* (e.g., the keys in the queue 308 had been exhausted when the initiator requested such a key and had not been replenished by the recipient), then the final ECDH may be omitted.

The initiator may use a Hashed Message Authentication Code (HMAC)-based key derivation function (HKDF) to create a root key and chain keys from the master secret, as discussed in more detail below. A root key may be a 32-byte value that is used to generate chain keys. A chain key may be a 32-byte value used to create message keys. A message key may be an 80-byte value that is used to encrypt message contents. In the message key, 32 bytes may be used for an Advanced Encryption Standard-256 (AES-256) key, 32 bytes may be used for an HMAC Secure Hash Algorithm-256 (HMAC-SHA256) key, and 16 bytes may be used for an initialization vector (IV).

After building a long-running encryption session, the initiator may immediately start sending messages 316 to the recipient, even if the recipient is offline. Until the recipient responds, the initiator may include the information (in the header of all messages sent) that the recipient requires to build a corresponding session. This includes the initiator's $E_{initiator}$ 318 and $I_{initiator}$ 320. Optionally the message may also include a public key 322 and encrypted content 324, as described in connection with FIG. 3C.

When the recipient receives a message 316 that includes session setup information, the recipient may calculate the corresponding master secret using its own private keys and public keys advertised in the header of the incoming message. The recipient deletes the one-time pre key 310-*i* used by the initiator. The initiator may use HKDF to derive a corresponding root key and chain keys from the master secret.

Once a session is established, clients may exchange messages that are protected with a message key using AES256 in cipher block chaining (CBC) mode for encryption, and HMAC-SHA256 for authentication.

The message key may change for each message transmitted, and is ephemeral such that the message key used to encrypt a message cannot be reconstructed from the session state after a message has been transmitted or received.

The message key may be derived from a sender's chain key that ratchets forward with every message sent. Additionally, a new ECDH agreement is performed with each message roundtrip to create a new chain key. This provides forward secrecy through the combination of both an immediate hash ratchet and a round trip Diffie-Hellman (DH) ratchet.

Each time a new message key is needed by a sender, the message key may be calculated as:

$$\text{Message Key} = \text{HMAC-SHA256(Chain Key,}0x01) \quad \text{Equation 2:}$$

The chain key may then be updated as:

$$\text{Chain Key} = \text{HMAC-SHA256(Chain Key,}0x02) \quad \text{Equation 3:}$$

This causes the chain key to ratchet forward, and also means that a stored message key can't be used to derive current or past values of the chain key.

As shown in FIG. 3C, each time a message 326 is transmitted, a public key 322 (e.g., an ephemeral Curve25519 public key) may be advertised along with the encrypted message content 324. Once a response is received, a new chain key and root key may be calculated as:

$$\text{ephemeral\_secret} = \text{ECDH(Ephemeral}_{sender}, \text{Ephemeral}_{recipient}) \quad \text{Equation 4:}$$

$$\text{Chain Key, Root Key} = \text{HKDF(Root Key, ephemeral\_secret)} \quad \text{Equation 5:}$$

According to exemplary embodiments, a chain is only ever used to send messages from one user, so message keys are not reused. Because of the way message keys and chain keys are calculated, messages can arrive delayed, out of order, or can be lost entirely without causing problems.

Figure 3D:
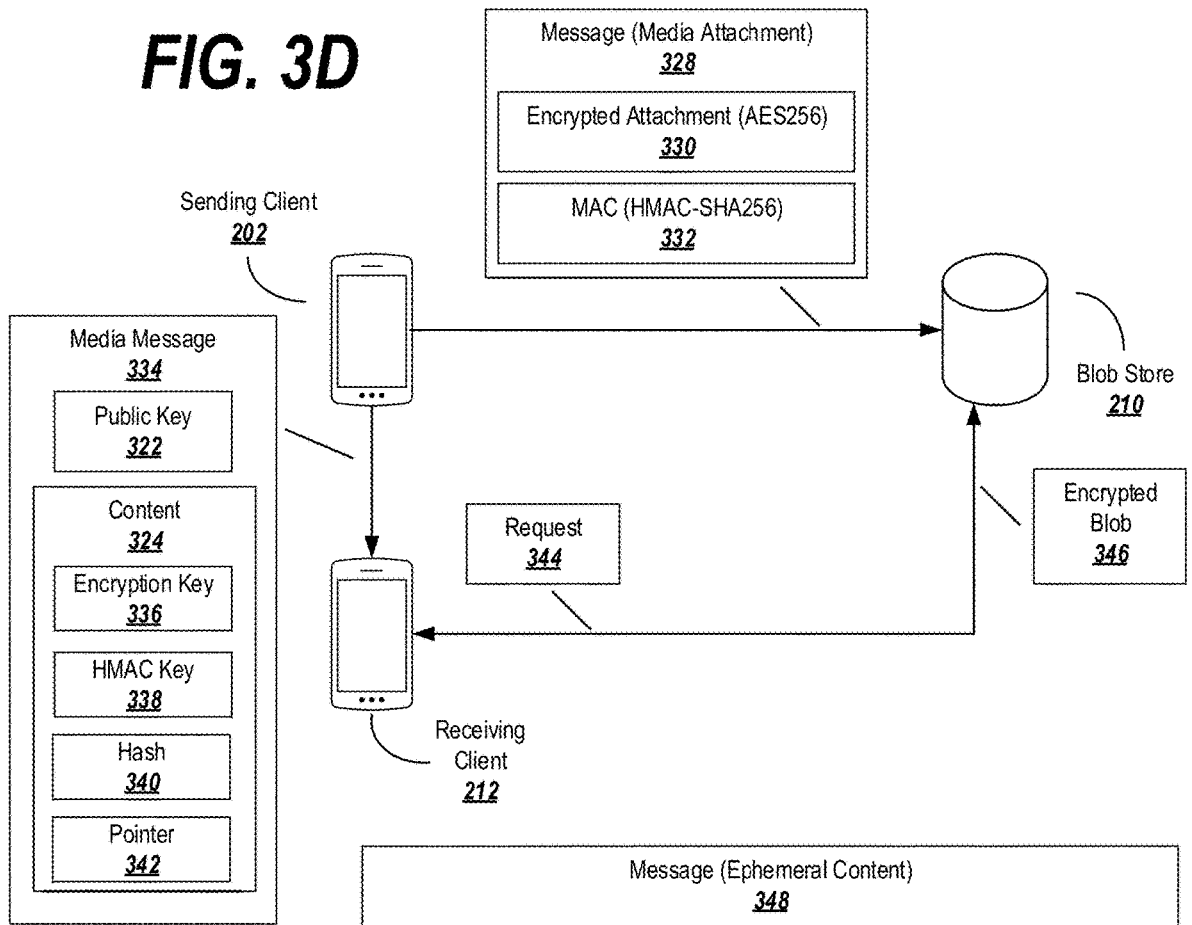
FIG. 3D depicts exemplary messages transmitted in a network in order to exchange media files in an end-to-end encrypted communications system.

End-to-end encryption may also be used to transmit media and other attachments, as shown in FIG. 3D. The sending client 202 sending the message 328 may generate an ephemeral 32 byte AES256 key 336, and an ephemeral 32 byte HMAC-SHA256 key 338. The sender may encrypt the attachment 330 with the AES256 key in CBC mode with a random IV, then append a message authentication code (MAC) 332 of the ciphertext using HMAC-SHA256. The sending client 202 may then upload the encrypted attachment 330 as a blob to the blob store 210.

The sending client 202 may then transmit a normal encrypted message 334 to a receiving client 212. The message 334 may be secured using a public key 322, as discussed above. The content 324 of the message 334 may include the encryption key 336, the HMAC key 338, a SHA256 hash of the encrypted blob 340, and a pointer 342 to the blob in the blob store.

The receiving client 212 may decrypt the content 324 and transmit a request 344 for the blob stored at the location of the pointer 342. After receiving the encrypted blob 346, the receiving client may calculate a SHA256 hash of the blob and verify that the hash matches the hash 340 of the message 334, may verify the MAC 332, and may decrypt the plaintext.

Figure 3E:
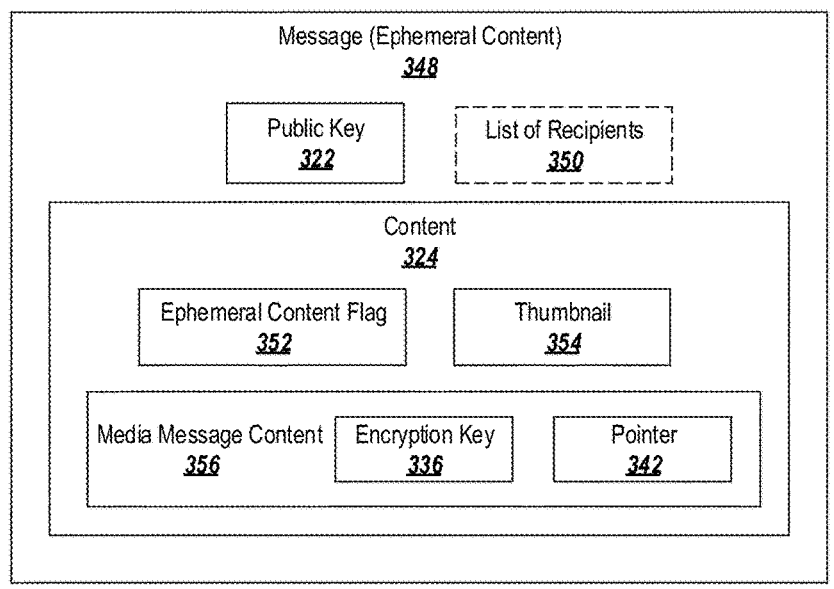
FIG. 3E depicts an exemplary ephemeral content message.

The above-described procedure for exchanging media may also be used to exchange content in association with an ephemeral content message, as shown in FIG. 3E. As part of the ephemeral content generation process, a user may select media to be shared in connection with the ephemeral content message, and use the above-described process to upload the media to the blob store 210. The sending client 202 may then transmit an ephemeral content message 348 to the intermediate server 204 for transmission to receiving clients 212-*i*.

An ephemeral content message 348 may include encrypted content 324 secured by a public key 322, as described in connection with other types of messages described above. Optionally, the message 348 may further include a list of recipients 350. The list of recipients may be a list of recipients selected at the sending client 202. For example, in a broadcast scenario, the sending client 202 may automatically add its entire contacts list into the list of recipients. In some embodiments, if the server 204 stores the sending client's contacts list, the list of recipients 350 may be replaced by a broadcast flag when the sending user desires to send the message as a broadcast. The server 204 may interpret the broadcast flag as an instruction to transmit the ephemeral content message to each of the contacts in the contacts list stored by the server (subject to filtering, as discussed below). If the sending user selects a group of recipients to receive the ephemeral content message, then the list of recipients 350 may include the selected members of the group.

In exemplary embodiments employing server-side fan out, the server may receive an ephemeral content message 348 as depicted in FIG. 3E and may use the list of recipients 350 to determine the candidates to whom the message may be fanned out. The server may then remove the list of recipients 350 from the message, so that recipients do not receive the list of other users to whom the ephemeral content message was sent.

The encrypted content 324 may include an ephemeral content flag 352 designating the content 324 of the message 348 as representing shared ephemeral content. Although ephemeral content may be transmitted in the form of messages in order to preserve end-to-end encryption, the presence of the ephemeral content flag 352 may indicate to the receiving client 212 that the message 348 should be processed and displayed as an ephemeral content message, rather than a normal message in a conversation.

The content 324 may further include a thumbnail 354. The thumbnail 354 may represent a version of the uploaded content that is less detailed, of lower resolution, shows a limited portion of the content, etc. Alternatively or in addition, the thumbnail 354 may be an iconic representation of the content. The iconic representation may be different for different types of content—for example, a content including an audio recording may be represented by an icon displaying a music note of play button, whereas a location tag may be represented by an icon displaying a map pin or globe. Instead of an iconic representation, the thumbnail 354 may include a flag or description of a media type, so that an iconic representation stored locally on the receiving client corresponding to the media type may be selected and used.

The content 324 may further include media message content 356 allowing the content item corresponding to the thumbnail 354 to be retrieved from the blob store 210. For example, the media message content 356 may include the items described above in connection with the media message 334 of FIG. 3D, particularly an encryption key 336 and a pointer 342 or link to the content in the blob store 210.

As noted above, the encryption key 336 is used to encrypt the media stored in the blog store 210. When sending an ephemeral content message, the sending client 202 may encrypt the media with the encryption key 336 and then transmit the encryption key 336 as part of the ephemeral content message 348. When the ephemeral content message 348 is fanned out to multiple recipients, each will have a copy of the same encryption key 336, and can therefore access the same encrypted blob 346 in the blob store. Thus, multiple copies of the attachment (e.g., one for each receiving user) do not need to be individually encrypted and uploaded to the blob store. Moreover, fewer network messages need to be transmitted from the sending client 202, which does not need to transmit separate messages, one for each encryption key 336 assigned to an individual receiving client 212.

If the recipients of the ephemeral content change from the perspective of the sending client, a new encryption key 336 may be generated for the new recipient list (even if the shared content item is the same media as was previously transmitted). In other words, the encryption key 336 is not re-used to add new recipients to an ephemeral content message or for new ephemeral content messages with a different recipient list. This privacy model helps to preserve encryption strength and ensures that, if a user somehow is able to locate a media object from an ephemeral content message, that user will not be able to access that media object unless the user was included in the original transmission that distributed the encryption key 336. Thus, access to the media object can be more effectively secured.

Because the server does not have access to the encryption key 336, which is itself encrypted in the message 348 in a manner that is only visible to particular recipient clients, the server is not capable of decrypting the media uploaded to the blob store 210.

As discussed above, ephemeral content messages (and other types of messages) may be fanned out from the server 204 for broadcast or group messages. In other words, a client wishing to send a message to a group of users may transmit a single message to the server 204, which is then distributed n times to the n different group members (or n different broadcast recipients) by the server 204.

Some embodiments may alternatively be used in connection with a client-side fan out procedure, where a client transmits a single message n different times to the n different group members or broadcast recipients. One reason to favor server-side fan out in comparison to client side fan out is efficiency: in a server side fan out procedure, the client need only transmit a single message to the server, as opposed to the n messages that must be transmitted in a client fan out procedure. Moreover, server side fan out allows the server 204 to implement procedures for improving network efficiency and reducing messaging spam, such as the filtering procedures described herein. The procedures described above for developing pairwise encrypted sessions achieve efficient server-side fan out for most messages sent to groups or broadcast recipients.

Efficient group messaging may be accomplished using the sender keys component of the Signal Messaging Protocol. More specifically, the first time a group member sends a message to a group, the sender may generate a random 32-byte chain key and a random Curve25519 signature key key pair. The sender may combine the 32-byte chain key and the public key from the signature key into a sender key message. The sender may individually encrypt the sender key to each member of the group, using the pairwise messaging protocol explained above.

For all subsequent messages to the group, the sender may derive a message key from the chain key, and update the chain key. The sender may encrypt the message using AES256 in CBC mode, and may sign the ciphertext using the signature key. The sender may transmit the single ciphertext message to the server, which performs server-side fan out to all group recipients. The has ratchet of the message sender's chain key provides forward secrecy. Whenever a group member leaves, all group participants clear their sender key and start over.

One advantage of server side fan out is that the server 204 may perform filtering on the received ephemeral content messages in order to reduce spam. For example, the server 204 may receive a broadcast ephemeral content message from a sending client 202, and may forward the ephemeral content message only to those user accounts that have a symmetric relationship with the user account associated with the sending client 202. An example of relationship symmetry is shown in FIG. 3F.

Figure 3F:
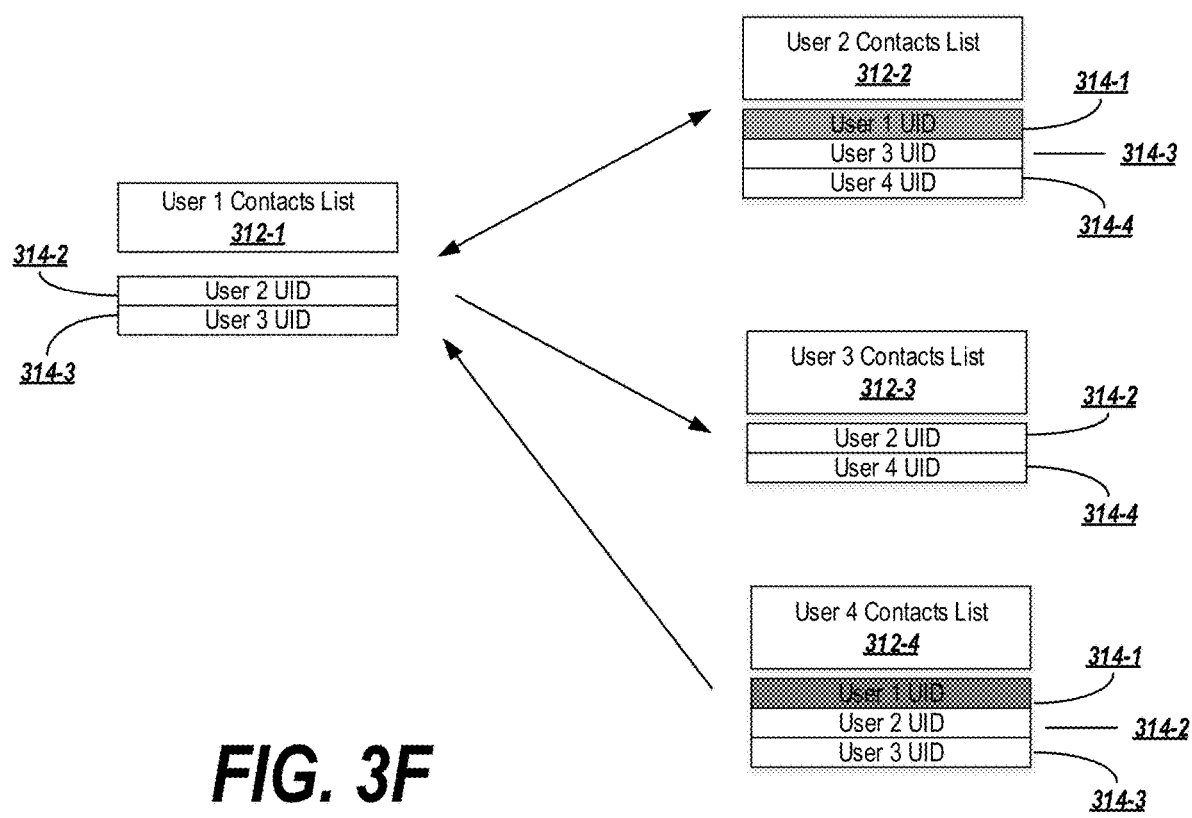
FIG. 3F depicts exemplary contacts lists having symmetric and asymmetric relationships.

FIG. 3F depicts the contacts list 312-*i* of various users. Each contacts list 312-*i* includes one or more contacts 314-*i*. In this example, the contacts list 312-1 for a first user includes user identifiers 314-2, 314-3 for a second user and a third user. The identifier 314-4 for a fourth user is not present in the first user's contacts list 312-1.

The second user's contacts list 312-2 includes the first user's identifier 314-1. Because the first user's contacts list 312-1 includes the second user's ID 314-2-, and because the second user's contacts list 312-2 includes the first user's ID 314-1, the first user and the second user are said to have a symmetric relationship. Such a relationship might occur, for example, if the first user and second user both have each other listed in the contacts list of their mobile devices.

The third user's contacts list 312-3 includes the second user's ID 314-2 and the fourth user's ID 314-4, but does not include the first user's ID 314-1. Because the first user's contacts list 312-1 includes the third user's ID 314-3, but the third user's contacts list 312-3 does not include the first user's ID 314-1, the relationship between the first user and the third user is said to be asymmetric. Such a condition, where the sending user's contacts list includes a potential recipient but the recipient's contacts list does not include the sending user, is referred to herein as forward asymmetry.

The fourth user's contacts list 312-4 includes the first user's ID 314-1, the second user's ID 314-2, and the third user's ID 314-3. Because the fourth user's contacts list 312-4 includes the first user's ID 314-1 but the first user's contacts list 312-1 does not include the fourth user's ID 314-4, the relationship between the first user and the fourth user is also asymmetric. Such a condition, where the sending user's contacts list does not include a potential recipient but the recipient's contacts list does include the sending user, is referred to herein as reverse asymmetry.

According to exemplary embodiments, when the server 204 receives an ephemeral content message (or any type of message) to be broadcast (or transmitted to a group) by a sending client 202, the server 204 may retrieve the sending user's contacts list and may use this list as an initial candidate list of potential recipients of the broadcast. For each user ID in the candidate list, those user's contacts lists may be retrieved and reviewed to determine if the sending user is present in the recipients' contact lists. If the relationship between the sender and potential recipient is symmetric, the recipients may remain in the candidate list. If the relationship is asymmetric (e.g., the potential recipient's contacts list does not include the sending user), then the potential recipient may be filtered out of the candidate list. Such a procedure may help to reduce spam—for example, this filtering would prevent a spammer from adding unauthorized recipients to their own contacts list and then broadcasting a message to those recipients.

The decision as to who receives the ephemeral content message may be made at the time the ephemeral content message is transmitted. Accordingly, if a relationship becomes symmetric after the ephemeral content message is transmitted, recipients who were originally filtered out will not receive the ephemeral content message. For instance, in the example depicted in FIG. 3F, if the third user adds the first user's ID 314-1 to his contacts list 312-3 after the first user sends an ephemeral content message (thereby making the relationship between the first user and the third user symmetric), the ephemeral content message is not sent to the third user after the relationship becomes symmetric. Similarly, if the first user adds the fourth user's ID 314-4 to the first user's contacts list 312-1 after the first user sends an ephemeral content message, the ephemeral content message is not sent to the fourth user after the relationship becomes symmetric. In both cases, future ephemeral content messages transmitted by the first user become visible to the third user and the fourth user due to the now-symmetric nature of the relationships.

However, in some embodiments recipients who were originally filtered out of the candidate list due to forward asymmetry may receive a previous ephemeral content message if the relationship later becomes symmetric. Changing a reverse asymmetric relationship to a symmetric relationship may not result in such a new transmission. Such embodiments help to preserve the privacy of the sending user. In the case of forward asymmetry, the sending user had an opportunity to consider which users would receive the ephemeral content message broadcast. Because the asymmetry was in the forward direction, the first user was at least aware that the asymmetric recipient could have received the ephemeral content message (by virtue of the recipient being in the first user's contacts list 312-1).

On the other hand, in the case of reverse asymmetry, the first user did not include the potential recipient in the first user's contacts list 312-1, and so did not consider that the ephemeral content message broadcast may have been sent to the recipient. Therefore, when the asymmetric relationship is later made symmetric, the new recipient should not automatically receive prior ephemeral content messages. If the first user wishes the new recipient to receive previous ephemeral content messages, then the user may be presented with an option to forward all, some, or individual ephemeral content messages to the recipient.

In still further embodiments, establishing symmetry with another user may cause previous ephemeral content messages to become visible to the other user, regardless of whether the original asymmetry was forward or reverse.

This and other aspects of exemplary embodiments are next described in connection with the data flow diagram depicted in FIG. 4.

Exemplary Information Exchange

Figure 4:
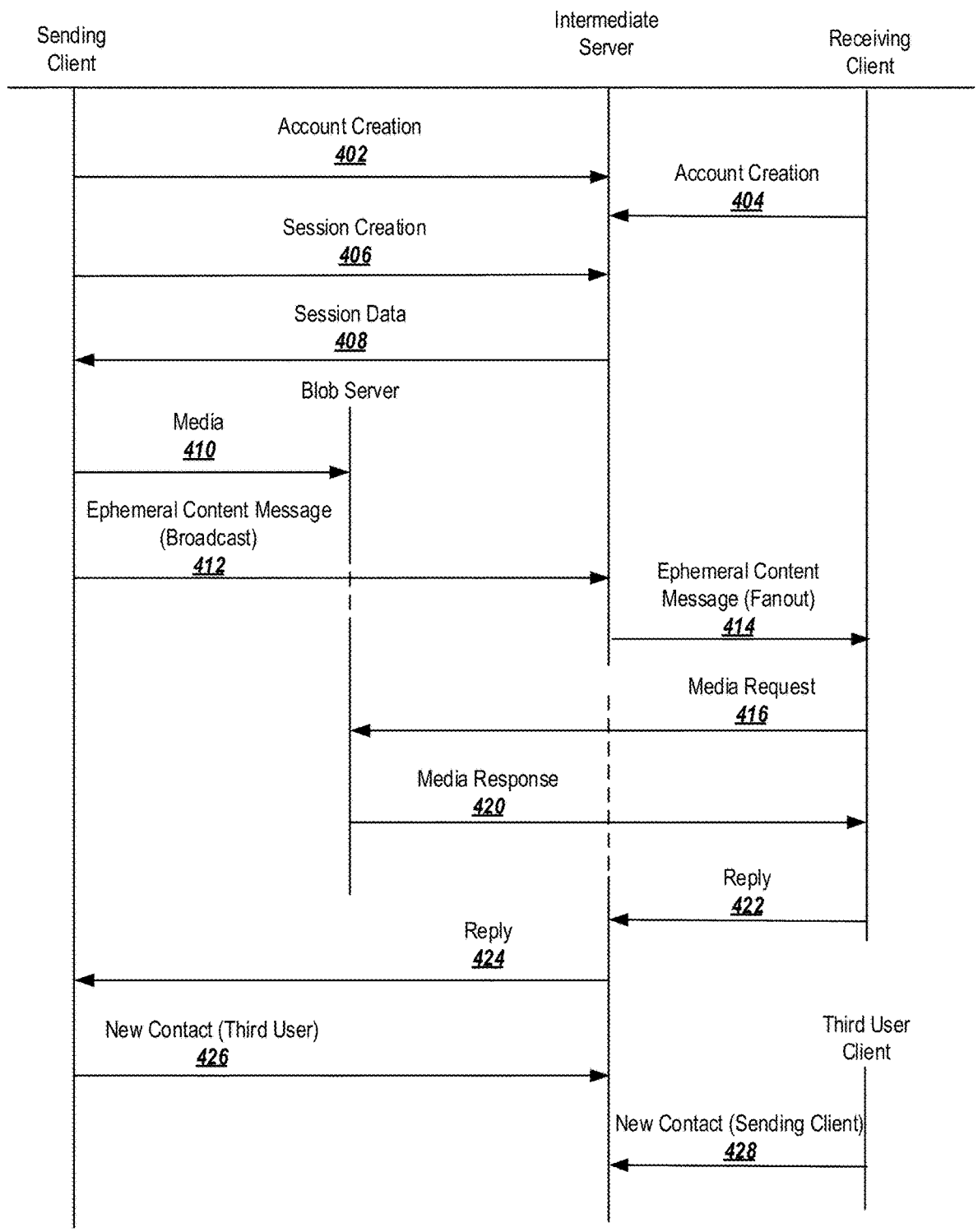
FIG. 4 is an exemplary data flow diagram showing information exchange according to an exemplary embodiment.

FIG. 4 is an exemplary data flow diagram showing information exchange between a sending client, an intermediate server, a blob server, a receiving client, and a third client according to an exemplary embodiment.

The sending client may send one or more account creation messages 402 when initially creating an account with the communications service. The account creation messages 402 may be sent as a result of joining the service and installing an application of the service for the first time. Additional similar messages may be transmitted when the user first logs in to a new device, updates their hardware or software, etc. The account creation messages 402 may include automatically generated information and/or information from the user of the sending client. The account creation messages 402 may be used to populate the server's client database 206.

Similarly, the receiving client may create an account with the communications service, and may accordingly transmit account creation messages 404 to the intermediate server.

When the sending client wishes to communicate with the receiving client, the sending client sends a session creation request 406 to the intermediate server to request the receiving client's public keys, as described above. The server responds with session data 408 (e.g., including the recipient's public identity key, signed pre key, and one-time pre key).

This procedure (exchanging session creation messages 406 and session data messages 408 with the server) may be performed for each sender-recipient pair. It may be performed when the sender first contacts the recipient (or contacts the recipient for the first time after a session has previously expired). It may also be performed when the sender sends a broadcast message, such as a broadcast ephemeral content message, for each recipient in the sender's address book with whom the sender has a symmetric relationship and for whom an encrypted session has not been previously established.

When the sending client wishes to send an ephemeral content message including content such as media 410, the sending client may upload the media 410 to the blob server as discussed above in connection with FIG. 3D. The sending client may then send an ephemeral content message 412 to the server. The server may perform filtering, as described herein, and determine which recipient's in the sending user's contacts list will receive the ephemeral content message 412. The server may then send respective ephemeral content messages 414 to each recipient in the filtered list.

As noted above, the ephemeral content message may include a thumbnail and a link to the media in the blob store. Upon activating the link (e.g., by clicking or interacting with a representation of the thumbnail), the receiving client may generate a media request 416 to request the media from the blob store. The blob store may respond to the media request with a media response 420, as described above in connection with FIG. 3D. Thus, the media may be downloaded to the receiving client.

In some embodiments, the link may be ephemeral. For example, the link may be valid for a predetermined period of time (e.g., 24 hours) or for a predetermined number of views (e.g., one use, two uses, etc.). As such, the receiving client may be configured to retrieve the media from the blob server, but to delete the media after presenting the full-screen display. In some embodiments, such as when the link expires after a predetermined period of time, the receiving client may be configured to delete the media from local storage after the predetermined period of time and to simultaneously mark the link as inactive so that the link cannot be used to retrieve the media again. In other embodiments, such as when the link expires after a predetermined number of views, the receiving client may be configured to delete the media from local storage after the full-screen view has been presented the predetermined number of times, and to simultaneously mark the link inactive so that the link cannot be used to retrieve the media again. In still further embodiments, the receiving client may be configured to store the retrieved media in temporary storage and delete the media each time after the full-screen view is presented. In such embodiments, the link may remain active for a certain period (e.g., for a predetermined number of views or for a predetermined amount of time), and may be used to retrieve the media over this period. The link may be made inactive after the period is up, after which point the link may not be used to retrieve the media from the blob store.

By storing the media remotely at the blob store and providing a link to the media, which may be made inactive under certain conditions, the media can remain in storage even after some or all of the links begin to expire. For example, if the links are configured to expire after one view, different receiving users may view the full screen presentations at different times. The media can remain on the blob server (e.g., until all the links have expired) while users with inactive links may simply be unable to reach the media. Meanwhile, users with active links may continue to be able to access the media via the blob store until their links expire.

As noted above, users may reply to ephemeral content messages. For example, the receiving client may submit a reply 422 to the intermediate server. The intermediate server may assign the reply to an appropriate conversation or thread (where a conversation may be uniquely defined by its participants). To this end, the intermediate server may associate the reply with (e.g.) a thread or conversation identifier. Having assigned the reply to a conversation, the server may transmit the reply 424 (at least) to the sending user.

According to exemplary embodiments, a reply by a receiving user to a sending user's ephemeral content message may be assigned to a one-to-one conversation between the sending user and the receiving user when the original ephemeral content message was transmitted as a broadcast. If the ephemeral content message was transmitted to a group, then replies may be sent on a one-to-one basis, or may be assigned to a conversation associated with the group. When assigning the reply to a group conversation, the server may verify that pairwise encrypted sessions exist between each pair or members of the group. If such sessions do not exist, the reply may be sent into a one-on-one conversation between the receiving user and the sender.

After transmitting the ephemeral content message 412, the sending user may add a new contact (in this case, a third user) to the sending user's contacts list. Accordingly, the sending user may transmit a new contact message 426 to the server. As shown in the example of FIG. 4, adding the new user to the sending user's contacts list does not cause a corresponding ephemeral content message to be sent to the third user client, even if the third user had previously included the sending user in the third user's contacts list (reverse asymmetry). The ephemeral content message remains unavailable to the third user client.

Similarly, the third user may add a new contact (in this case, the sending client) to the third user's contacts list. Accordingly, a new contact message 428 may be transmitted to the server. Again, adding the new user to the third user's contacts list does not cause a corresponding ephemeral content message to be sent to the third user, even if the sending user had previously included the third user in the sending user's contacts list (forward asymmetry).

Optionally, if the sending user had included the third user in the sending user's contacts list at the time the ephemeral content message 412 was broadcast, then later establishing a symmetric relationship (due to the new contact message 428) may cause the ephemeral content message 412 to be sent to the third user client or otherwise be made available to the third user client.

Exemplary Logic

Exemplary logic for implementing the above-described embodiments is next described in connection with FIGS. 5A-7C. The exemplary logic may be implemented in hardware, software, or a combination of hardware and software (e.g., being implemented at least partially in hardware).

Figure 5A:
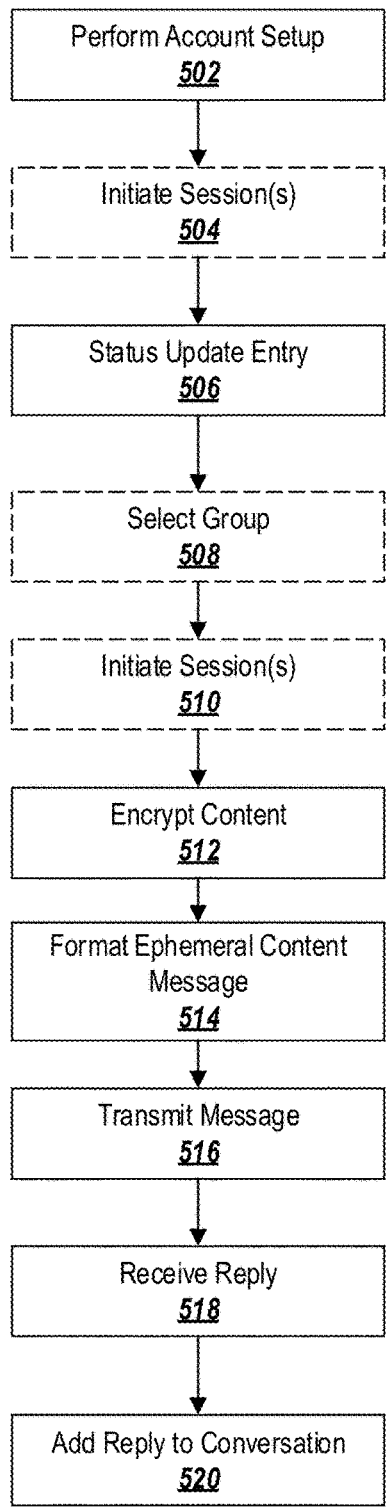
FIG. 5A is a flowchart depicting exemplary sending-client-side logic for generating an ephemeral content message.

FIG. 5A is a flowchart depicting exemplary logic 500 performed by a system, such as a sending client, for generating an ephemeral content message in a communications service.

At block 502, the system may perform initial account setup. The initial account setup may populate the client database of an intermediate server of the communications service with information used to establish encrypted sessions, such as the information described in connection with FIG. 3A.

The steps of block 502 may be performed when the user initially registers with the communication service, and/or when the user signs in to a new device, installs software of the communication service on a new device, updates existing software or hardware, etc.

At block 504, the system may optionally initiate an encrypted communications session with one or more other users. The system may transmit messages and perform operations similar to those described in connection with FIG. 3B The steps of block 504 may be performed when the user attempts to communicate with a user with whom no encrypted session currently exists, when the user updates their communications software, when the user At block 506, the system may enter into the ephemeral content message functionality of the communications service. An example of ephemeral content message entry is described in more detail in connection with FIG. 5B. As part of the ephemeral content message entry, content may be selected for the ephemeral content message, and an ephemeral content message may be generated.

At block 508, the system may optionally receive a selection of a group of recipients for the ephemeral content message. An interface may be presented allowing the user to select recipients from among the contacts list on the sending client. The list of selected recipients may be loaded into the ephemeral content message generated at block 514. If specific recipients are not selected, the ephemeral content message may be flagged for transmission to each member of the contacts list on the sending client. The contacts list may be loaded into the ephemeral content message generated at block 514.

At block 510, the system may optionally initiate encrypted communications sessions with any potential recipients identified at block 508, for whom a session was not previously initiated at block 504.

At block 512, the system may encrypt the content selected at block 506 and upload the encrypted content to a media server. To this end, the system may generate messages and perform operations similar to those described in connection with FIG. 3D.

At block 514, the system may generate a message including the ephemeral content. The contents may include an ephemeral content flag indicating that the message is an ephemeral content message. The contents may be encrypted, as previously described, and packaged with a public key for decrypting the message and the list of recipients generated at block 508.

At block 516, the system may transmit the message generated at block 514 to an intermediate server. The server may receive the message, remove the recipient list, and fan out the message to the recipients in the list.

At block 518, the system may receive a reply to the ephemeral content message from a server. The reply may be associated with a conversation ID and one or more participants. At block 520, the system may either identify a preexisting conversation associated with the conversation ID, or may generate a new conversation having the conversation ID and including the one or more participants. The original ephemeral content message may be included as a message in the conversation, and the reply received at block 518 may be added to the conversation. Processing may then terminate.

Figure 5B:
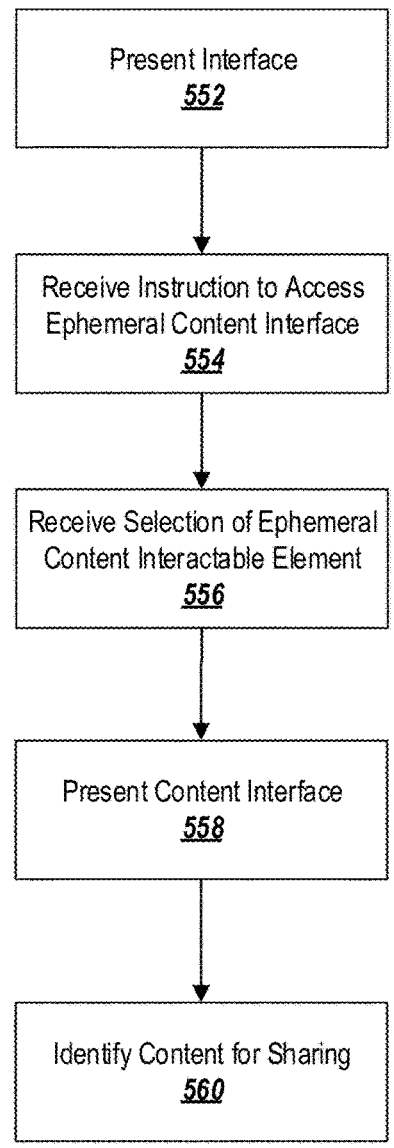
FIG. 5B is a flowchart depicting exemplary sending-client-side logic for processing a request to enter into a content sharing interface.

FIG. 5B is a flowchart depicting exemplary logic 550 performed by a system, such as a sending client, for processing a request to enter into a content sharing interface.

At block 552, the system may present an interface to a communications application, such as the interface depicted in FIG. 1A. The interface may include an ephemeral content icon for displaying an ephemeral content interface. At block 554, the system may receive an instruction to access the ephemeral content interface, such as by registering an interaction with the ephemeral content icon.

In response to receiving the instruction at block 554, at block 556 the system may display the ephemeral content interface, such as the interface depicted in FIG. 1B, and may receive a selection of an ephemeral content interactable element in the interface.

At block 558, the system may present a content selection/generation interface in response to receiving the content sharing selection. The content selection/generation interface may present one or more options for selecting preexisting content to be shared, or for generating new content. Examples of such an interfaces are depicted in FIGS. 1C and 1L.

At block 560, the system may receive content for sharing through the content interface. The content may be selected in the interface, or may be generated through the interface. Processing may then terminate.

Figure 6A:
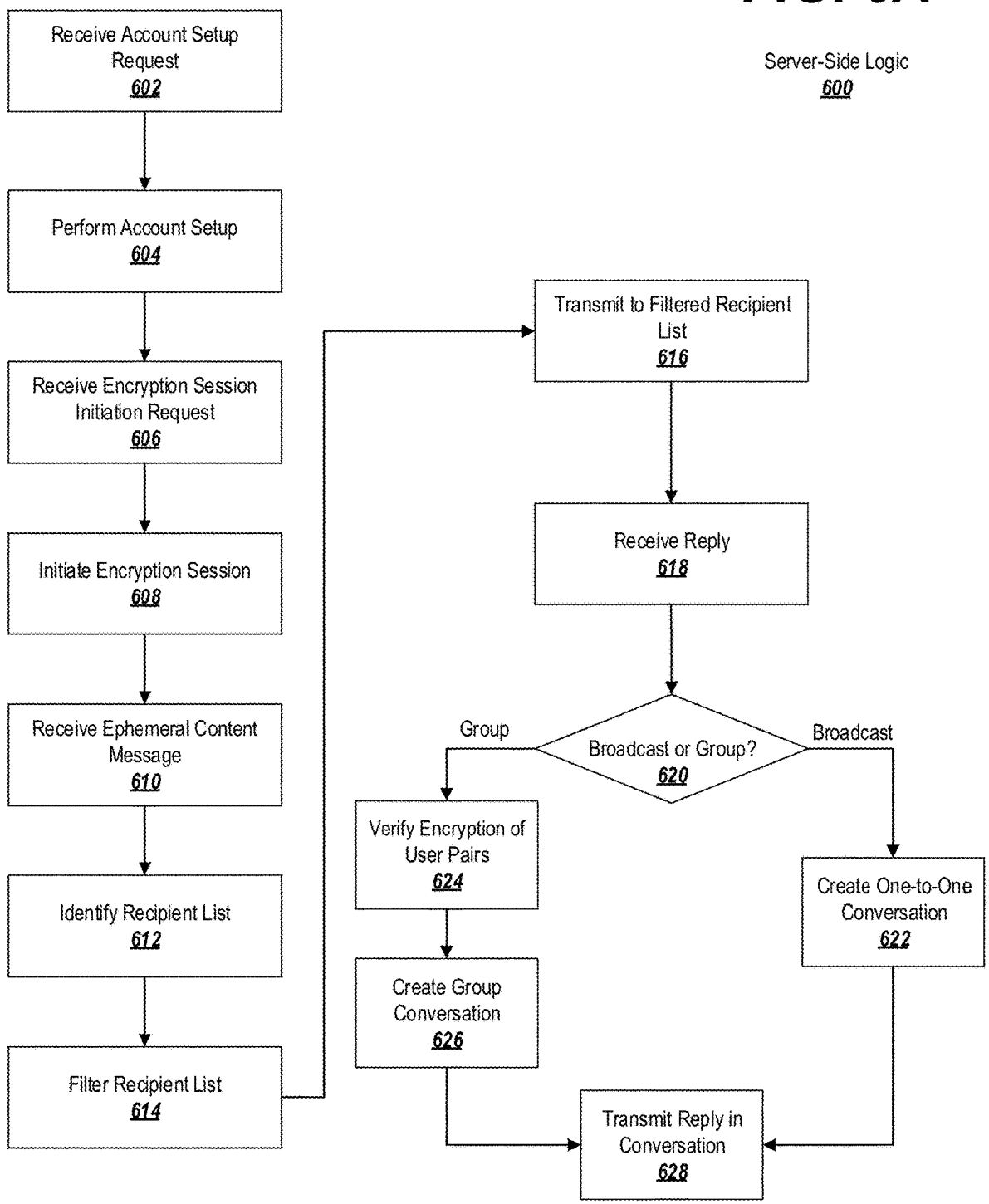
FIG. 6A is a flowchart depicting exemplary server-side logic for processing a transmission of an ephemeral content message.

FIG. 6A is a flowchart depicting exemplary logic 600 performed by a system, such as an intermediate server, for processing a transmission of an ephemeral content message.

At block 602, the system may receive an account setup request from a client, and may perform account setup in block 604. The system may receive a request to initiate an encryption session in block 606, and may initiate the encryption session at block 608. These blocks generally correspond to the client-side steps described in connection with blocks 502-504 of FIG. 5A, and further discussion is omitted here for the sake of brevity.

At block 610, the system may receive an ephemeral content message from a sending client. The ephemeral content message may be received as a message, and may in some embodiments be indistinguishable from other (non-ephemeral-content) messages received from the sending client. In other embodiments, the message may be flagged as including ephemeral content in a portion of the message that is accessible to the server, and the server may identify the message as an ephemeral content message and perform designated ephemeral-content-specific processing.

At block 612, the system may retrieve a recipient list from the message. If no recipient list is present (e.g., a predetermined location designated for the recipient list in the message is blank), then the system may assume that the message is intended to be a broadcast from the sending user to each of the contacts in the sending user's contacts list.

At block 614, the system may filter the contacts list to reduce unwanted messages. Block 614 is described in more detail in connection with FIG. 6B.

At block 616, the system may fan out the original message to the recipients in the filtered list. The transmitted messages may omit the recipient list identified in block 612, but may otherwise include the content and the decryption keys included in the original message.

At block 618, the system may receive a reply to the ephemeral content message from one or more of the recipients to whom the message was transmitted in block 616. Depending on whether the original message was transmitted as a group message or a broadcast, the system may assign the replies to different types of conversations. Therefore, at block 620, the system may determine whether the original ephemeral content message was a broadcast or group message. If the original message did not specify recipients, or specified all the recipients in the sending user's contacts list, or was otherwise flagged as a broadcast message, then the system may determine that the original ephemeral content message was transmitted as part of a broadcast. On the other hand, if the original message specified a limited number of recipients less than the entire contacts list of the sender, or specified a conversation ID for a group conversation to identify recipients, or was otherwise flagged as a group message, then the system may determine that the original ephemeral content message was transmitted as part of a group message.

If the ephemeral content message was transmitted as a broadcast, then at block 622 the system may assign the reply to a one-to-one conversation between the original sender and the replying recipient. The system may maintain a list of active conversations involving each user, and may examine the list to determine if a one-to-one conversation already exists between these two users. If so, the conversation ID of the existing conversation may be retrieved, and the reply may be associated with the conversation ID (the original ephemeral content message may also be associated with the conversation ID). If not, a new conversation ID may be generated and associated with the two users. The reply and the original message may be associated with the new conversation ID.

If the original ephemeral content message was transmitted as a group message, then at block 624 the system may verify that each pair of users in the group is associated with an encrypted session. This block may be used to ensure the security of group messages. Although it is likely that pairwise encrypted sessions exist between the original sender of the ephemeral content and each of the recipients of the ephemeral content (performed at blocks 504 and/or 510 of FIG. 5A), it cannot necessarily be assumed that the recipients have pairwise encrypted sessions with each other. If necessary, the system may initiate encrypted sessions between any pairs of recipients that do not have pairwise encrypted sessions.

Processing may then proceed to block 626, where the system assigns the reply to a group conversation. The system may examine the above-described conversation list to determine if a group conversation already exists between these sender and recipients. If so, the conversation ID of the existing conversation may be retrieved, and the reply may be associated with the conversation ID (the original ephemeral content message may also be associated with the conversation ID). If not, a new conversation ID may be generated and associated with the participants. The reply and the original message may be associated with the new conversation ID.

At block 628, the system may transmit the reply as part of the conversation identified in block 622 or block 626. Processing may then terminate.

Figure 6B:
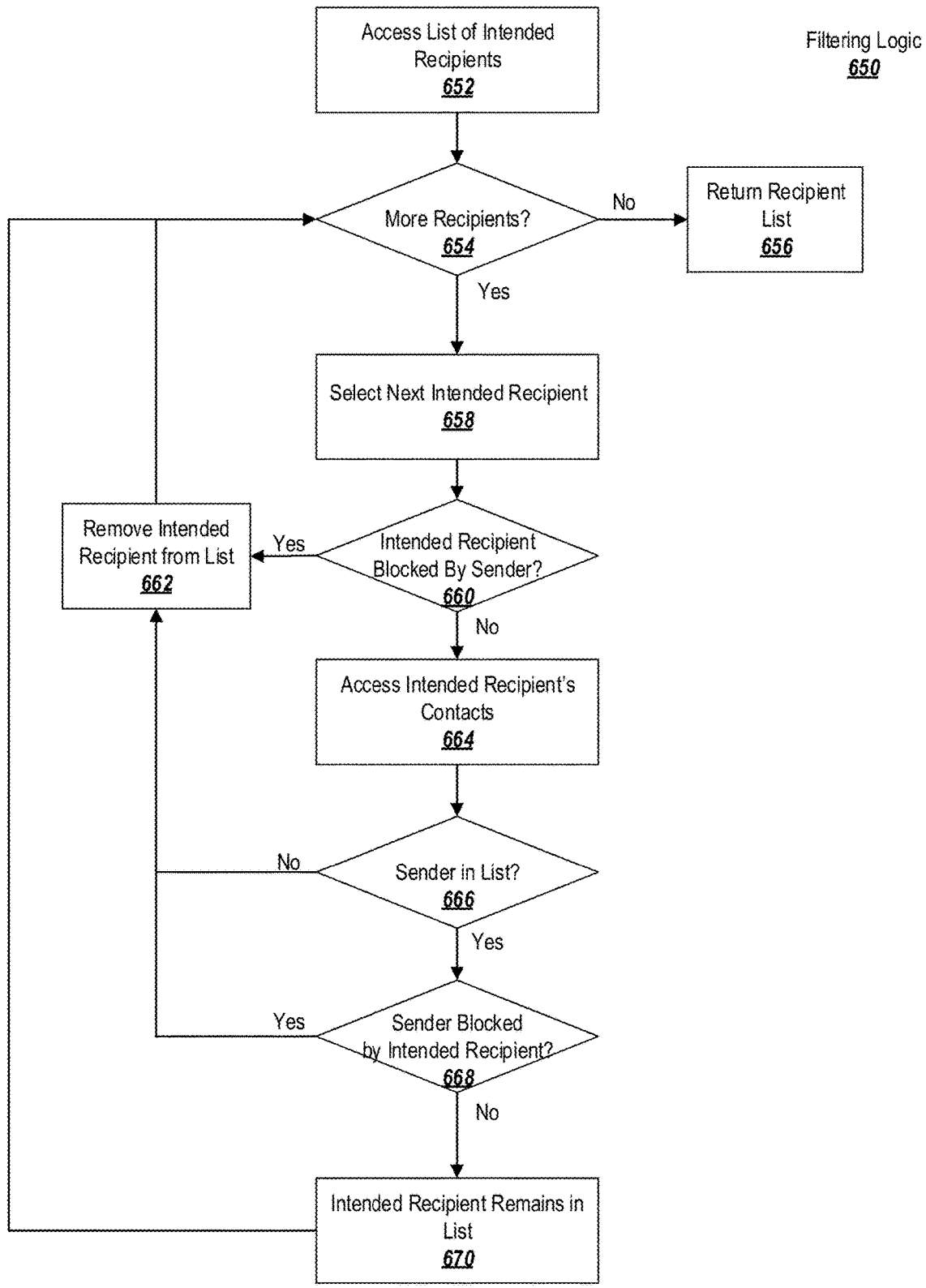
FIG. 6B is a flowchart depicting exemplary server-side logic for filtering a list of contacts.

FIG. 6B is a flowchart depicting exemplary logic 650 performed by a system, such as an intermediate server, for filtering a list of contacts upon receipt of an ephemeral content message. The ephemeral content message may be transmitted as a broadcast, or to a group of specified recipients.

At block 652, the system may access a list of intended recipients of the ephemeral content message. In the case of a broadcast, the initial list of intended recipients may be the contacts list of the sending user. In the case of a group of specified recipients (e.g., the participants in a conversation, a selected group, etc.), the sending client may specify the recipients by providing a list, by providing a conversation or thread ID (from which the participants in the conversation may be derived), or by some other means. In some embodiments, the sending client may also specify the group of recipients in the event of a broadcast. In either case, the sending client may append a list of intended recipients to the ephemeral content message.

At block 654, the system may determine if any further potential recipients remain to be processed. If not, then processing may proceed to block 565 and the system may return the filtered recipient list as the final list of recipients of the message.

If the system determines, at block 654, that more potential recipients remain to be processed, then processing may proceed to block 658 and the next potential recipient in the sending user's contacts list may be selected for review.

At block 660, the system may determine whether the selected intended recipient has been blocked by the sender. For example, the system may access the sending user's contacts list and determine whether an entry associated with the selected intended recipient is associated with a blocked flag. If so (i.e., the selected intended recipient is blocked by the sender), then processing may proceed to block 662 and the selected intended recipient may be removed from the list of recipients to whom the message will be sent. Processing may then return to block 654 and the system may determine whether additional potential recipients remain for evaluation.

If not (i.e., the selected intended recipient is not blocked by the sender), then processing may proceed to block 664.

At block 664, the system may access the selected intended recipient's contacts list. For example, the system may access the client database 206 and perform a lookup based on the selected intended recipient's user ID. The system may access the contacts list 312 associated with the selected intended recipient and search the contact UIDs 314-$i$ therein for the sending user.

At block 666, the system may determine whether the sender is in the contacts list associated with the selected intended recipient. If not, then processing may proceed to block 662 and the selected intended recipient may be filtered out of the list of recipients (due to reverse asymmetry).

If so (i.e., the sending user was found in the selected intended recipient's contacts list), then processing may proceed to block 668. At block 668, the system may determine whether the sender has been blocked by the intended recipient. For example, the system may determine whether the contact entry associated with the sending user in the intended recipient's contacts list (as retrieved in block 666) is associated with a blocked flag. If so, processing may proceed to block 662 and the selected intended recipient may be filtered out of the list of recipients.

If not, processing may proceed to block 670 and the selected intended recipient may be included in the list of recipients of the ephemeral content message. Processing may then return to block 654 and the system may determine whether additional potential recipients remain for evaluation.

Figure 7A:
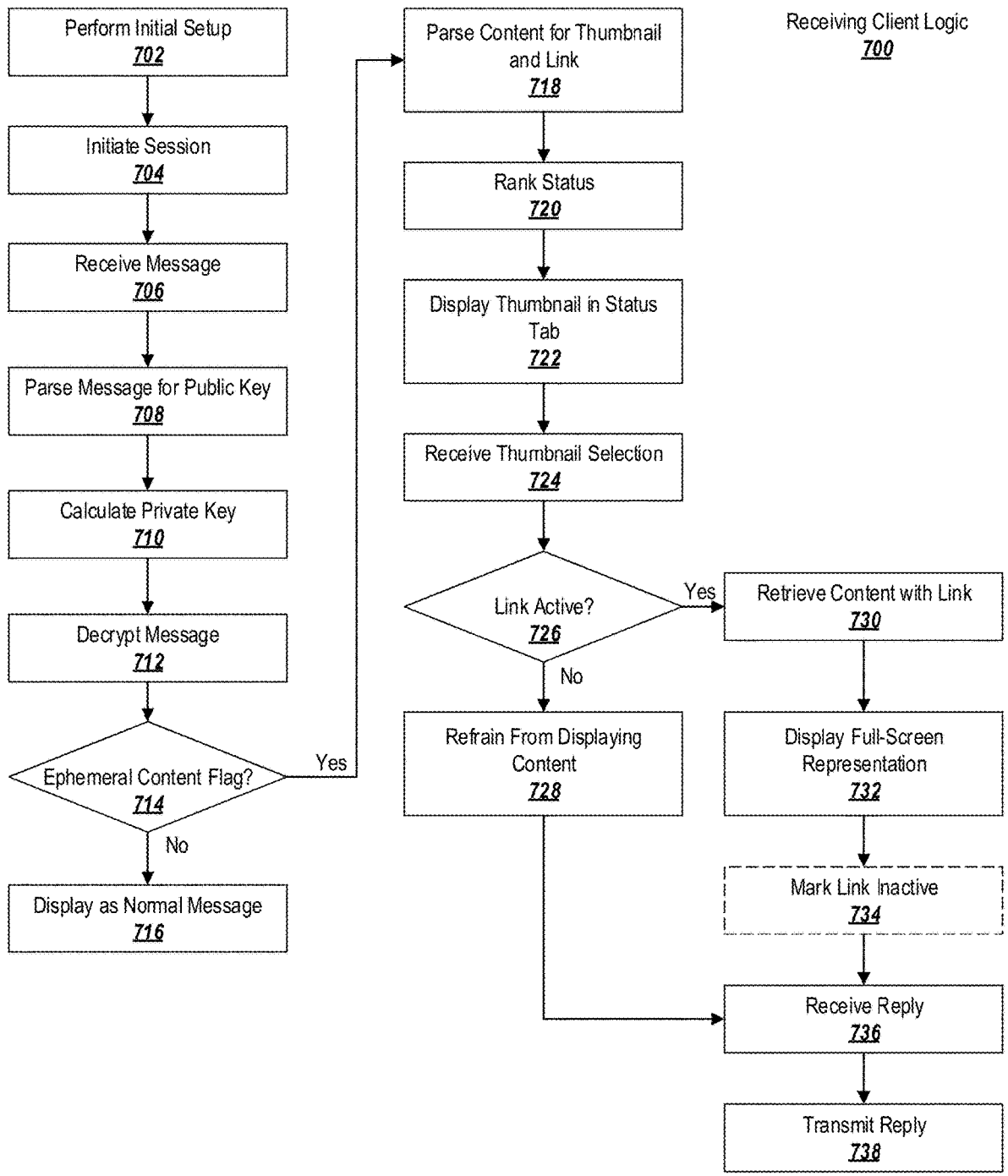
FIG. 7A is a flowchart depicting exemplary receiving-client-side logic for displaying an ephemeral content message.

FIG. 7A is a flowchart depicting exemplary logic 700 performed by a system, such as a receiving client, for displaying an ephemeral content message.

At block 702, the system may perform initial setup with the communications service, and at block 704 may initiate an encryption session. These blocks generally correspond to the client-side steps described in connection with blocks 502-504 of FIG. 5A, and further discussion is omitted here for the sake of brevity.

At block 706, the system may receive an encrypted message in the session initiated in block 704. At block 708, the system may parse the message to retrieve a public key, and at block 710 may calculate its own private key. At block 712, the system may decrypt the message using the public and private keys. The general procedure for decrypting messages has been described above in connection with FIGS. 3A-3E.

At block 714, the system may determine whether an ephemeral content flag is present in, or associated with, the decrypted message. If not, then processing may proceed to block 716 and the decrypted content may be displayed as a normal message in a conversation. If so, then processing may proceed to block 718.

At block 718, the system may process the message as an ephemeral content message. The system may parse the content of the message to retrieve a thumbnail of media (or an indicator designating a locally-stored thumbnail to be used) and a link to the media stored on the blob store.

The system may determine a rank of the ephemeral content message at block 720 so that the ephemeral content message may be displayed in the ranked order. Block 720 is described in more detail in connection with FIG. 7B.

At block 722, the system may display the thumbnail in one or more ephemeral content tabs or portions of an interface dedicated to ephemeral content messages. An example of such an interface is described in connection with FIGS. 1B and 1D. As part of the processing performed at block 720, the system may calculate an interest score associated with the ephemeral content message. Recent ephemeral content messages (e.g., within a predetermined period of time) and/or a predetermined number of ephemeral content messages may be displayed in a ranked order based on the interest score.

At block 724, the system may receive a selection of the thumbnail. The selection may be received in the portion of the interface dedicated to ephemeral content message, in a message in a conversation, etc.

At block 726, the system may determine if the link is currently active. For example, the link may be set as inactive after a predetermined amount of time, or after the content has been viewed a predetermined number of times. The conditions under which the link becomes in active may be specified as part of the link or otherwise in the ephemeral content message. If no conditions are specified, the system may apply default conditions, or the link may be set to remain permanently active.

If the link is not currently active at block 726, then at block 728 the system may refrain from displaying the content. If the link is active at block 726, then processing may proceed to block 730.

At block 730, the system may retrieve the content using the link and decrypt the content. The procedure for retrieving and decrypting the content has been described above in connection with FIG. 3D.

At block 732, the system may display a full-screen or enlarged representation of the content item. Examples of interfaces for displaying a full-screen or enlarged representation of the content item are described in connection with FIGS. 1E-1I.

At block 734, the system may optionally mark the link as inactive upon displaying the full-screen notification. This may be used, for example, in the case where the ephemerality model for the content is such that the content is only able to be viewed once, or in order to force the receiving client to redownload the content each time that the content is requested, so that the content does not remain on the local device between times when the content is accessed.

At block 736, the system may receive a reply to the ephemeral content message. For example, the user may select a reply option in the full-screen presentation, reply to a message including the ephemeral content message, etc. At block 738, the system may transmit the reply to the server. Processing may then terminate.

Figure 7B:
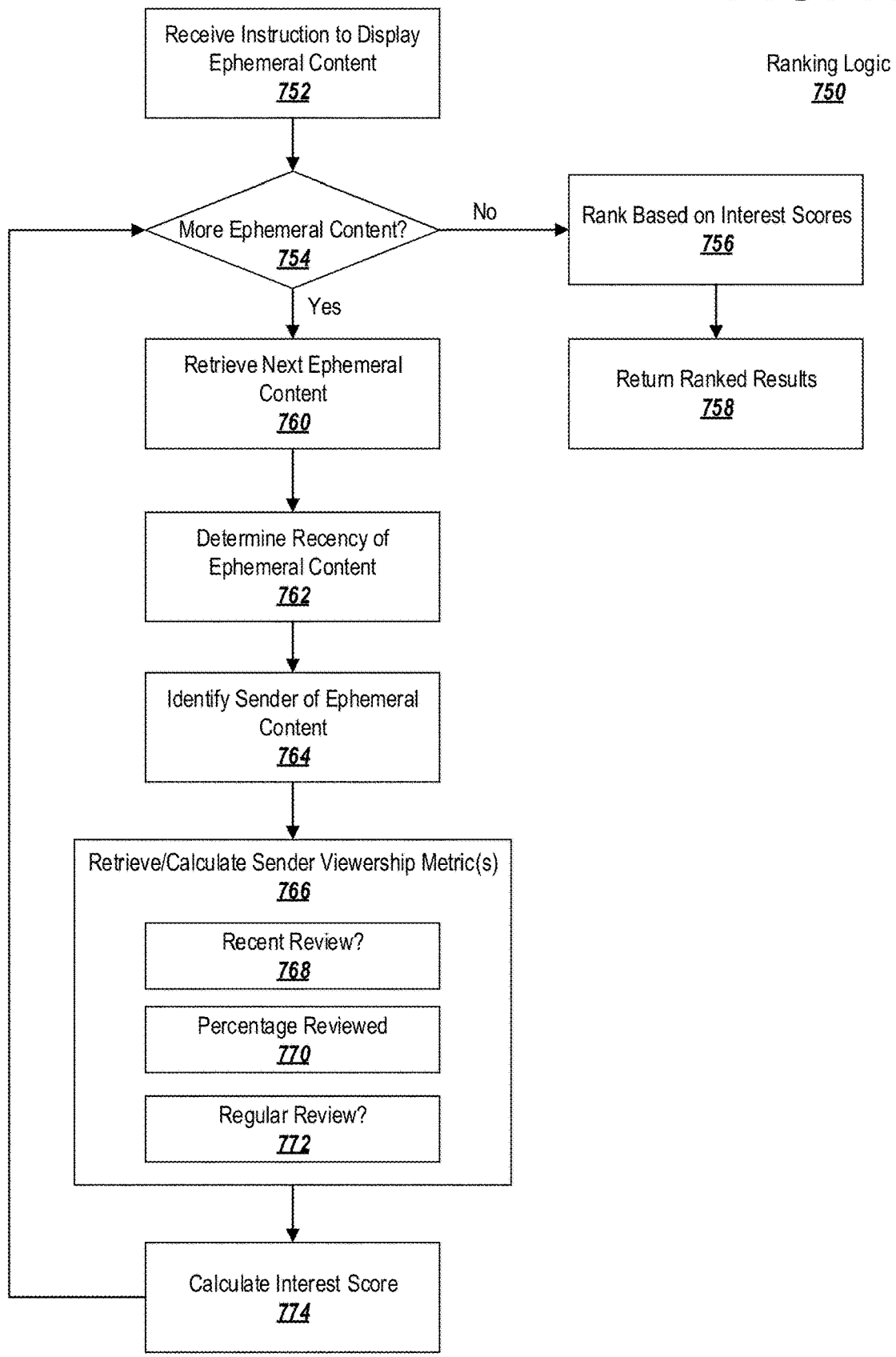
FIG. 7B is a flowchart depicting exemplary receiving-client-side logic for ranking ephemeral content.

FIG. 7B is a flowchart depicting exemplary logic 750 performed by a system, such as a sending client, for ranking ephemeral content messages.

At block 752, the system may receive an instruction to display ephemeral content messages. For example, when loading an interface of a communication application, one or more portions of the interface may be dedicated to displaying ephemeral content messages. Recent ephemeral content messages accessible to the local user may be stored in a queue on the local device or the server. When loading the portion(s) of the interface, the system may instruct the ranking logic 750 to rank the queued ephemeral content messages.

The system may set up an output queue or list of user IDs associated with ephemeral content messages. UIDs may be placed into the output queue or list in the order in which they are ranked. The output queue or list may be initially empty and UIDs associated with ephemeral content messages may be added to the list as the ephemeral content messages are evaluated.

At block 754, the system may determine whether additional ephemeral content messages remain to be ranked. For example, the system may receive a list of recent ephemeral content messages transmitted to the receiving client by the server. The list may include each ephemeral content message transmitted to the receiving client within a predetermined amount of time, or may include a predetermined number of ephemeral content messages, etc. At block 754, the system may determine whether all of the ephemeral content messages on the list have been evaluated.

If not, then at block 756, the system may rank the ephemeral content messages based on calculated interest scores (as described below), if the system has not been performing rankings as each ephemeral content message is evaluated. The ranked ephemeral content messages may be added to the output queue or list in the ranked order. At block 758, the system may return the ranked results.

If there are ephemeral content messages remain for evaluation at block 754, then processing may proceed to block 760. At block 760, the system may retrieve the next ephemeral content message to be evaluated (e.g., from the server, or a local input queue).

At block 762, the system may determine a regency of the ephemeral content message under evaluation. The ephemeral content message may be associated with a time stamp, and the system may determine an amount of time that has elapsed since the timestamp. A recency score may be calculated based on the amount of elapsed time.

At block 764, the system may identify a sender of the ephemeral content message. The sender may be identified in connection with the ephemeral content message. The system may maintain viewership metrics associated with each of the contacts in a contacts list on the system, and the metrics corresponding to the sender may be retrieved at block 764.

At block 766, the system may evaluate the viewership metrics associated with the sender. For example, at block 768 the system may determine whether the current user has recently (e.g., within a predetermined amount of time) reviewed an ephemeral content message from the sender. The system may calculate a recent review score based on the most recently-reviewed ephemeral content message.

At block 770, the system may determine a percentage or proportion of recent (or all-time) ephemeral content messages from the sender that the current user has reviewed. The system may calculate a percentage reviewed score based on the percentage or proportion.

At block 772, the system may determine whether the current user has regularly reviewed ephemeral content messages from the sender. For example, the system may determine how often the user reviews the sender's ephemeral content messages as a function of frequency over a period of time. Based on the regularity of the review, a regular review score may be calculated.

At block 774, the system may calculate an interest score based on the metrics evaluated at blocks 762 and 766. The metrics may be weighted and accumulated to arrive at the interest score. The weightings may vary based on the application.

Processing may then return to block 754, and the system may determine whether additional ephemeral content messages remain to be evaluated.

Communications System Overview

Figure 8A:
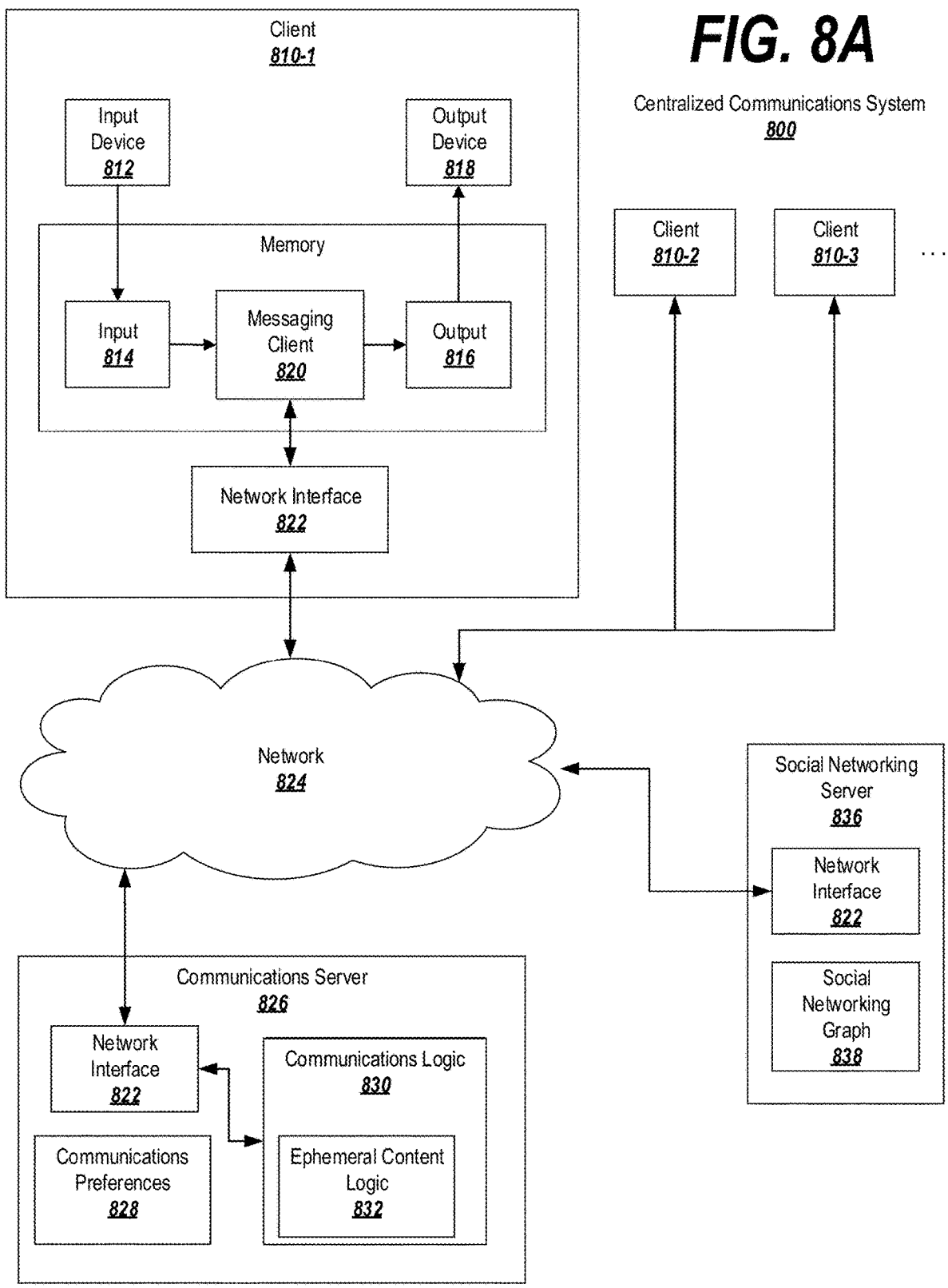
FIG. 8A is a block diagram providing an overview of a system including an exemplary centralized communications service.
Figure 8C:
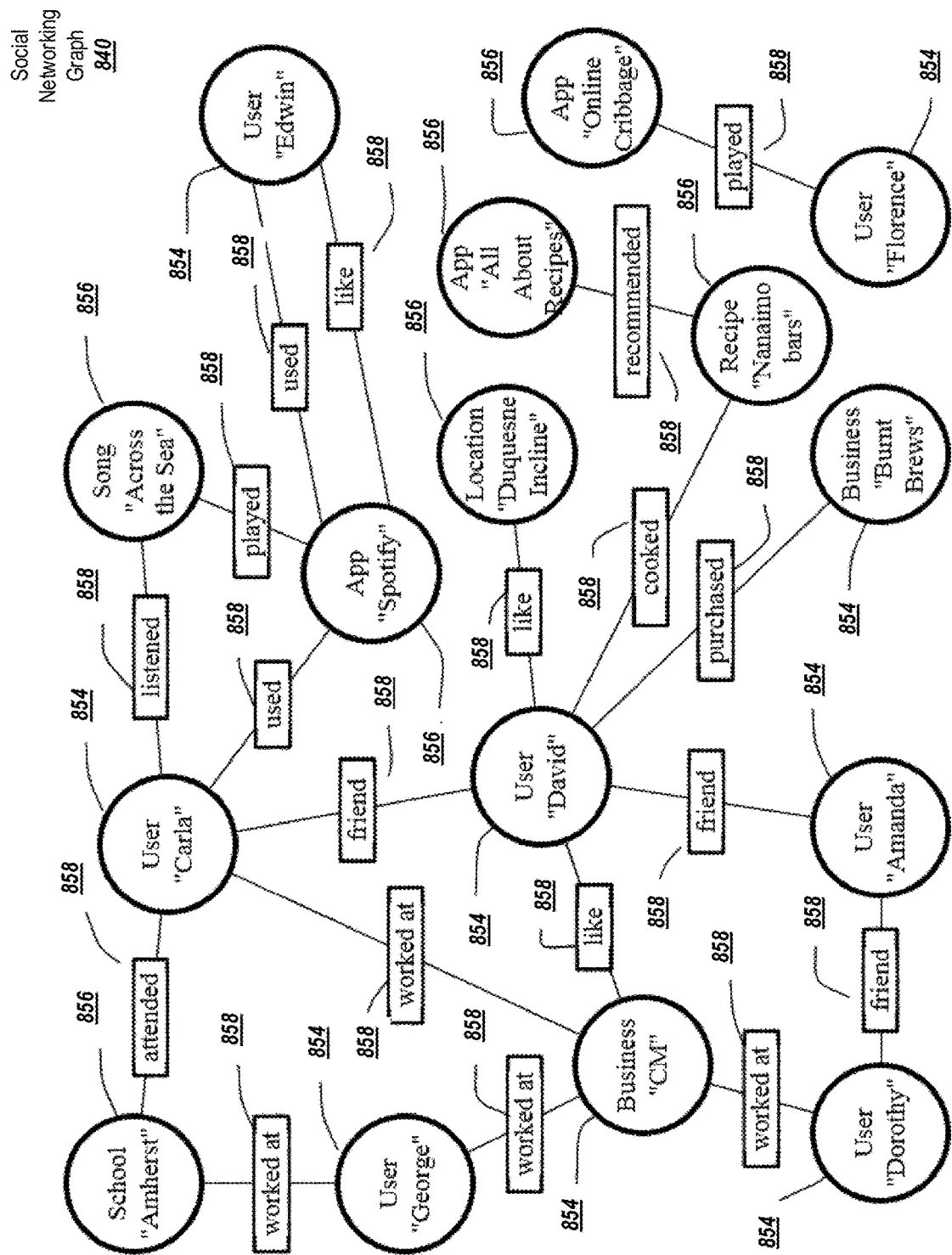
FIG. 8C depicts the social networking graph of FIGS. 8A-8B in more detail.

These examples may be implemented by a communications system that is provided locally, at a client device, or remotely (e.g., at a remote server), or some combination thereof. FIGS. 8A-8C depict various examples of communications systems, and are discussed in more detail below.

FIG. 8A depicts an exemplary centralized communications system 800, which facilitates encrypted communication between two or more users. The centralized system 800 may implement some or all of the structure and/or operations of a messaging or communications service in a single computing entity, such as entirely within a single centralized server device 826.

The communications system 800 may include a computer-implemented system having software applications that include one or more components. Although the communications system 800 shown in FIG. 8A has a limited number of elements in a certain topology, the communications system 800 may include more or fewer elements in alternate topologies.

A communications service 800 may be generally arranged to receive, store, and deliver communications, such as messages. The communications may include or may be associated with media or content items.

A client device 810 may transmit communications addressed to one or more recipient users, user accounts, or other identifiers resolving to receiving client devices 810. In exemplary embodiments, each of the client devices 810 and their respective clients 820 are associated with a particular user or users of the communications service 800. In some embodiments, the client devices 810 may be cellular devices such as smartphones and may be identified to the communications service 800 based on a phone number associated with each of the client devices 810. In some embodiments, each client may be associated with a user account registered with the communications service 800. In general, each client may be addressed through various techniques for the reception of communications. While in some embodiments the client devices 810 may be cellular devices, in other embodiments one or more of the client devices 810 may be personal computers, tablet devices, any other form of computing device.

The client 810 may include one or more input devices 812 and one or more output devices 818. The input devices 812 may include, for example, microphones, keyboards, cameras, electronic pens, touch screens, and other devices for receiving inputs including message data, requests, commands, user interface interactions, selections, and other types of input. The output devices 818 may include a speaker, a display device such as a monitor or touch screen, and other devices for presenting an interface to the communications system 800.

The client 810 may include a memory, which may be a non-transitory computer readable storage medium, such as one or a combination of a hard drive, solid state drive, flash storage, read only memory, or random access memory. The memory may a representation of an input 814 and/or a representation of an output 816, as well as one or more applications. For example, the memory may store a messaging client 820 and/or a social networking client that allows a user to interact with a social networking service.

The input 814 may be textual, such as in the case where the input device 812 is a keyboard. Alternatively, the input 814 may be an audio or video recording, such as in the case where the input device 812 is a microphone or camera.

The input 814 may be subjected to automatic speech recognition (ASR) logic in order to transform the audio recording to text that is processable by the messaging system 800. The ASR logic may be located at the client device 810 (so that the audio recording is processed locally by the client 810 and corresponding text is transmitted to the communications server 826), or may be located remotely at the communications server 826 (in which case, the audio recording may be transmitted to the communications server 826 and the communications server 826 may process the audio into text). Other combinations are also possible—for example, if the input device 812 is a touch pad or electronic pen, the input 814 may be in the form of handwriting, which may be subjected to handwriting or optical character recognition analysis logic in order to transform the input 812 into processable text.

The client 810 may be provided with a network interface 822 for communicating with a network 824, such as the Internet. The network interface 822 may transmit the input 812 in a format and/or using a protocol compatible with the network 824 and may receive a corresponding output 816 from the network 824.

The network interface 822 may communicate through the network 824 to a communications server 826. The messaging server 826 may be operative to receive, store, and forward messages between messaging clients.

The communications server 826 may include a network interface 822, communications preferences 828, and communications logic 830. The communications preferences 828 may include one or more privacy settings for one or more users and/or video communications. For example, the communications preferences 828 may include one or more settings, including default settings, for the logic described herein.

The communications logic 830 may include ephemeral content logic 832 for generating, processing, and/or displaying ephemeral content messages, as described above (the ephemeral content logic 832 may also or alternatively be provided on the clients 810).

The network interface 822 of the client 810 and/or the communications server 826 may also be used to communicate through the network 824 with a social networking server 836. The social networking server 836 may include or may interact with a social networking graph 838 that defines connections in a social network. Furthermore, the communications server 826 may connect to the social networking server 836 for various purposes, such as retrieving connection information, messaging history, event details, etc. from the social network.

A user of the client 810 may be an individual (human user), an entity (e.g., an enterprise, business, or third-party application), or a group (e.g., of individuals or entities) that interacts or communicates with or over the social networking server 836. The social-networking server 836 may be a network-addressable computing system hosting an online social network. The social networking server 836 may generate, store, receive, and send social-networking data, such as, for example, user-profile data, concept-profile data, social-graph information, or other suitable data related to the online social network. The social networking server 836 may be accessed by the other components of the network environment either directly or via the network 824.

The social networking server 836 may include an authorization server (or other suitable component(s)) that allows users to opt in to or opt out of having their actions logged by social-networking server 836 or shared with other systems (e.g., third-party systems, such as the messaging server 826), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 836 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 838. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 836 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 836 may send a request to the data store for the object. The request may identify the user associated with the request. The requested data object may only be sent to the user (or a client system 810 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 836 or explicit connections of a user to a node, object, entity, brand, or page on social networking server 836. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 8A may be well-suited to deployment as a new system or as an upgrade to an existing system, because the logic is incorporated into the messaging server 826. In contrast, FIG. 8B depicts an exemplary distributed messaging system 850, in which functionality for selecting dominant/relevant participants and displaying a reduced-size interface is distributed and remotely accessible from the messaging server. Examples of a distributed system 850 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 8B are identical to those in FIG. 8A, and a description of these elements is not repeated here for the sake of brevity. The primary difference between the centralized embodiment and the distributed embodiment is the addition of a separate ephemeral server 852, which hosts the relevant ephemeral content logic 832. The ephemeral server 852 may be distinct from the communications server 826 but may communicate with the communications server 826, either directly or through the network 824, to provide the functionality of the ephemeral content logic 832 to the communications server 826.

The embodiment depicted in FIG. 8B may be particularly well suited to allow exemplary embodiments to be deployed alongside existing messaging systems, for example when it is difficult or undesirable to replace an existing messaging server. Additionally, in some cases the communications server 826 may have limited resources (e.g. processing or memory resources) that limit or preclude the addition of the additional pivot functionality. In such situations, the capabilities described herein may still be provided through the separate communications server 852.

FIG. 8C illustrates an example of a social networking graph 838. In exemplary embodiments, a social networking service may store one or more social graphs 838 in one or more data stores as a social graph data structure via the social networking service.

The social graph 838 may include multiple nodes, such as user nodes 854 and concept nodes 856. The social graph 838 may furthermore include edges 858 connecting the nodes. The nodes and edges of social graph 838 may be stored as data objects, for example, in a data store (such as a social-graph database). Such a data store may include one or more searchable or queryable indexes of nodes or edges of social graph 838.

The social graph 838 may be accessed by a social-networking server 826, client system 810, third-party system, or any other approved system or device for suitable applications.

A user node 854 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 854 corresponding to the user, and store the user node 854 in one or more data stores. Users and user nodes 854 described herein may, where appropriate, refer to registered users and user nodes 854 associated with registered users. In addition or as an alternative, users and user nodes 854 described herein may, where appropriate, refer to users that have not registered with the social-networking system. In particular embodiments, a user node 854 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 854 may be associated with one or more data objects corresponding to information associated with a user. In particular embodiments, a user node 854 may correspond to one or more webpages. A user node 854 may be associated with a unique user identifier for the user in the social-networking system.

In particular embodiments, a concept node 856 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 856 may be associated with one or more data objects corresponding to information associated with concept node 856. In particular embodiments, a concept node 856 may correspond to one or more webpages.

In particular embodiments, a node in social graph 838 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 856. Profile pages may be viewable by all or a selected subset of other users. As an example and not by way of limitation, a user node 854 may have a corresponding user-profile page in which the corresponding user may add content, make declarations, or otherwise express himself or herself. A business page may comprise a user-profile page for a commerce entity. As another example and not by way of limitation, a concept node 856 may have a corresponding concept-profile page in which one or more users may add content, make declarations, or express themselves, particularly in relation to the concept corresponding to concept node 856.

In particular embodiments, a concept node 856 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge)

between a user node 854 corresponding to the user and a concept node 856 corresponding to the third-party webpage or resource and store edge 858 in one or more data stores.

In particular embodiments, a pair of nodes in social graph 838 may be connected to each other by one or more edges 858. An edge 858 connecting a pair of nodes may represent a relationship between the pair of nodes. In particular embodiments, an edge 858 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 858 connecting the first user's user node 854 to the second user's user node 854 in social graph 838 and store edge 858 as social-graph information in one or more data stores. In the example of FIG. 8C, social graph 838 includes an edge 858 indicating a friend relation between user nodes 854 of user "Amanda" and user "Dorothy." Although this disclosure describes or illustrates particular edges 858 with particular attributes connecting particular user nodes 854, this disclosure contemplates any suitable edges 858 with any suitable attributes connecting user nodes 854. As an example and not by way of limitation, an edge 858 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 838 by one or more edges 858.

In particular embodiments, an edge 858 between a user node 854 and a concept node 856 may represent a particular action or activity performed by a user associated with user node 854 toward a concept associated with a concept node 856. As an example and not by way of limitation, as illustrated in FIG. 8C, a user may "like," "attended," "played," "listened," "cooked," "worked at," or "watched" a concept, each of which may correspond to an edge type or subtype. A concept-profile page corresponding to a concept node 856 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 858 and a "used" edge (as illustrated in FIG. 8C) between user nodes 854 corresponding to the user and concept nodes 856 corresponding to the song and application to indicate that the user listened to the song and used the application. Moreover, the social-networking system may create a "played" edge 858 (as illustrated in FIG. 8C) between concept nodes 856 corresponding to the song and the application to indicate that the particular song was played by the particular application. In this case, "played" edge 858 corresponds to an action performed by an external application (SPOTIFY) on an external audio file (the song "Across the Sea"). Although this disclosure describes particular edges 858 with particular attributes connecting user nodes 854 and concept nodes 856, this disclosure contemplates any suitable edges 858 with any suitable attributes connecting user nodes 854 and concept nodes 856. Moreover, although this disclosure describes edges between a user node 854 and a concept node 856 representing a single relationship, this disclosure contemplates edges between a user node 854 and a concept node 856 representing one or more relationships. As an example and not by way of limitation, an edge 858 may represent both that a user likes and has used at a particular concept. Alternatively, another edge 858 may represent each type of relationship (or multiples of a single relationship) between a user node 854 and a concept node 856 (as illustrated in FIG. 8C between user node 854 for user "Edwin" and concept node 856 for "SPOTIFY").

In particular embodiments, the social-networking system may create an edge 858 between a user node 854 and a concept node 856 in social graph 838. As an example and not by way of limitation, a user viewing a concept-profile page (such as, for example, by using a web browser or a special-purpose application hosted by the user's client system) may indicate that he or she likes the concept represented by the concept node 856 by clicking or selecting a "Like" icon, which may cause the user's client system to send to the social-networking system a message indicating the user's liking of the concept associated with the concept-profile page. In response to the message, the social-networking system may create an edge 858 between user node 854 associated with the user and concept node 856, as illustrated by "like" edge 858 between the user and concept node 856. In particular embodiments, the social-networking system may store an edge 858 in one or more data stores. In particular embodiments, an edge 858 may be automatically formed by the social-networking system in response to a particular user action. As an example and not by way of limitation, if a first user uploads a picture, watches a movie, or listens to a song, an edge 858 may be formed between user node 854 corresponding to the first user and concept nodes 856 corresponding to those concepts. Although this disclosure describes forming particular edges 858 in particular manners, this disclosure contemplates forming any suitable edges 858 in any suitable manner.

The social graph 838 may further comprise a plurality of product nodes. Product nodes may represent particular products that may be associated with a particular business. A business may provide a product catalog to a consumer-to-business service and the consumer-to-business service may therefore represent each of the products within the product in the social graph 838 with each product being in a distinct product node. A product node may comprise information relating to the product, such as pricing information, descriptive information, manufacturer information, availability information, and other relevant information. For example, each of the items on a menu for a restaurant may be represented within the social graph 838 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 838. The information for a product node may be manipulated by the social-networking system as a product object that encapsulates information regarding the referenced product.

As such, the social graph 838 may be used to infer shared interests, shared experiences, or other shared or common attributes of two or more users of a social-networking system. For instance, two or more users each having an edge to a common business, product, media item, institution, or other entity represented in the social graph 838 may indicate a shared relationship with that entity, which may be used to suggest customization of a use of a social-networking system, including a messaging system, for one or more users.

The embodiments described above may be performed by a messaging architecture, an example of which is next described with reference to FIG. 9.

Messaging Architecture

Figure 9:
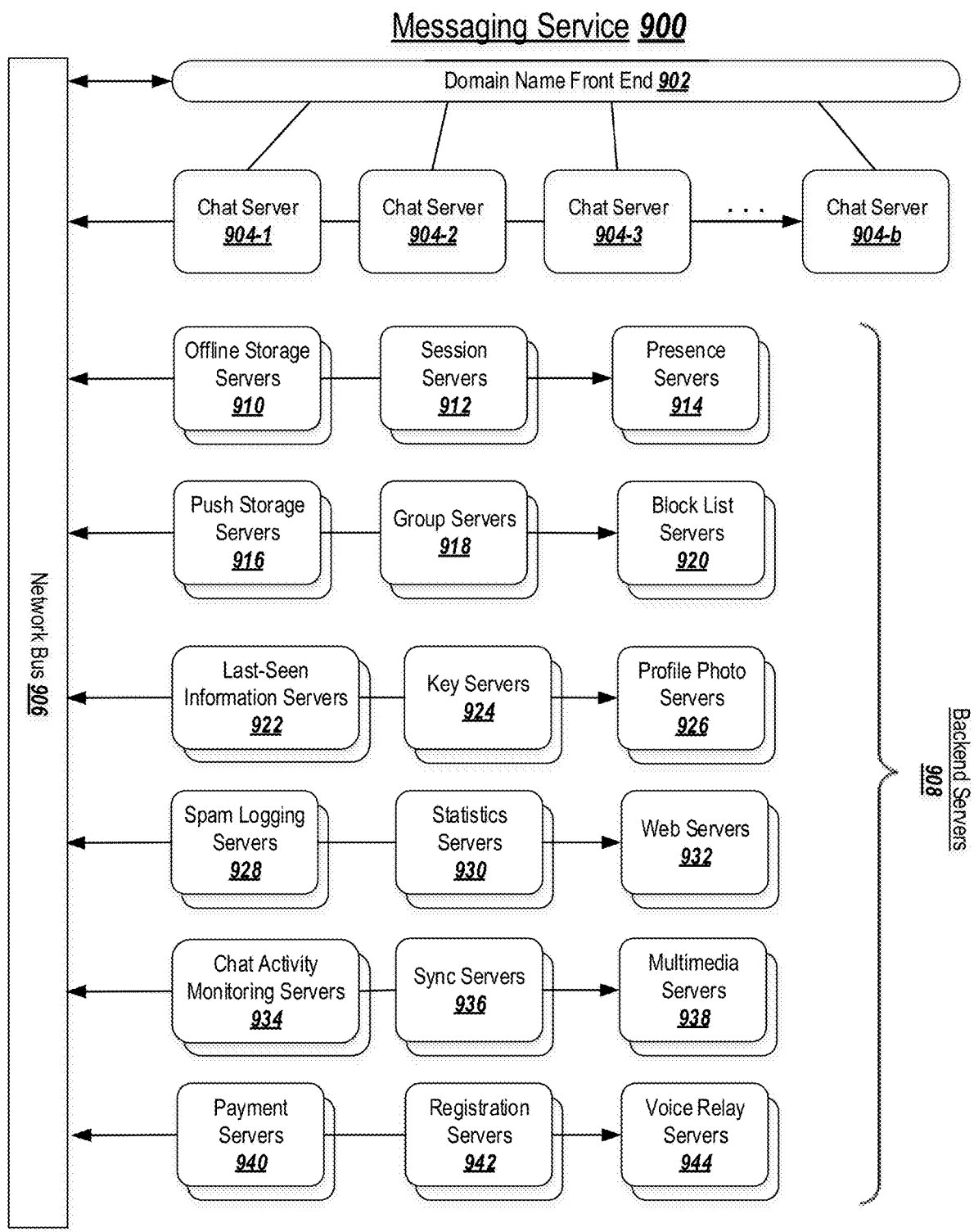
FIG. 9 is a block diagram depicting an example of a system for a messaging service.
Figure 10:
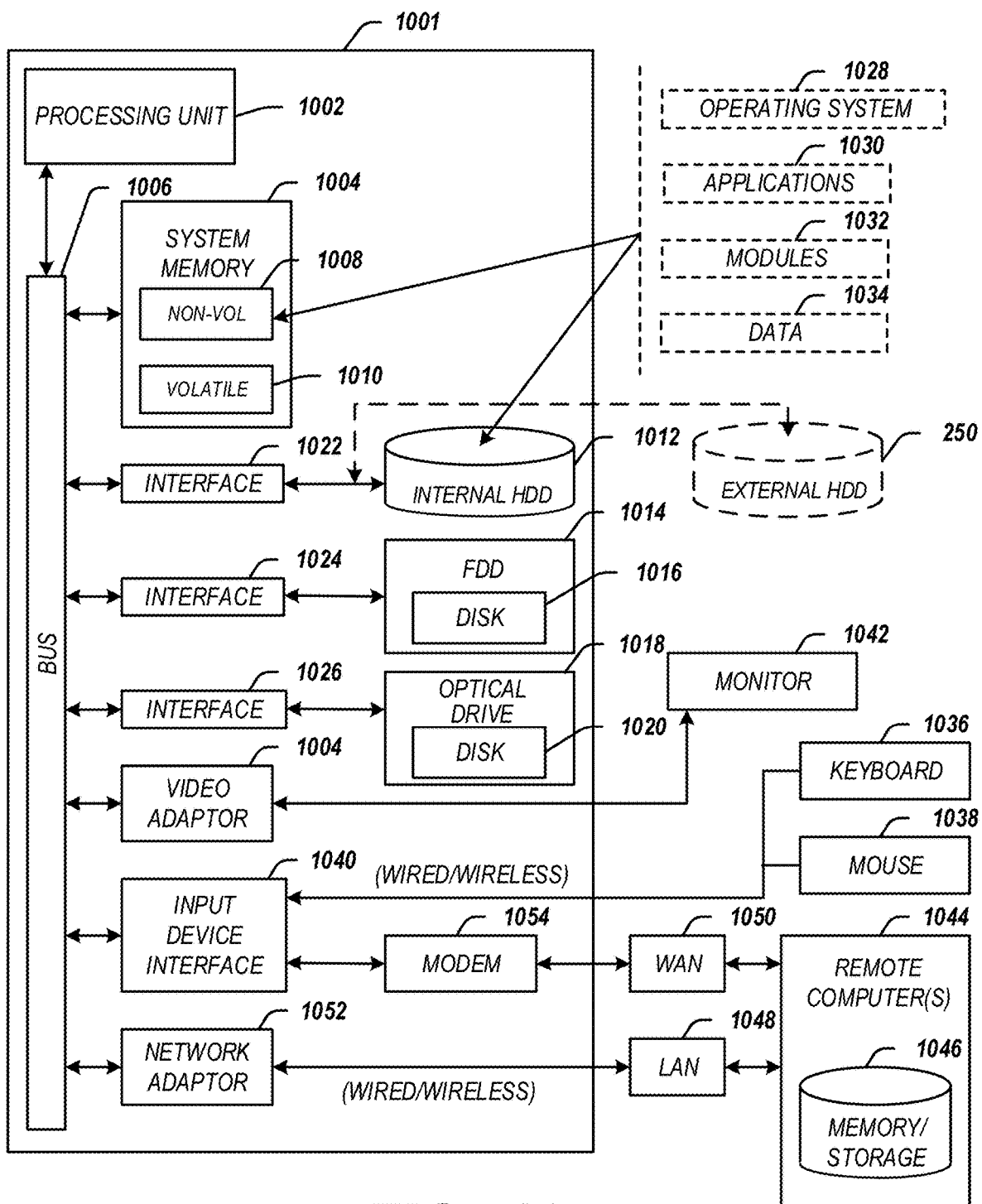

FIG. 9 illustrates an embodiment of a plurality of servers implementing various functions of a messaging service 900 suitable for use with exemplary embodiments. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-Internet-protocol (VoIP) voice communication between messaging clients for the performance of VoIP calls.

Figure 10:
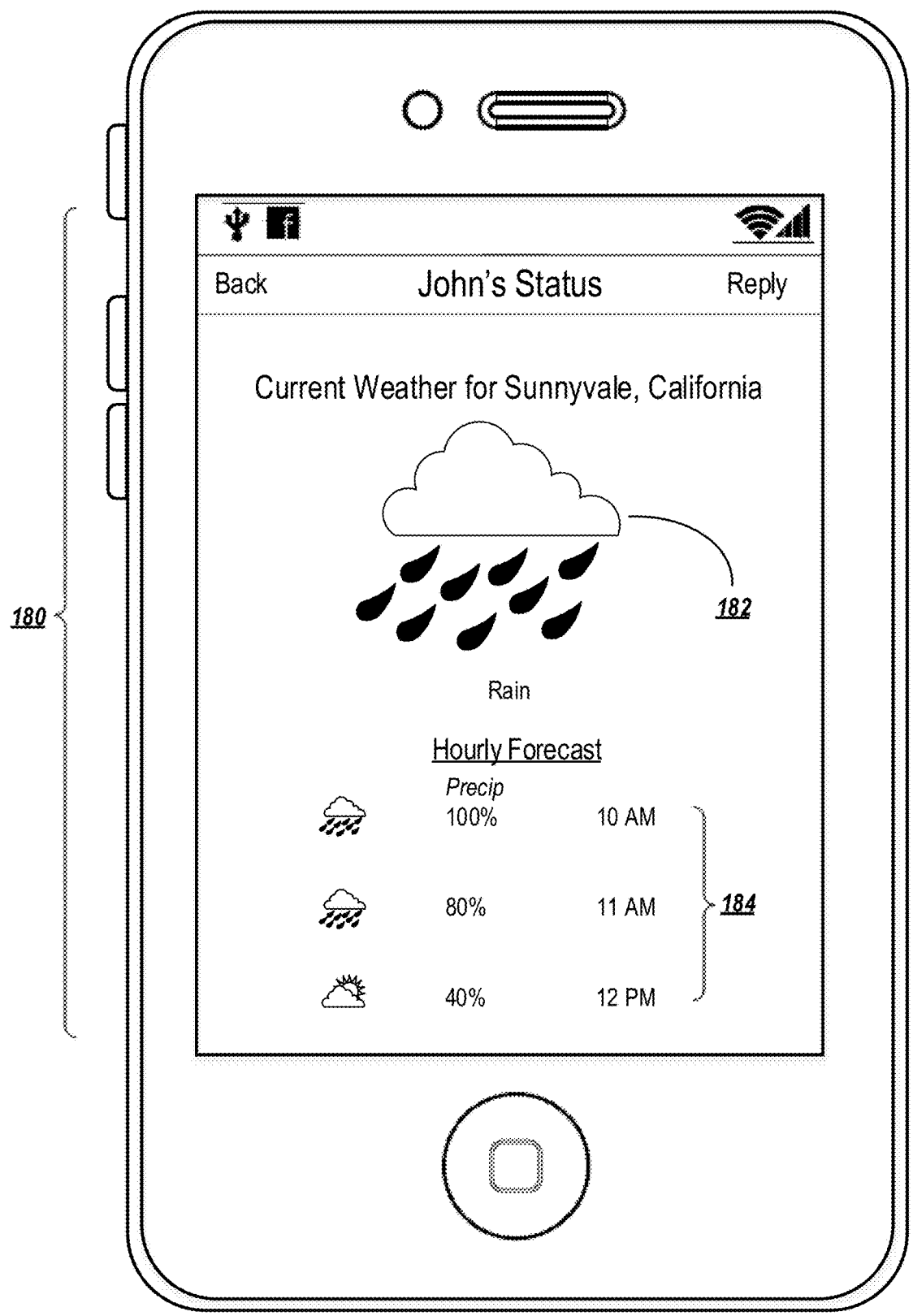
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
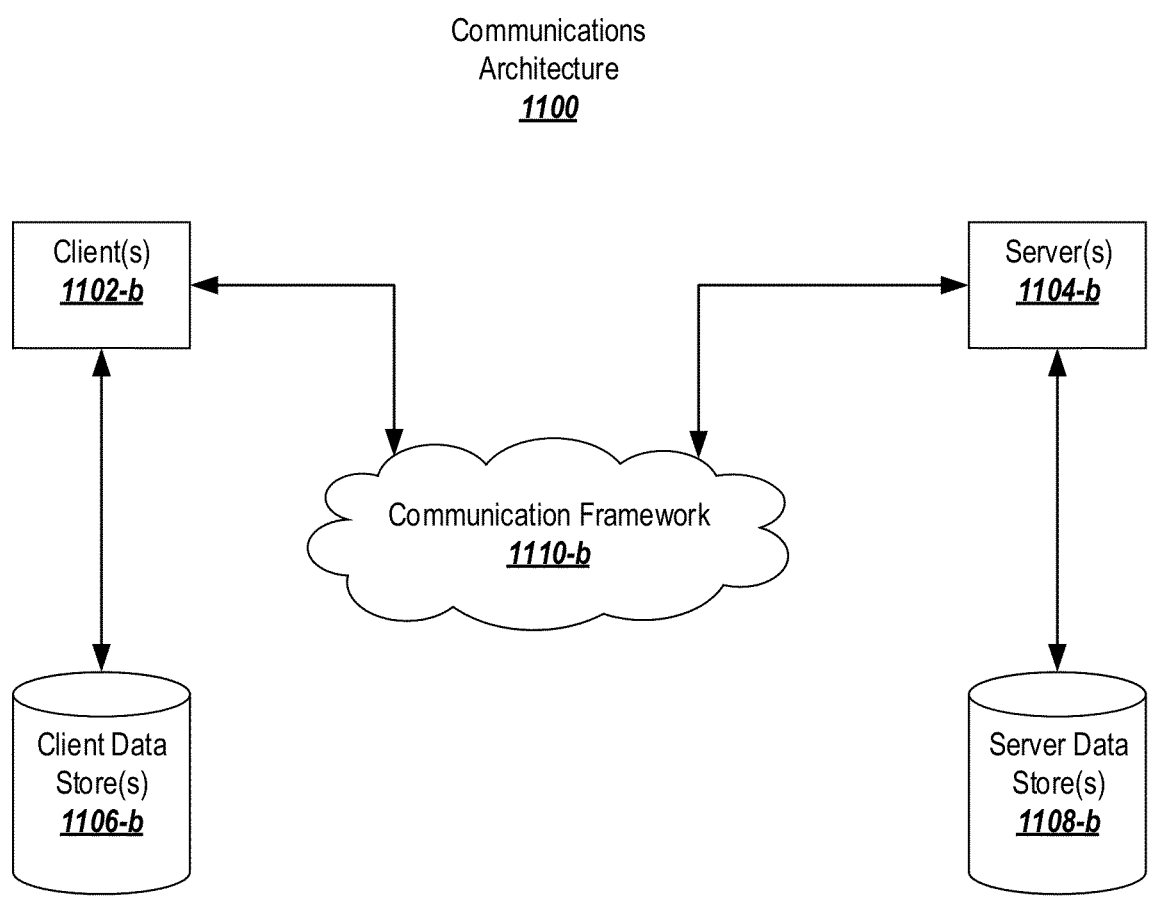
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
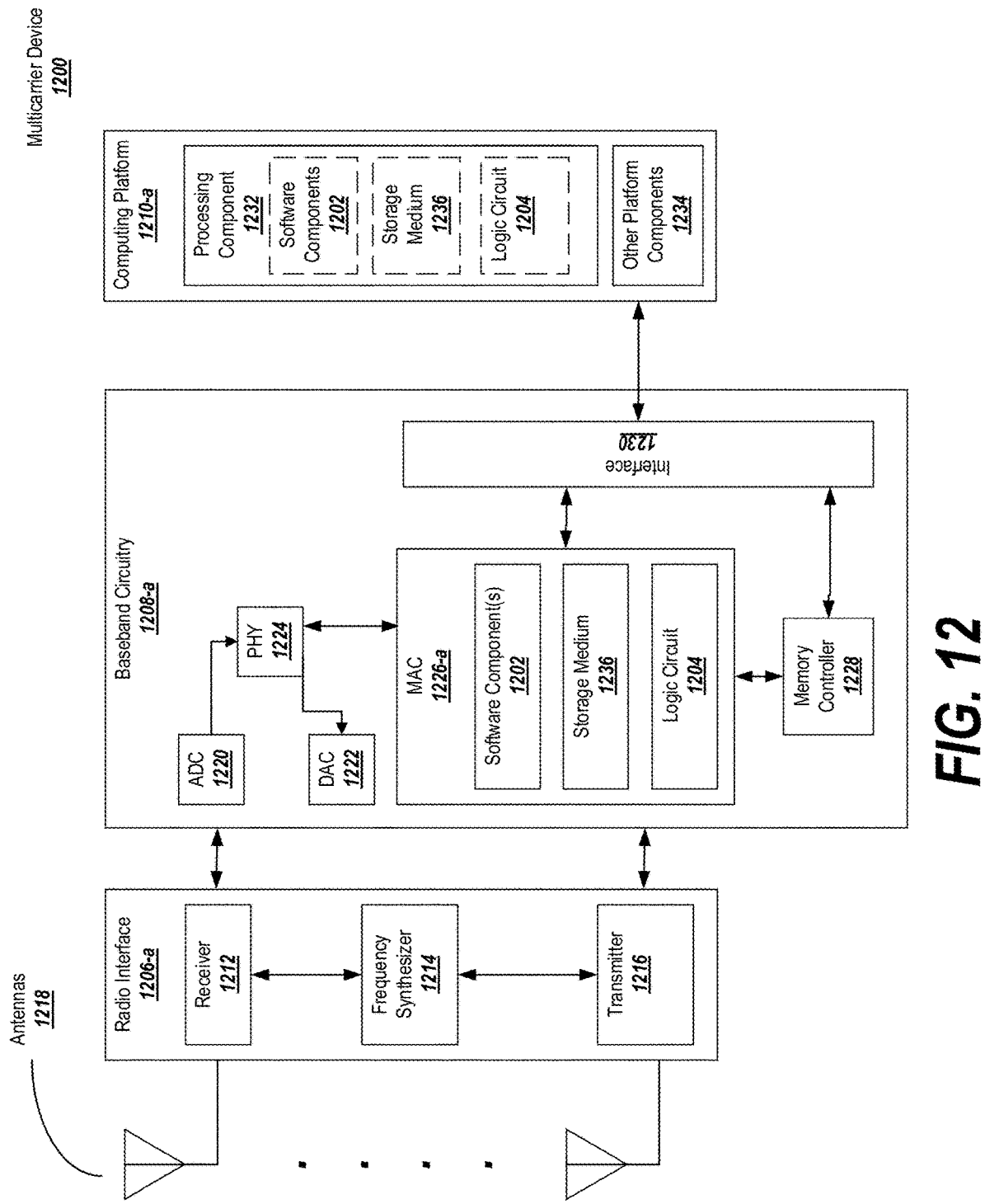
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
presenting an interface to an application for a communication service, the application associated with a sending user;
presenting an option in the interface to share ephemeral content with a specified set of users, wherein the ephemeral content is accessible to a given user for a predetermined period of time or for a predetermined number of views;
receiving a selection of the option to share the content as the status update; performing at least one of receiving a selection of pre-existing content as shared content, or generating new content as shared content;
sending the shared content as an ephemeral content message to the specified set of users; and
wherein the ephemeral content message comprises an encrypted thumbnail representation of the content, an encrypted link to the content, and a decryption key for decrypting the content, wherein the encrypted thumbnail representation of the content is provided at a lower quality than the content.

2. The method of claim 1, wherein the specified set of users is a mobile device contacts list.

3. The method of claim 1, wherein the ephemeral content message is transmitted to the communication service as an end-to-end encrypted message.

4. The method of claim 1, further comprising:
receiving a reply to the ephemeral content message from a recipient of the ephemeral content message;
and generating a one-to-one conversation between the sending user and the recipient.

5. The method of claim 1, wherein the selected group of recipients consists of a selected subset of a contacts list of the sending user, and further comprising:
receiving a reply to the ephemeral content message from a recipient of the ephemeral content message;
and generating a group conversation between the sending user and selected subset of the contacts list.

6. The method of claim 1, wherein the shared content comprises at least one of an image, a video, a weather report, a news story, text, an audio recording, a hyperlink, or a location tag.

7. A non-transitory computer-readable medium storing:
instructions configured to cause one or more processors to present an interface to an application for a communication service, the application associated with a sending user;
instructions configured to cause the one or more processors to present an option to share ephemeral content with a specified set of users, wherein the ephemeral content is accessible to a given user for a predetermined period of time or for a predetermined number of views;
instructions configured to cause the one or more processors to receive a selection of the option to share the content;
instructions configured to cause the one or more processors to perform at least one of receiving a selection of pre-existing content as shared content, or generating new content as shared content;
instructions configured to cause the one or more processors to send the shared content as an ephemeral content message to the specified set of users; and
wherein the ephemeral content message comprises an encrypted thumbnail representation of the content, an encrypted link to the content, and a decryption key for decrypting the content, wherein the encrypted thumbnail representation of the content is provided at a lower quality than the content.

8. The medium of claim 7, wherein the specified set of users is a mobile device contacts list.

9. The medium of claim 7, wherein the ephemeral content message is transmitted to the communication service as an end-to-end encrypted message.

10. The medium of claim 7, further storing:
instructions configured to cause the one or more processors to receive a reply to the ephemeral content message from a recipient of the ephemeral content message; and generating a one-to-one conversation between the sending user and the recipient.

11. The medium of claim 7, wherein the selected set of users consists of a selected subset of a contacts list of the sending user, and further storing:
instructions configured to cause the one or more processors to receive a reply to the ephemeral content message from a recipient of the status update; and instructions configured to cause the one or more processors to generate a group conversation between the sending user and selected subset of the contacts list.

12. The medium of claim 7, wherein the shared content comprises at least one of an image, a video, a weather report, a news story, text, an audio recording, a hyperlink, or a location tag.

13. An apparatus comprising:
a display configured to present an interface to an application for a communication service, the application associated with a sending user;
content sharing logic, implemented at least partially in hardware, configured to present an option to share content as ephemeral content with a specified set of users, and to receive a selection of the option to share the content, wherein the ephemeral content is accessible to a given user for a predetermined period of time or for a predetermined number of views;
shared content logic, implemented at least partially in hardware, configured to perform at least one of receiving a selection of pre-existing content as shared content, or generating new content as shared content;
network interface logic, implemented at least partially in hardware, configured to send the shared content as an ephemeral content message to the specified set of users; and
message generation logic, implemented at least partially in hardware, configured to package an encrypted thumbnail representation of the content, an encrypted link to the content, and a decryption key for decrypting the content into the ephemeral content message, wherein the encrypted thumbnail representation of the content is provided at a lower Quality than the content, wherein the encrypted thumbnail representation of the content is provided at a lower Quality than the content.

14. The apparatus of claim 13, wherein the network interface logic is configured to retrieve the specified set of users from a mobile device contacts list.

15. The apparatus of claim 13, wherein the network interface logic is configured to transmit the ephemeral content message to the communication service as an end-to-end encrypted message.

16. The apparatus of claim 13, wherein the network interface logic is further configured to receive a reply to the ephemeral content message from a recipient of the ephemeral content message, and further comprising conversation logic,
implemented at least partially in hardware, configured to generate a one-to-one conversation between the sending user and the recipient.

17. The apparatus of claim 13, wherein the specified set of users consists of a selected subset of a contacts list of the sending user and the network interface logic is further configured to receive a reply to the ephemeral content message from a recipient of the ephemeral content message, and further comprising conversation logic, implemented at least partially in hardware, configured to generate a group conversation between the sending user and selected subset of the contacts list.

* * * * *